(12) United States Patent
Warburton

(10) Patent No.: US 6,169,287 B1
(45) Date of Patent: Jan. 2, 2001

(54) X-RAY DETECTOR METHOD AND APPARATUS FOR OBTAINING SPATIAL, ENERGY, AND/OR TIMING INFORMATION USING SIGNALS FROM NEIGHBORING ELECTRODES IN AN ELECTRODE ARRAY

(76) Inventor: William K. Warburton, 1300 Mills St., Menlo Park, CA (US) 94025

( * ) Notice: Under 35 U.S.C. 154(b), the term of this patent shall be extended for 0 days.

(21) Appl. No.: 09/146,856

(22) Filed: Sep. 3, 1998

Related U.S. Application Data

(63) Continuation-in-part of application No. 09/036,511, filed on Mar. 6, 1998.
(60) Provisional application No. 60/044,385, filed on Mar. 10, 1997.

(51) Int. Cl.[7] .................................................. G01T 1/24
(52) U.S. Cl. .................................. 250/370.1; 250/370.13; 250/370.09
(58) Field of Search ........................... 250/370.1, 370.01, 250/370.06, 370.08, 370.09, 370.13

(56) References Cited

U.S. PATENT DOCUMENTS

| | | | |
|---|---|---|---|
| 4,055,765 | * 10/1977 | Gerber et al. | 250/370.09 |
| 4,421,986 | * 12/1983 | Friauf et al. | |
| 4,688,067 | * 8/1987 | Rehak et al. | 257/429 |
| 4,692,626 | * 9/1987 | Westphal . | |
| 4,852,135 | * 7/1989 | Anisovich et al. | |
| 5,171,998 | * 12/1992 | Engdahl et al. | |
| 5,245,191 | * 9/1993 | Barber et al. | |
| 5,273,910 | * 12/1993 | Tran et al. | |
| 5,365,069 | * 11/1994 | Eisen et al. | |
| 5,434,417 | * 7/1995 | Nygren . | |
| 5,500,534 | * 3/1996 | Robinson et al. | |
| 5,504,334 | * 4/1996 | Jansen et al. | 250/369 |
| 5,510,644 | * 4/1996 | Harris et al. | |
| 5,524,133 | * 6/1996 | Neale et al. | |
| 5,530,249 | * 6/1996 | Luke . | |
| 5,627,377 | * 5/1997 | Hamilton, Jr. et al. | |

(List continued on next page.)

OTHER PUBLICATIONS

Armantrout et al., "What Can Be Expected From High–Z Semiconductor Detectors?", *IEEE Trans. Nucl. Sci.*, NS–24(1):121–125 (1977).

Barber et al., "High–Resolution Imaging Using a 48×48 Ge Array with Multiplexer Readout", *Conference Record, 1995 IEEE Nuclear Sciences Symposium*, (San Francisco, CA Oct. 21–8, 1995) pp. 113–117.

Barber, "CdZnTe Arrays for Nuclear Medicine Imaging", *Proc. SPIE*, 2859:26–28 (1996).

Barrett et al., "Charge Transport Arrays of Semiconductor Gamma–Ray Detectors", *Phys. Rev. Lett.*, 75(1):156–159 (1995).

(List continued on next page.)

*Primary Examiner*—Constantine Hannaher
*Assistant Examiner*—Albert Gagliardi
(74) *Attorney, Agent, or Firm*—Townsend and Townsend and Crew LLP

(57) ABSTRACT

A method for obtaining both spatial and energy resolution in compound semiconductor x-ray detectors using charge carriers of only a single polarity. A negatively biased cathode contact is applied to one side of a block detector material and an array of anode stripes is applied to the other side. Absorbed x-rays generate charge clouds in the detector block, and charge sensitive preamplifiers measure the time varying charges $q_i(t)$ induced on the anodes by the motion of these charge clouds within the detector. For each stripe j, one or more secondary signals $Q_{k,m}(t)$ are formed as weighted sums of the signals $q_k(t)$ from the stripe j and a combination of its near neighbors. One or another of these signals $Q_{k,m}(t)$ can then be processed to obtain the energy of the absorbed x-ray, the position where it was absorbed, both laterally and in depth, and the time of the absorption.

55 Claims, 17 Drawing Sheets

U.S. PATENT DOCUMENTS

| | | | |
|---|---|---|---|
| 5,677,539 | * | 10/1997 | Apotovsky et al. . |
| 5,731,584 | * | 3/1998 | Beyne et al. .......................... 250/374 |
| 5,825,033 | * | 10/1998 | Barrett et al. ...................... 250/370.1 |
| 6,002,741 | * | 12/1999 | Eisen et al. ............................. 378/62 |

OTHER PUBLICATIONS

Doty et al., "Performance of Submillimeter CdZnTe Strip Detectors", *Conference Record, 1995 IEEE Nuclear Sciences Symposium*, (San Francisco, CA Oct. 21–8, 1995) pp. 80–84.

Eskin et al., "The Effect of Pixel Geometry on Spatial and Spectral Resolution in a CdZnTe Imaging Array", *Conference Record, 1995 IEEE Nuclear Sciences Symposium*, (San Francisco, CA Oct. 21–8, 1995) pp. 544–548.

Hamel et al, "Charge Transport and Signal Generation in CdTe Pixel Detectors", *Nucl. Instr. and Meth. in Phys. Res.*,A 380:238–240 (1996).

Hamel et al., "Signal Generation in CdZnTe Strip Detectors", *IEEE Trans. Nucl. Sci.*, 43(3):1422–1426 (1996).

He et al., "1–D Position Sensitive Single Carrier Semiconductor Detectors", *Nucl. Instr. and Meth. in Phys. Res.*,A 380:228–231 (1996).

Janesick, "Open Pinned–Phase CCD Technology", *Proc. SPIE*, 1159:363–371 (1989).

Luke, "Single–Polarity Charge Sensing in Ionization Detectors Using Coplanar Electrodes", *Appl. Phys. Lett.* 65(22):2884–2886 (1994).

Lund et al., "The Use of Pulse Processing Techniques to Improve the Performance of $Cd_{1-x}An_xTe$ Gamma–Ray Spectrometers", *IEEE Trans. Nucl. Sci.*, 43:1411–1416 (1996).

Macri et al., "Development of an Orthogonal–Stripe CdZnTe Gamma Radiation Imaging Spectrometer", *IEEE Trans. Nucl. Sci.*, 43(3):1458–1462 (1996).

Macri et al., "Progress in the Development of Large Area Sub–Millimeter Resolution CdZnTe Strip Detectors", *SPIE*, 2859:29–36 (1996).

Marks et al., "A 48×48 CdZnTe Array with Multiplexer Readout", *IEEE Trans. Nucl. Sci.*, 43:1253–1259 (1996).

Niemelä et al., "Improving CdZnTe X–Ray Detector Performance by Cooling and Rise Time Discrimination", *Nucl. Instr. and Meth. in Phys. Res.*,A 377:484–486 (1996).

Patt et al., "New Gamma–Ray Detector Structures for Electron Only Charge Carrier Collection Utilizing High–Z Compound Semiconductors", *Nucl. Instr. and Meth. in Phys. Res.*,A 380:276–281 (1996).

Polichar et al., "Development of CdZnTe Energy Selective Arrays for Industrial and Medical Radiation Imaging", *Nucl. Instr. and Meth. in Phys. Res.*,A 353:349–355 (1994).

Radeka, "Low–Noise Techniques in Detectors", *Ann. Rev. Nucl. Part. Sci.* 38:217–277 (1988).

Redus et al., "Electronics for High Resolution Spectroscopy with Compound Semiconductors", *Nucl. Instr. and Meth. in Phys. Res.*,A 380:312–317 (1996).

Snoeys et al., "A New Integrated Pixel Detector for High Energy Physics", *IEEE Trans. Nucl. Phys.*, 39:1263–1269 (1992).

* cited by examiner

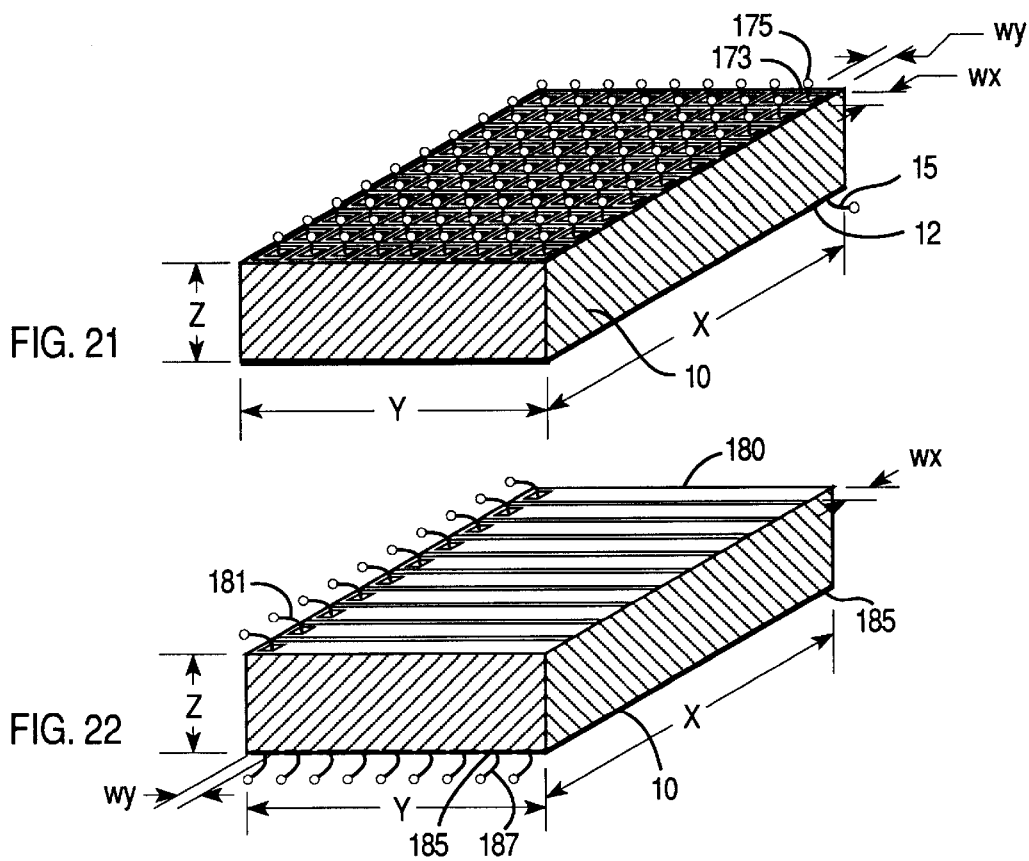
FIG. 21
FIG. 22
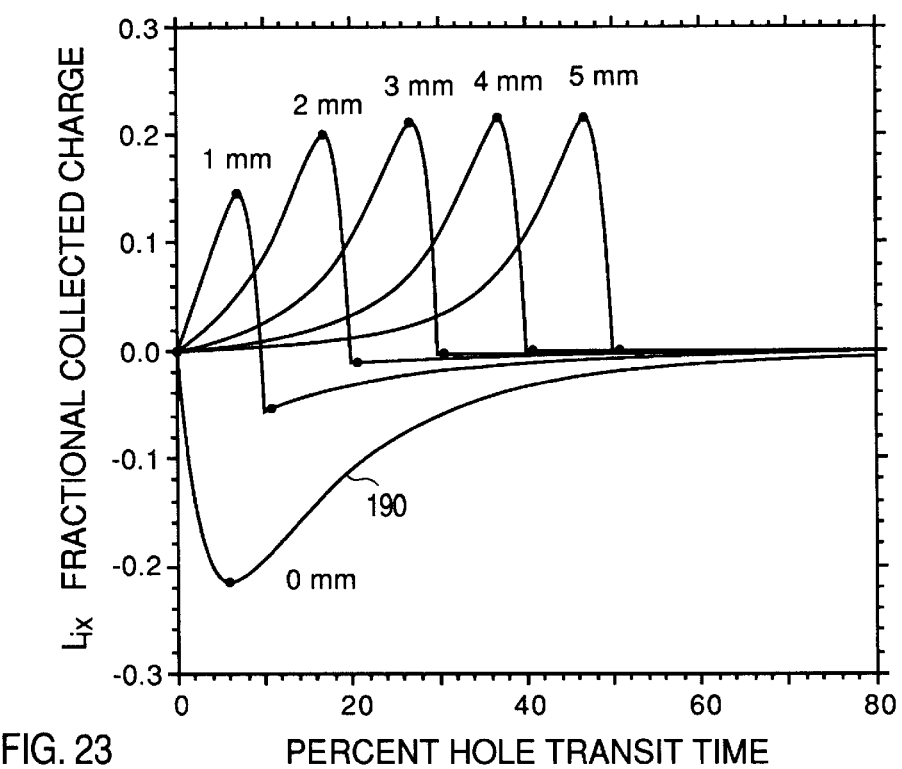
FIG. 23

X-RAY DETECTOR METHOD AND APPARATUS FOR OBTAINING SPATIAL, ENERGY, AND/OR TIMING INFORMATION USING SIGNALS FROM NEIGHBORING ELECTRODES IN AN ELECTRODE ARRAY

CROSS-REFERENCE TO RELATED APPLICATIONS

This application is a continuation-in-part of application Ser. No. 09/036,511, filed Mar. 6, 1998, of William K. Warburton, and claims priority from U.S. Provisional Patent Application No. 60/044,385, filed Mar. 10, 1997, for "METHOD FOR OBTAINING BOTH SPATIAL AND ENERGY RESOLUTION IN COMPOUND SEMICONDUCTOR X-RAY DETECTORS" of William K. Warburton. The disclosures of both applications are hereby incorporated by reference in their entirety for all purposes.

BACKGROUND OF THE INVENTION

1. Field of the Invention

The present invention relates generally to the field of detectors for x-ray or gamma ray photons and, more particularly, to methods for processing the signals generated by semiconductor detectors in response to absorbing such photons so as to promptly obtain information about the absorbed photon, such as its energy or the location in the detector where it was absorbed.

All references mentioned in this application are incorporated by reference in their entirety for all purposes.

2. Background and Prior Art

2.1. X-ray Detector Applications

In this application the term "x-ray" is used in a generic sense—to denote photons of energies typically above 3–4 keV, specifically including such photons generated from nuclear decays (i.e., gamma rays).

There are applications in a variety of fields, including medicine, astronomy, and non-destructive testing, wherein it would be useful to have x-ray detectors capable of resolving not only the location of interaction of the x-ray within the detector but also the energy of the interacting x-ray. Being able to resolve location allows, for example, the formation of x-ray images. Being able to resolve energy then allows the image either to be formed at different x-ray energies (when using a polychromatic source) or to be formed at the same x-ray energy as the source by rejecting scattered, image degrading x-rays at other energies.

It would be additionally useful if the output of such a detector were digital: the result of each detected x-ray being a set of N+1 numbers (where N is the spatial dimension of the detector) representing the spatial coordinates of the x-ray's interaction location and its energy. This would allow the detector's image to be directly accumulated by a digital electronics system, processed by digital computer, stored on digital storage media, and/or digitally transmitted to remote locations. These capabilities are particularly important in medical imaging, where they greatly simplify the enhancement, analysis, and archiving of patient data.

The availability of energy resolved digital imaging detectors (ERDIDs) would enhance a variety of existing imaging detector applications as well as stimulating a variety of new ones. In medical imaging applications, for example, obtaining x-ray images as a function of energy would be to allow images of features having a particular absorption coefficient (e.g., bones) to be either extracted or suppressed. Another ERDID use would be to reject Compton scattered radiation, which commonly reduces contrast, from images without having to resort to grids, which reduce efficiency. In both medicine and astronomy, ERDIDs could also be employed in Compton cameras, allowing them to generate energy resolved images. In other areas of research, an ERDID would significantly increase the efficiency of energy dispersed diffraction experiments by removing the need for exit detector pinholes to define the exit x-rays' scattering angles. This would allow the technique to be practiced effectively with much weaker, and hence cheaper, x-ray sources than is currently possible.

In many applications it would further be beneficial if the necessity for cryogenic cooling could be dispensed with and, when working with higher energy x-rays, materials with greater absorption cross section could be employed. These desires have fueled considerable research and development in the area of compound semiconductor detectors, including such materials as $HgI_2$, GaAs, CdTe, and CdZnTe (CZT). These materials have generally been found to possess poor hole collection properties, however, which in turn precludes good energy resolution except in very thin detectors. It would thus be beneficial to have a semiconductor detector technology wherein the energy resolution was insensitive to hole collection properties or, more generally, a technology capable of generating x-ray position and energy information using charge carriers of only a single polarity.

2.2. Brief Survey of Existing Art

The field of x-ray detection is highly developed. A fairly comprehensive introduction to the state of the art may be found in the volume "Radiation Detection and Measurement, 2nd Ed." by Glenn F. Knoll (J. Wiley, New York, 1989). Below we note only lines of development relevant to the present invention.

2.2.1. X-ray Energy Resolution

The common classes of commercially successful x-ray detectors include film, scintillator plus secondary light detector, gas detectors, and solid state semiconductor detectors, in order of increasing energy resolution. Film has essentially no energy resolution unless used with absorbing layers. The energy resolution of scintillator-based systems depends upon both the efficiency of the scintillator and upon the nature of the secondary detector. They can easily operate as single photon counters and if carefully optimized may have energy resolutions of 40% at 10 keV and better at higher energies. Gas detectors, including such variants as proportional counters and microstrip gas chambers, can approach 5–10% resolution at 10 keV, but as the x-ray energy rises they tend to become inefficient due to their low cross sections for x-ray absorption. Semiconductor detectors have the best commercial energy resolution, approaching 1.5% energy resolution at 10 keV and improving with energy. Germanium detectors in particular have a fairly good cross section even at energies in excess of 100 keV and can be made thick enough to absorb x-rays efficiently at these energies. For the proposed applications, the energy resolution of semiconductor detectors will generally be required. Therefore the following discussion will be so limited.

2.2.2. Spatially Resolved, Semiconductor X-ray Detectors

The common categories of spatially resolved, semiconductor x-ray detectors are silicon (Si), germanium (Ge) and compound semiconductor.

2.2.2.1. Si Detectors and Integrated Electronics

There are three primary Si detector technologies: cryogenically cooled spectrometers, CCDs, and pixel detectors with integrated electronics.

Cryocooled spectrometers: In this technology a Si diode is operated fully depleted at a low temperature to reduce leakage currents from thermally generated charge carriers (typically about 100% K). The charges produced in the diode from an x-ray absorption are integrated by a charge sensitive preamplifier, generating (after appropriate pulse shaping) an electrical pulse signal whose amplitude is proportional to the x-ray's energy. While this technique can give state of the art energy resolution for low energy x-rays it suffers from several problems. First, the cryogenic cooling makes the technique difficult to apply to complex imaging detectors. Second, Si has a low cross section and does not absorb x-rays well above 20 keV. Third, it is difficult to fabricate arrays of these detectors. To date only small numbers of elements have been successfully grouped in commercial instruments.

CCD detectors: This is the most common Si imaging detector, whose various forms range from inexpensive devices for telecommunications to ultra-low noise devices for scientific research, particularly in astronomy. Typical pixel sizes range from 12 to 50 $\mu$m, with overall array sizes of from 512 to 2096 pixels squared. CCDs can be used as direct x-ray detectors (see, for example [J. R. Janesick, "Open Pinned-Phase CCD Technology" in PROC. SPIE Vol. 1159, pp. 363–371 (1989)]), but have very low efficiencies because their active volumes are so thin. They are therefore typically coupled to a scintillator screen by a fiber optic, thereby reducing their energy resolution to that of other scintillation detectors.

Pixel detectors with integrated electronics: Because Si technology can also be used to produce integrated signal processing circuits, there have also been efforts to create pixelated imaging detectors with integrated processing electronics, that is, a more-or-less complete set of processing (or pre-processing) associated with each pixel in the detector array. There have been two separate approaches to this problem. The first, originating primarily in the high energy physics community, seeks to integrate both the detectors and processing electronics into the same piece of high resistivity Si. [W. Snoeys et al., "A New Integrated Pixel Detector for High Energy Physics" in IEEE Trans. Nucl. Phys., Vol. 39, pp. 1263–1269 (1992)] These detectors operate at room temperature, have pixels which are usually of order 100 $\mu$m square, and do not usually obtain better than 1–2 keV FWHM energy resolution, primarily as a result of their extremely low design powers, since they are intended to be employed in arrays of millions of pixels to track high energy, minimum ionizing events of 10's of MeV or more. The second approach, originated in the astrophysics community, constructs the electronics on a conventional Si wafer and then bump bonds them to an array of detector pixels fabricated on a second wafer. This approach has the advantage of allowing the detector material to be different from the Si in the processing electronics, and systems have been reported using GaAlAs detectors for infrared detectors and CZT detectors for medical imaging detectors. [H. B. Barber et al., "High-Resolution Imaging Using a 48×48 Ge Array with Multiplexer Readout" in Conference Record, 1995 IEEE Nuclear Sciences Symposium (San Francisco, Calif. Oct. 21–28, 1995), pp. 113–117]. Whether the detector and electronics are cooled depends upon the specific application. Depending upon the design, these detectors can be either integrating or single photon counting, and preamplifier arrays for energy dispersive use have been reported.

2.2.2.2. Ge Detectors

Germanium detectors are primarily used in the cryocooled, energy dispersive mode. Because of their smaller electron-hole ($e^-$-$h^+$) formation energy, which reduces their Fano noise, and higher atomic number, which increases their absorption cross section, these detectors have become the standard for gamma ray spectroscopy in the 20 keV to few MeV energy range. Beyond the techniques involved in fabricating the Ge detectors themselves, the underlying detector technology is essentially identical to that of cryocooled Si energy dispersive detectors. Multi-pixel arrays have been fabricated to increase overall counting rates but have not found use as even crude imaging detectors.

2.2.2.3. Compound Semiconductor Detectors: General Issues

Various compound semiconductors have been investigated in hopes of developing improved energy dispersive detectors. Particular interest has centered on increasing cross section for x-ray absorption by increasing the average atomic number Z and on achieving room temperature operation for light-weight, portable applications. The materials GaAs, $HgI_2$, CdTe, and CZT have been most commonly investigated, although many other materials have been reported. Bandgaps in these materials can be significantly larger than in Si (some are essentially semi-insulating, rather than semi-conducting) and they can be readily operated at room temperature. At room temperature, for example, $HgI_2$ can have a resistivity in excess of $10^{12}$ ohm-cm, and thus operate in a fully depleted condition even without the benefit of diode junction contacts.

The principal barrier to these materials' wider application is their poor carrier properties. Typical electron mobilities may be 10 or more times less than in Si or Ge and hole mobilities may be 100 or more times worse. An even more serious issue is that carrier trapping times are typically several orders of magnitude worse than in Si or Ge. For example, the minority carrier lifetime in high purity Ge is of order $10^{-3}$ s, while in CZT it is more like $3 \times 10^{-6}$ s. Under these conditions it is easy for carrier transit times across the detector to approach or exceed trapping times, which results in incomplete charge collection and loss of energy resolution, since absorption events at different depths in the detector lose differing amounts of charge to trapping.

While there are theoretical reason to believe that the limited mobility problem may arise from polar lattice carrier scattering processes intrinsic to these materials [G. A. Armantrout, et al., "What can be expected from high Z semiconductor detectors", in IEEE Trans. Nucl. Sci. Vol. NS-24, pp. 121–125 (1977)], the trapping problem is more likely a purification and crystal growth issue. Si can be grown to extremes of purity and crystal perfection primarily as a result of the hundreds of thousands of person-years which have been devoted to understanding all of the associated issues. This vast effort was financed by the industries which depend upon Si devices. Compound semiconductors, however, are currently of interest only to x-ray detector builders who are supported by a far smaller market. A typical compound semiconductor has only a few tens of man years invested in it. Further, the problems associated with producing high quality materials and growing highly perfect crystals from them is exacerbated simply because these materials are compounds. Thus there is little reason to expect any dramatic improvements in carrier properties in the compound semiconductors in the near future.

2.3. Recent Progress with Compound Semiconductors 2.3.1. Pixelated Detectors for Spatial Resolution In recent years various groups have produced pixelated detectors, in either 1 or 2 dimensions using compound semiconductors. Generally speaking there have been three approaches: 1) building an array of independent detectors [see U.S. Pat. No. 5,365,069 by Y. Eisen, et al.]; 2) depositing pixel defining contacts onto a compound semiconductor and then wire bonding or bump bonding this assembly to an array of processing electronics [see F. P. Doty et al., "Performance of Submillimeter CdZnTe Strip Detector", in Conference Record for 1995 IEEE Nuclear Sciences Symposium (San Francisco, Calif. Oct. 21–28, 1995), pp. 80–84; and also H. B. Barber, "CdZnTe arrays for nuclear medicine imaging" in PROC. SPIE Vol. 2859, pp. 26–28 (1996)]; 3) fabricating an array of processing electronics and then depositing or growing a semiconductor layer over them [see U.S. Pat. No. 5,273,910 by N. T. Tran, et al.]. Images with sub-millimeter resolution have been obtained with these arrays.

2.3.2. Correcting for Hole Trapping Losses in CZT

Various schemes have been proposed over the years to correct for hole losses during charge collection in thick compound semiconductor detectors. A typical recent case involving thick CdZnTe (CZT) detectors used a slow shaping amplifier to estimate gamma-ray energy and a fast shaping amplifier to estimate signal risetime. The risetime was then used to estimate and correct for hole collection losses. [J. C. Lund, et al., "The Use of Pulse Processing Techniques to Improve the Performance of $Cd_{1-x}Zn_xTe$ Gamma-Ray Detectors" in IEEE Trans. Nucl. Sci. Vol. 43, pp. 1411–1416 (1996)]. Significant energy resolution improvement was obtained but not enough to approach the resolution of a good Ge detector. Also, the required electronics make the method difficult for more than a few detector channels.

2.3.3. Single Carrier Collection Schemes

By far the most promising approach to obtaining good energy resolution in compound semiconductors has been the recent development of single carrier collection schemes. These techniques, which have been explained using analyses of the time-variant charges induced on detector electrodes by the motion of the x-ray generated charges in the body of the detector, have resulted in energy resolutions which are substantially improved over any earlier approaches, although they are still not capable of approaching Ge detector resolution. Of these methods, the following two methods developed essentially independently and simultaneously. The third method applies the similar concepts to create a larger area, single detector with good energy resolution.

2.3.3.1. Luke Approach Using Coplanar Grid

This approach was first introduced by P. N. Luke in 1994 [P. N. Luke, "Single-polarity charge sensing in ionization detectors using coplanar electrodes", in Appl. Phys. Lett. Vol. 65 (22), pp. 2884–2886. See also: IEEE Trans. Nucl. Sci. Vol. 42, pp. 207–213 (1995) and Nucl. Instr. and Meth. in Phys. Res. Vol. 380, pp. 232–237 (1996); and U.S. Pat. No. 5,530,249, where the effect is computed for different geometries.] In this work, Luke replaced the usual, rectangular anode on a CdZnTe detector with an array of thin stripes, biased half of them at a slightly negative voltage to repel electrons, and connected the remaining, interleaved electrodes together to form a second anode. Both anodes were connected to their own charge sensitive preamplifiers. The difference between these two signals was then connected to the usual spectroscopy amplifier. Luke showed that, for events in the front 80% of detector volume, the drifting holes induced charge equally on both anode grids and so contributed no net charge to the output. The electrons only induced charge differentially on the grids when in close proximity to them and so produced output signals which were substantially independent of the location of the x-ray interaction in the detector volume. By this approach he converted a detector which was unable to produce a $^{137}Cs$ peak to one which produced an nice peak with 5% energy resolution. Luke also noted that the ratio of the amplitudes of the signals from the two grids "related directly" to the depth of the interaction of the x-ray in the detector volume, although he did not develop a formula for the relationship. Further, by reducing the gain of the non-collecting electrode, he could make the signal output less sensitive to electron trapping during the charge collection process as well. Hamilton and Rhiger have devised and patented a grown structure based on the same principle (U.S. Pat. No. 5,627,377).

2.3.3.2. Small Pixel Effect Approach

The small pixel effect was first described by H. H. Barrett, J. D. Eskin, and H. B. Barber [see H. H. Barrett, J. D. Eskin, and H. B. Barber in Phys. Rev. Lett. Vol. 75, pp. 156–159 (1995) and related papers in Proc. SPIE Vol. 2859, pp. 46–49 (1996) and Conference Record of the 1995 IEEE Nucl. Sci. Symp. & Med. Imaging Conf., Vol. I, pp. 544–548 (1996)] in order to show that "semiconductor arrays could be made relatively insensitive to hole trapping by the simple expedient of properly choosing the pixel size." Noting that a charge in the vicinity of a conductor (detector contact) induces a charge in it, and by quantifying this effect using a Green's Function analysis, the authors were able to compute detector charge flows as a function of time after the absorption of an x-ray. In particular, they were able to show that, by making the pixel dimension small compared to the detector thickness, they could make the charge collection insensitive to the motion (and trapping) of the hole component since most charge is induced only by moving charges within distances of the electrode which are comparable to the pixel dimension. While this insensitivity effect continues to improve as the pixel dimension decreases, the absolute energy resolution does not improve indefinitely because the pixels eventually become small compared to the dimensions of the drifting charge cloud, so that a single pixel is no longer able to collect the complete generated charge. For x-rays at 140 keV ($^{99m}Tc$) the best energy resolution was obtained using 500 µm square pixels. Even better energy resolution was obtained from an array of 125 µm square pixels by summing charges on local sets of up to 11×12 pixels. [D. G. Marks, et al., "A 48×48 CdZnTe Array with Multiplexer Readout" in IEEE Trans. Nucl. Sci. Vol. 43, pp. 1253–1259 (1966)] This procedure, however, required reading out the array often enough so that individual events could be identified.

2.3.3.3. Digirad Three Terminal Detector

Researchers at Digirad Corporation have recently patented a three terminal detector which applies the concepts of a Si drift detector to making a single charge carrier collecting detector (U.S. Pat. No. 5,677,539). In this detector the anode is made quite small and surrounded by a control electrode at a more negative voltage. All field lines originating at the cathode entrance window thus terminate on the anode, so that electrons are collected efficiently. However, just as in a drift detector, because the anode is small, the approaching electrons do not induce charge in it until they are only a short distance away. The holes are usually too far away to induce significant charges, so the detector is becomes a single carrier detector, which greatly improves its resolution. The inventors show how the design can be extended to make pixel arrays. However, as in all pixel arrays, spatial resolution is set by the pixel size.

2.4. Imaging with Pixelated Detectors

In classical imaging with film and similar technologies employing phosphorescent layers, the process of image formation in the imaging medium always introduces image smearing and loss of fidelity. This phenomenon is characterized by either the "point spread function" (PSF) or the "modulation transfer function" (MTF), which are Fourier transforms of each other. The PSF(x) is the image density pattern that would be created as a function of position x, theoretically, by exposure to a zero dimensional "point" (or delta function) of x-rays. The MTF($\omega$) is the amplitude, as a function of spatial frequency $\omega$, of the density modulation in the image of an object whose spatial density is given by (1+sin($\omega$x)). The output image associated with any given input image can be computed by convoluting its density with the imaging medium's PSF. The power spectrum of an output image may be found from the power spectrum of the input image by multiplying it by the MTF squared. Thus the medium's "Power Spectrum" is its MTF squared.

"Good" imaging media are those that have narrow PSFs which fall rapidly to zero beyond their Full Width Half Maximum (FWHM) value. Imaging medium problems are readily correlated to problems with their PSFs. For example, PSF's that do not fall rapidly to zero, or have long, low tails show image "glare" or fogging, respectively. Gaussian shaped PSF's are particularly nice, therefore, since they are smooth, continuous functions that fall to zero very rapidly beyond their FWHM value. Their MTFs are also Gaussian, so that low frequency features are imaged cleanly and high frequency features are uniformly washed out and do not confuse image analysis.

From this viewpoint, pixel detectors are not at all ideal detectors. Their PSF is the Rect($w_p$) function (value equals 1 over the pixel's spatial width $w_p$ and is zero elsewhere), whose Fourier transform is well known to be the sinc function (sinc(x)=sin(x)/x), so that the power spectrum becomes:

$$Pw_p = 4w_p^2 \operatorname{sinc}^2(2\pi f w_p) \quad (1)$$

FIG. 1A shows PSFs for two imaging media, one PSF 1 has a Gaussian FWHM of 1 mm and the other is a 1 mm pixel whose PSF 3 is Rect(1 mm). FIG. 1B shows the MTFs of these two response functions. The Gaussian PSF 1 has a Gaussian MTF 5 whose half maximum value occurs at about 0.33 cycles/mm. The pixel's MTF 7 goes out to higher frequencies: its half value is at 0.5 cycles/mm, where the Gaussian has already fallen to 0.15. While this might appear to be beneficial, by achieving a larger frequency response, it is in fact deleterious because the pixelated detector is a sampling system, producing only a single output for each pixel at separations of wd equal to 1 mm. For sampled systems, the well known Nyquist theorem establishes the Nyquist frequency $F_N$ 9 equal to $1/(2w_p)$ and shows that all higher frequencies are aliased into the image by folding about $F_N$. Thus, in our example, the frequency component at 0.85 cycles/mm appears in the image at 0.15 cycles/mm. The component at 1.3 cycles/mm appears at 0.3 cycles/mm. Thus the large values of $Pw_p$ 7 above 0.5 cycles/mm in FIG. 1B are actually detrimental to good image formation since these frequencies are strongly aliased into the image.

3. Desirable Detector Characteristics

From the foregoing it is clear that present techniques for implementing imaging detectors using compound semiconductors leave much to be desired. While the coplanar grid approach gives fairly good energy resolution, it offers no spatial resolution. To date all spatially resolved detectors have been pixel detectors, with the aliasing problems noted above. Further, those with the highest spatial resolution have pixels which are too small for good energy resolution since they are approaching the dimensions of the drifting charge clouds. As an additional problem, a large number of pixels are required for adequate spatial resolution, which requires a similarly large number of associated electronics processing circuits, an approach which thus becomes complex, costly, and increasingly liable to failure.

It would therefore be advantageous to have a method for implementing an imaging detector using compound semiconductors which produced both good spatial and good energy resolution yet required a relatively small number of processing circuits and possessed a point spread function which did not alias high frequency image components.

SUMMARY OF THE INVENTION

The present invention provides a method and apparatus for determining desired information about an x-ray photon event in a detector such as a semiconductor detector or a gas detector. As mentioned above, the term "x-ray" is used in a generic sense—to denote photons of energies typically above 3–4 keV, specifically including such photons generated from nuclear decays (i.e., gamma rays). Embodiments of the invention allow the determination of one or more quantities of interest, for example the photon's energy, its point of interaction within the detector, and time of interaction.

The techniques of the invention work well with charge carriers of only a single polarity and thus are suitable for both elemental and compound semiconductor detectors. The invention is particularly beneficial for the latter, where it is otherwise difficult to obtain accurate energy values. Further, if position is the information of interest, since the invention produces lateral location information on a finer scale than that of the electrode structure, it also alleviates many of the pixelation problems common to current imaging detectors.

In brief, the invention contemplates generating, for each electrode j in an electrode array a primary signal $q_j(t)$ representing the time varying charge induced in the electrode by the motion of drifting mobile charge carriers arising from the photon, and then, for at least some electrodes, generating a secondary signal which depends on the primary signal from at least one other electrode. The secondary signal is then analyzed to provide a quantity of interest. The particular form of the secondary signals and their analysis depend on the quantity of interest. For some quantities of interest, the secondary signal for a given electrode may include the primary signal for that electrode, but for other quantities of interest the secondary signal may be determined by primary signals from neighboring electrodes only.

In specific embodiments, the secondary signal for electrode i is a weighted sum that includes the primary signal $q_k(t)$ for at least one other electrode k, and may or may not include the primary signal $q_i(t)$ for electrode i. In this application, the term "weighted sum" is used broadly. Thus, the weighted sum could include the case where the contributing primary signals have equal weights.

In specific embodiments, the present invention contemplates fabricating a pixelated electrode structure on one side of a volume of semiconductor material and connecting charge sensitive preamplifiers to these pixels. The pixels are typically on the surface of the block of semiconductor material from which the detector is fabricated, but could be embedded. To measure the energy of the absorbed x-ray, a weighted difference (weighted sum with coefficients of opposite sign) is then formed between the signals generated by a specific pixel and those from its near neighbors. The amplitude of this weighted difference signal measures the energy of an x-ray which strikes the pixel and is formed primarily using charge carriers of only a single sign, namely those attracted to the pixels. To measure spatial location, a weighted difference is taken between signals from pixels which are near neighbors to the specific pixel. Extremal values of this difference are captured and measured relative to their values immediately following completion of the arrival of charges at the pixels. This relative difference amplitude monotonically locates the x-ray's interaction location on the intermediary pixel. The weighting constants used to generate both the energy and location determining signals may be adjusted to optimize performance for different pixel dimensions, detector dimensions, and the charge transport constants of the semiconductor material employed.

More specifically, one particular embodiment comprises a detector formed from a block of the compound semiconductor CdZnTe which is X wide by Y deep by Z thick. The detector cathode is a single contact of dimensions approximately X by Y. The anode contact is pixelated into N parallel stripes of dimension w by Y, separated by gaps of dimension g, where N times the sum of w and g is approximately equal to X. A negative bias is applied to the cathode, while each pixel is connected to the input of a charge sensitive preamplifier at approximately ground potential. Labeling the output of the preamplifier connected to the i-th pixel as $q_i$, the following signals are constructed:

$E_i = q_i - K_e(q_i + q_{i-1})$;

$L_i = (q_{i+1} - q_{i-1})$;

$T_i = q_i + q_{i+1} + q_{i-1}$;

and $S_i = dE_i/dt$ (i.e., the time derivative of signal $E_i$).

A discriminator circuit inspects the signal $T_i$ to produce a "start time", which is approximately the instant when the x-ray absorbs in the detector. An edge sensitive detection circuit inspects the signal $S_i$ to produce a "stop time", which is approximately the instant when the electrons generated by the x-ray absorption arrive at the anode pixel i. The time difference between these two signals, plus a knowledge of the velocity of electrons in the detector, allows the interaction location z of the x-ray in the detector's Z dimension to be estimated. The change in the signal $E_i$ between the time before "start" and after "stop" is a measure of the absorbed x-ray's energy and may be measured using any of the various shaping amplifier systems common to the art. To determine the x-ray's interaction location x within the w dimension of pixel i, two values of the signal $L_i$ are required: its maximal value between the "start" and "stop" signals, which may be found from a peak detector circuit, and its value immediately after the "stop" signal, which may be obtained using a capture and hold circuit. The difference between these two values measures the location x of the x-ray absorption event across the i-th pixel. Alternatively, the signal $L_i$ may be filtered using a trapezoidal filter with appropriately selected shaping time constants and the peak output value of this filtered signal $F_i$ used as a measure of the location x.

The invention can also be embodied with rectangular pixels or crossed stripes. In the rectangular pixel geometry, two different $L_i$ signals are generated using differences between the pixel's neighbor signals in the X and Y dimensions separately to independently measure locations x and y in these two dimensions. This approach uses carriers of only a single polarity and is capable of processing more than one x-ray in the detector simultaneously, but requires a large number of electronic circuits. In the crossed stripe geometry, one set of stripes measures location x in the X dimension using charge carriers of one polarity and location y in the Y dimension using charge carriers of the other polarity. This geometry is particularly favorable when the semiconductor is a material such as germanium, whose electron and hole mobilities are both high. It uses a much smaller number of circuits and is therefore less expensive than the rectangular pixel approach but can only handle a single x-ray in the detector at a time. It is thus best used in lower count rate applications.

A further understanding of the nature and advantages of the present invention may be realized by reference to the remaining portions of the specification and the drawings.

BRIEF DESCRIPTION OF THE DRAWINGS

FIG. 21 shows the electrode configuration in a specific embodiment of the invention detector which uses rectangular pixel electrodes to obtain lateral position information in both X and Y dimensions;

FIG. 22 shows the electrode configuration in a specific embodiment of the invention detector which uses crossed stripe electrodes to obtain lateral position information in both X and Y dimensions;

FIG. 23 shows the time evolution of the signal $L_i$ following x-ray absorption events at 6 depths in the detector shown in FIG. 21.

DESCRIPTION OF SPECIFIC EMBODIMENTS

1. Physical Configuration of a Detector with X Lateral Sensitivity

Figure 1A:
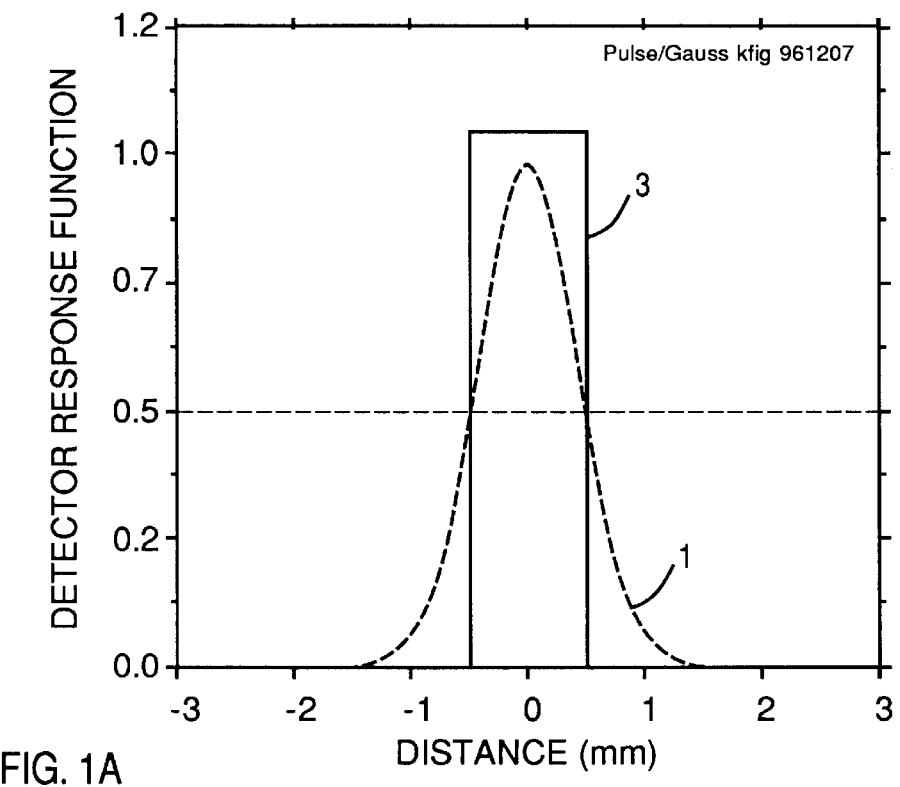
FIG. 1A shows idealized point spread functions (PSFs) for two position sensitive x-ray detectors, one with continuously sensitive detection medium and one with a pixelated detection medium.
Figure 1B:
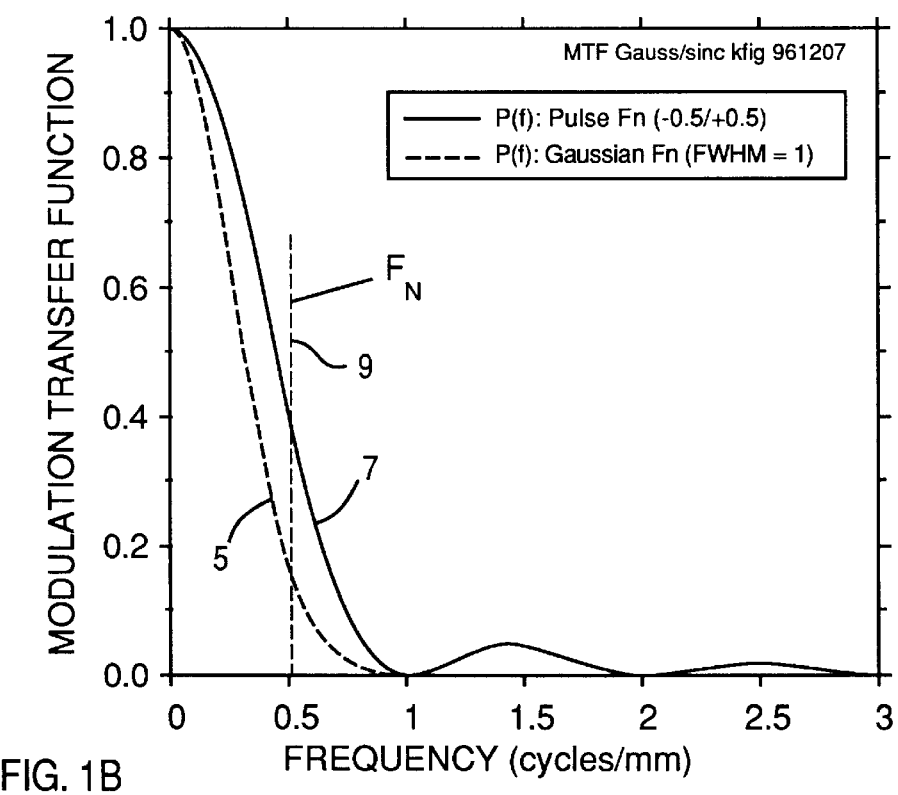
FIG. 1B shows the modulation transfer functions associated with the two PSFs shown if FIG. 1A.
Figure 2:
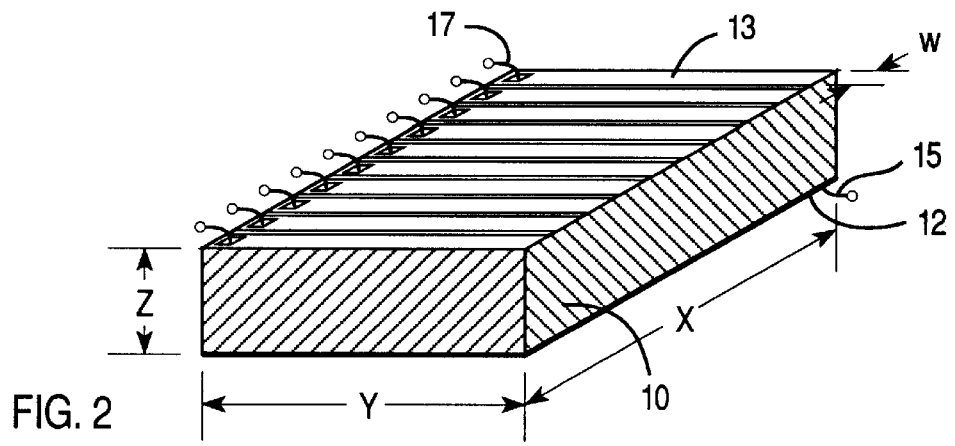
FIG. 2 shows the electrode stripe configuration and biasing in a specific embodiment of the invention detector which obtains lateral x-ray event positional information in the X dimension.

FIG. 2 shows an embodiment of the invention detector which is intended to obtain lateral position information in one dimension (X) about the location of an x-ray absorption event in the detector. The detector comprises a block of semiconductor material 10 of width X, depth Y, and height Z. One face of the block has a single electrode 12, of approximate dimension X by Y. The opposing face is covered by N stripe electrodes 13, each of approximate dimension $w_s$ (subscript s for "stripe") by Y, separated by gaps of approximate dimension g, where the product $N(w_s+g)$ approximately equals X. The gap is typically a small fraction of the stripe width, say less than 10–20%, and possibly less than 1%. N will typically have a value of order 10 or larger, but the operation of the invention does not depend upon N having any particular value.

The precise dimensions, materials, means of application, etc. of the electrodes will vary according to the composition of the block 10, since different recipes and procedures have been developed to apply high quality contacts to each different semiconducting material. Thus, for example, the electrodes might be ion implanted, diffused, sputtered, or evaporated, and, once applied, may form junction, ohmic contacts, Schottky barriers and so forth. Further, in order to minimize contact leakage currents which degrade spectroscopic performance, it may be necessary to place guard rings about either individual pixels or the set of N contacts. The techniques of electrode application and optimization are well known to those skilled in the art of semiconductor detector fabrication. The operation of the present invention only requires that the electrodes be applied in a manner so that, when a voltage is applied to the detector, an internal electric field is developed to allow the collection of charges generated by x-ray absorption events. For the purpose of applying the voltage and collecting these charges, one contact 15 connects to the single electrode 12 and each electrode stripe 13 has its own contact 17. The application of these contacts is readily accomplished by one skilled in the art and is not claimed as part of this invention.

In semiconductor embodiments, the electrodes are typically formed on or near the outer surface of the semiconductor block, although there is no need for the electrodes to cover the entire surface. Further, for some embodiments, including those where the detector material is other than a semiconductor (e.g., a gas), the electrodes could be embedded within the volume of material (the semiconductor block or the volume of gas). Therefore, terms such as "detector volume" or "volume of detector material" should be understood to refer to the volume that is bounded by the electrodes rather than the total volume of material. Similarly, when reference is made to electrodes being formed on a surface of the volume of detector material, it should be understood that the surface may be an embedded surface or that the surface may be smaller than an external surface of the material.

2. Coordinate Systems for Describing X-ray Event Locations

Figure 3:
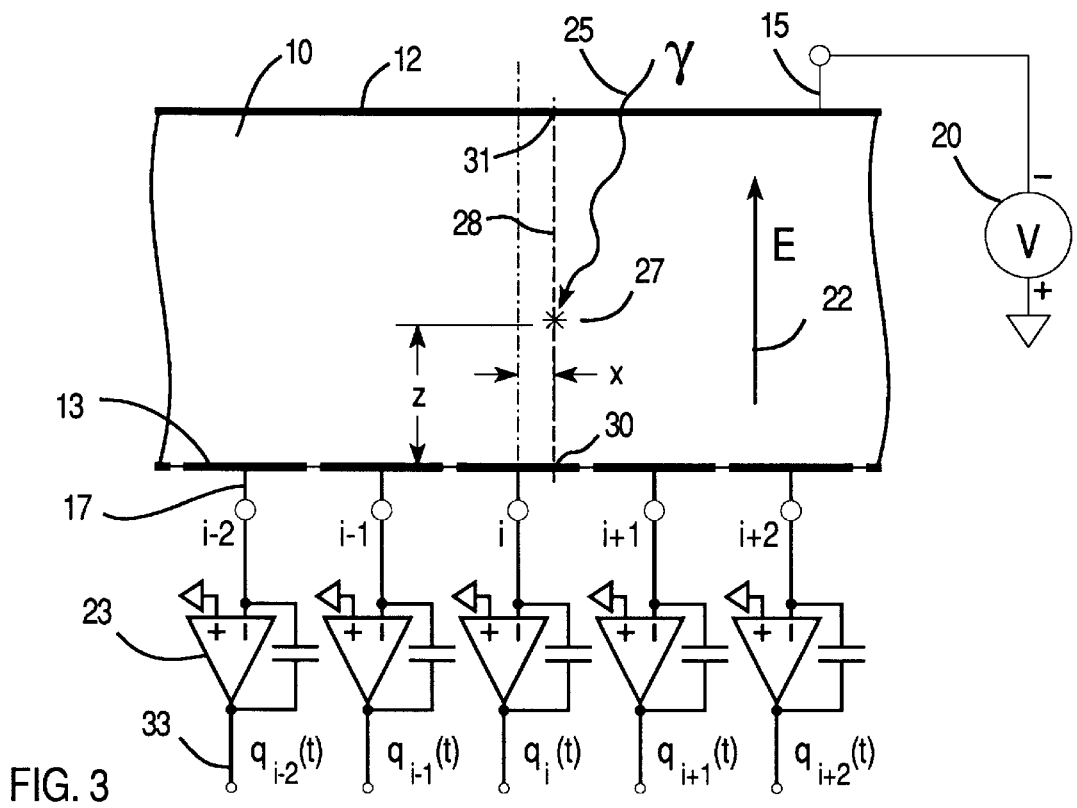
FIG. 3 is a cross sectional view of the detector structure of FIG. 2 which shows an x-ray absorption event in the detector body in order to establish reference coordinates.

FIG. 3 shows a cross section of part of the detector in FIG. 2, viewed looking in the Y direction so that the electrode stripes 13 are perpendicular to the plane of the paper. For the sake of the present discussion, the semiconductor material is taken to be CdZnTe (CZT), whose charge carrier transport properties are illustrative of the compound semiconductors. As will become clear, however, the operation of the invention does not depend upon having a specific set of transport properties. Since electron mobility in CZT (1000 cm$^2$/V-s) is an order of magnitude larger than hole mobility (80 cm$^2$/V-s), which is the common situation in the compound semiconductors, the voltage source 20 is connected to contact 15 with its polarity such that the single electrode 12 becomes the cathode and the internal electric field E 22 causes the electrons to be collected on the stripe anode electrodes 13.

Each stripe anode 13 is connected by its contact 17 to a low noise, charge sensitive preamplifier 23 as indicated schematically in FIG. 3. The details of making low noise charge sensitive preamplifiers and attaching them to detectors are well known to those skilled in the art and are not claimed as part of this invention. FIG. 3, as noted above, shows only part of the entire detector shown in FIG. 2, namely a subset of stripes in the vicinity of a typical stripe indexed "i". These include the nearest neighbor (NN) stripes i−1 and i+1, and the next nearest neighbor (NNN) stripes i−2 and i+2. These indices will be used throughout the following discussion to identify not only the stripes but also any currents that flow in them, circuits attached to them, and so forth.

We now assume that an x-ray 25 (denoted γ in FIG. 3) passes into the body 10 of the detector and is absorbed at some location 27 above stripe i. This location is described as occurring at height z above stripe i, where z varies from 0 to Z, and at distance x from the centerline of stripe i, where x varies from $-(w_s+g)/2$ to $+(w_s+g)/2$. Later, when the location in the Y direction is also required, its value y will be similarly determined relative to a pixel's centerline.

When the x-ray is absorbed it generates a cloud of n electron-hole ($e^-$-$h^+$) pairs according to the standard formula $$n = E_x/\epsilon \tag{2}$$

where $E_x$ is the x-ray's energy and $\epsilon$ is the $e^-$-$h^+$ formation energy. In CZT $\epsilon$ is approximately 4.4 eV/pair, compared, for example to values of 3.6 eV/pair in Si and 2.95 eV/pair in Ge. These charges then separate and drift, under the influence of the electric field E 22, in opposite directions along path 28 until they impact the electrodes. The electrons impact the anode at site 30, the holes impact the cathode at site 31, both of which are located at value x in the X direction. The motion of these drifting charges in turn induces currents in the stripe anodes 13, which pass via contacts 17 to the charge sensitive preamplifiers 23, which integrate them to produce the time varying charge signals designated $q_i(t)$ 33 in FIG. 3. The fact that it is charge induction which causes currents to flow in the electrodes, and not the actual arrival of the generated charges thereto, has been known and appreciated in the detector literature for many years, particularly in the field of wire chamber detectors. (See, V. Radeka, "Low Noise Techniques in Detectors" in Ann. Rev. Nucl. Part. Sci., Vol. 28, 217–277 (1988) and references therein.) The application of these concepts to improving performance in solid state detectors, however, is a very recent phenomenon, as discussed in Background §2.3.3 above.

3. Induced Charge Signals

The charges induced in the stripe electrodes can be computed by a variety of means. See, for example, the works by Barrett and Eskin and references therein. [H. H. Barrett, et al., "Charge transport in arrays of semiconductor gamma-ray detectors", in Phys. Rev. Lett., Vol. 75, pp. 156–159 (1995); J. D. Eskin, et al., "The Effect of Pixel Geometry on Spatial and Spectral Resolution in a CdZnTe Imaging Array", in Conf. Record, IEEE Nuclear Science Symp. (San Francisco, Calif. Oct. 21–28, 1995), pp. 544–548.] In the present case, for convenience, we use a different method which is equivalent to those in the literature. First we use the method of image charges to write an expression for the electric field at the anode surface. Next we apply Gauss's Law to find the charge per unit area induced in the anode to support this electric field. Third, we directly integrate over an anode stripe area to find its total charge as a function of the location of the generated charge. Finally, we take differences as a function of drifting charge location to find the integrated current signals $q_i(t)$ 33 output by the preamplifiers 23.

Figure 4:
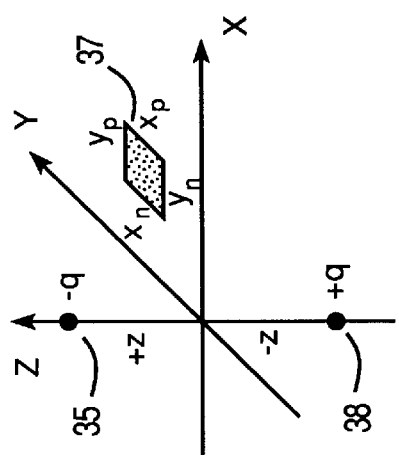
FIG. 4 establishes a coordinate system for discussing the induction of charge in detector electrodes.

FIG. 4 shows the geometry of the situation. A single charge 35 of value $-q$ is located at distance $+z$ above the X-Y plane, which, being comprised of electrodes, is conducting. A pixel electrode, 37 whose charge we wish to find, is located between the X values $x_n$ and $x_p$ and the Y values $y_n$ and $y_p$. As is well known from electrostatics, the potential distribution caused by such a point charge ($-q$) 35 at a distance z from an infinite conducting plane at z=0 (field lines must be everywhere normal to the conductor) is solved by placing an image charge $+q$ 38 on the other side of the conductor at $-z$. If the conducting plane is subdivided into a dense set of pixels, then the induced charge on a single pixel 37 (see FIG. 2) can be found from Gauss' Law as:

$$4\pi q = \oint_{pixel} E \cdot n\, da \tag{3}$$

where E, the electric field from the charge pair, is found from the gradient of the potential in the usual manner, and n is the surface normal vector, which in the present case is a unit vector in the Z direction.

Figure 5:
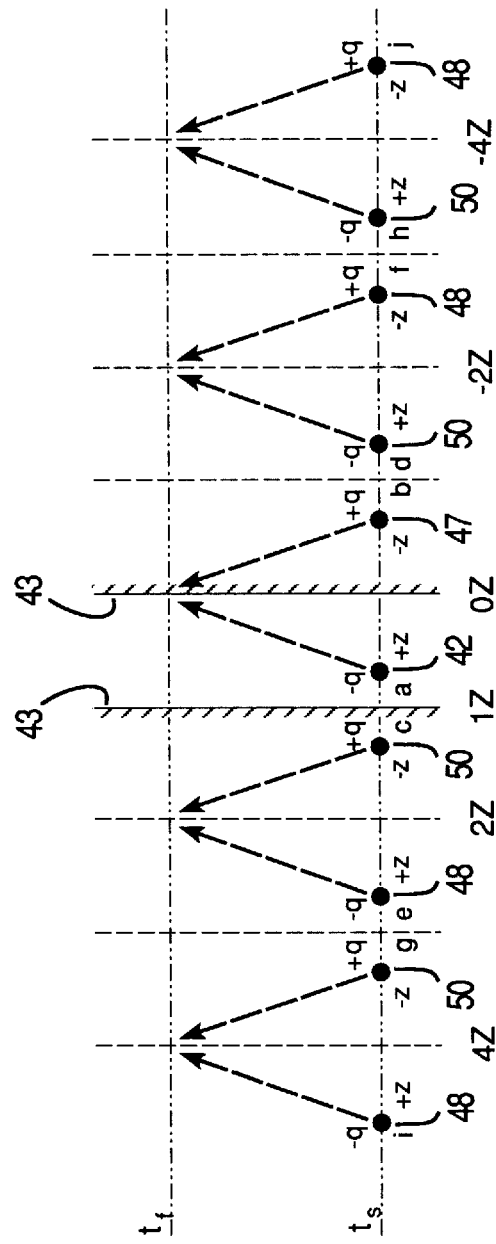
FIG. 5 shows the locations of the image charges induced by a charged particle between a pair of conducting electrodes and indicates their motions as the charge moves to be collected by one of the electrodes.

In the present case, however, the generated charge q 42 is located between a pair of conducting electrode planes 43. In this case, the original charge generates image charges in both planes, these generate their own images in the other planes, and the process repeats to infinity (just like the images seen when one stands between a pair of mirrors). Thus the initial charge 42 generates the image charge 47 through the z=0 plane and it in turn generates the sequence of image charges labeled 48. The initial charge 42 similarly generates the sequence of images labeled 50 by initial reflection through the z=Z plane. This infinite set of charges generates the Green's function solution to the field problem, as noted by Barrett and Eskin. A subset of the resulting infinite set of image charges is shown in FIG. 5, where the initial set of electrode planes 43 are hatched and located at z=0 and z=Z. In finding a solution that converges quickly, it is important to note that the image charges naturally occur in pairs (shown by the dashed arrows) which converge upon each other as the original image charge pair (at $\pm z$ at $t_{start}$) converges to meet at the z=0 electrode plane at $t_{stop}$ due to the motion of the drifting charge 42 within the body of the detector under the influence of the applied internal electric field. By always including image charges in sets of four (a converging pair and their image on the other side of the 0Z plane) we can work with small numbers of image pairs and still obtain good convergence properties. It should be noted that, while the applied internal electric field also induces charges on the electrodes according to Eqn. 3, this field is time invariant so that these charges are fixed and can be ignored in the time variant problem.

If we index rectangular pixels such as the one shown in FIG. 4 by the indices i and j in the X and Y directions respectively, then it is just an exercise in integral calculus to compute the charge $Q_{ijk}$ induced on pixel$_{ij}$ by a single pair of charges ($-q$ located at $z_k$ and $+q$ located at $-z_k$). This answer is:

$$Q_{ijk} = \frac{qz}{2\pi} \int_{x_{in}}^{x_{ip}} dx \int_{y_{jn}}^{y_{jp}} \frac{dy}{(x^2 + y^2 + z_k^2)^{3/2}} \tag{4}$$

$$= \frac{q}{4\pi} \left\| \sin^{-1}\left( \frac{X_{i\pm}^2(Y_{j\pm}^2 - z_k^2) - z_k^2(y_{j\pm}^2 + z_k^2)}{X_{i\pm}^2(y_{j\pm}^2 + z_k^2) + Z_k^2(y_{\pm j}^2 + z_k^2)} \right) \right\|_{X_N}^{X_P} \bigg|_{Y_N}^{Y_P}$$

where the fences are used to represent the four terms found by replacing $x_{i\pm}$ and $y_{j\pm}$ with the appropriate integration limits $x_p$, $x_n$, $y_p$, and $Y_n$ associated with pixel$_{ij}$. Thus the complete solution (for the initial charge $-q$) consists of Eqn. 4 with $z_0=z$ plus sums of pairs of Eqn. 4 corresponding to the sets of four image charges noted in the previous paragraph. The dependence of the induced charge $Q_{ijk}$ upon the integration limits $x_p$, $x_n$, $y_p$, and $Y_n$ associated with pixel$_{ij}$ shows that, obviously, the induced charge depends upon the pixel dimensions.

A real x-ray absorption event, of course, creates both a cloud of electrons ($-q$) and holes ($+q$) at the initial height z. Being of equal magnitude, but opposite polarity, their induced charges on all electrodes initially cancel. As the electrons and holes drift apart under the influence of the electric field 22, their induction terms no longer balance and net charges are induced on the electrodes. The fully time evolved solution to the problem thus involves adding two solutions of the form described in the previous paragraph, one for the electrons moving toward the anode electrodes 13 and one for the holes moving toward the cathode electrode 12. The charge carriers' velocities are determined by their mobilities times the applied electric field 22.

For a completely general description of the charge induced in the anode stripes, carrier charge trapping must be accounted for. This can be handled in a straightforward manner by noting that the induced charges depend only upon the locations of the carrier charges and that electrostatics problems are linear. Thus, if $q_n$ of untrapped charge reaches location $z_n$ at time $t_n$, and $\Delta q_n$ is trapped in the time increment $\Delta t$ between $t_n$ and $t_{n+1}$, the induced charge $Q_{ijk}(t_{n+1})$ can be found from the induced charge $Q_{ijk}(t_n)$ according to the recurrence relation:

$$Q_{ijk}(t_{n+1}) = Q_{ijk}(t_n) + (q_n - \Delta q_n)(U_{ijk}(z_{n+1}) - U_{ijk}(z_n)) \quad (5)$$

where the unit induced charge $U_{ijk}(z)$ is found by dividing Eqn. 4 by q and summing over the appropriate sums of pairs, as discussed above. The use of Eqn. 5 is particularly simplified since the $Q_{ijk}(0)$ values of the electrons and holes cancel and hence can be set to zero.

Trapping effects are not included in the CZT results presented below, however, because typical electron transit times (250 ns or less) were much shorter than typical 5 μs hole trapping times, resulting in at most a 5% error in hole component terms. Further, it will be seen that the hole terms are only large when the x-ray absorption occurs close to the anode and the electrons have short distances to travel. Thus, in practice, the error terms from ignoring trapping effects in the specific embodiment presented here are further reduced and are probably less than approximately 1 percent. The resulting induced charge collection model therefore simply follows charge separation at equal time intervals, computing the electron and hole locations separately, using their appropriate mobilities in the applied electric field. At each step the induced charge is computed, using Eqn. 4 out to a preset number of image quads (four was typically adequate), for the electrons and holes separately and the results summed. Since we are primarily interested in working only with electrons in the present CZT implementation, the computations were only carried out to 120% of the full electron transit time, that is, the time required for the electrons to drift across the full detector thickness Z.

4. Primary Induced Charge Signals $q_i(t)$ on the Electrodes

In order to explain the present invention detector's operation it is necessary to examine the signals generated on individual stripes. We therefore use the computational procedures described in the previous section to compute the time dependent, integrated charge signals $q_i(t)$ on a stripe i and its first and second nearest neighbors, assuming a specific detector geometry consisting of a one dimensional array of identical stripes. There is no specific need in the general invention detector for the geometry of the pixels to be identical, but the assumption greatly simplifies the presentation and the ease with which it may be comprehended.

Figure 6A:
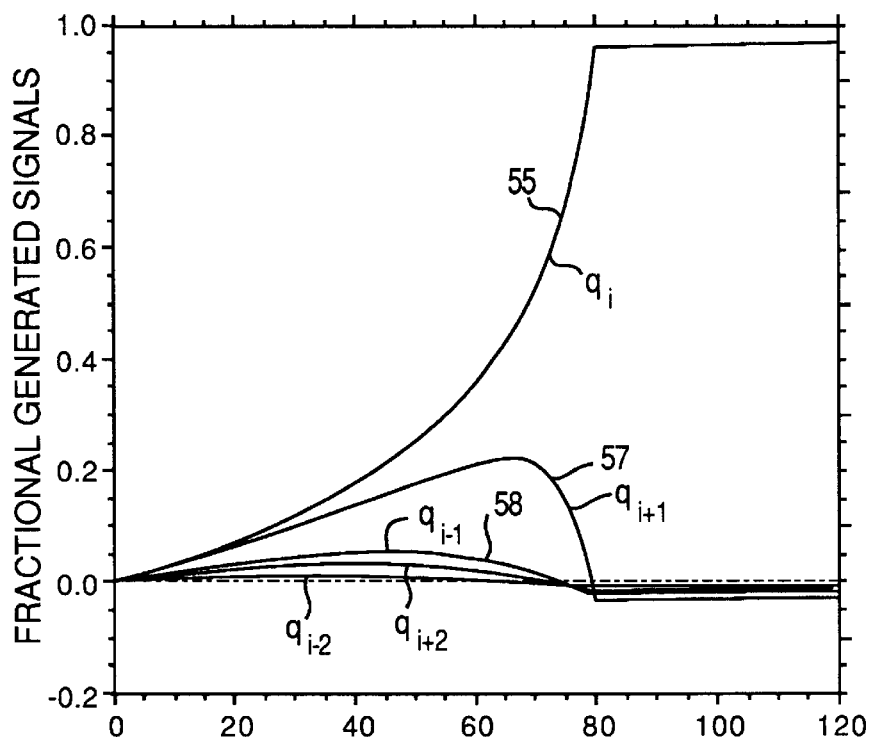
FIGS. 6A and 6B show the time evolution of the integrated charge signals generated by a particular stripe i and its 1st and 2nd nearest neighbors in response to x-ray absorption events occurring at two different locations, relative to stripe i, in the detector shown in FIG. 2.
Figure 6B:
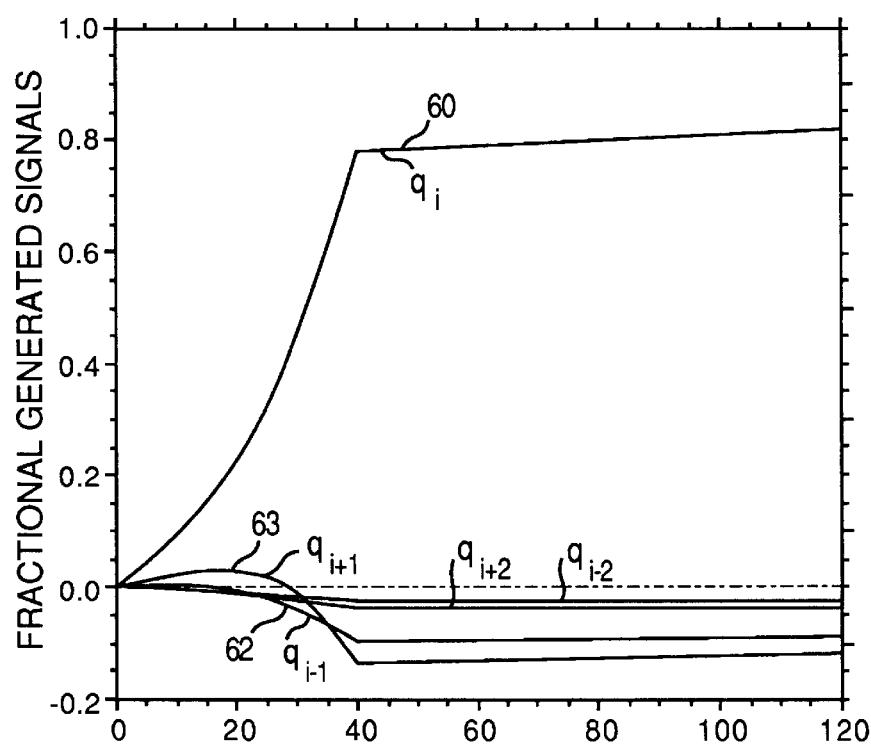

FIGS. 6A and 6B show results for a CZT detector which is 5 mm thick with 1000 Volts applied bias. The electrode stripes are 2 mm wide by 10 mm long. The maximum electron crossing time is 250 ns, the maximum hole crossing time is 3.12 μs. In FIG. 6A the value of z was 4 mm, so that the electrons cross 80% of Z and x was taken to be +35% of the stripe width $w_s$ (i.e., 1.7 mm from $stripe_{i-1}$ and 0.3 mm from $stripe_{i+1}$. In FIG. 6B the value of z was 2 mm, so that the electrons only cross 40% of Z and x was taken to be +15% of the stripe width $w_s$ (i.e., 1.3 mm from $stripe_{i-1}$ and 0.7 mm from $stripe_{i+1}$.

In FIG. 6A the interaction is relatively far from the anodes so that the induced hole charges are generally small. Thus we see the induced charge signal $q_i$ 55 on $stripe_i$, the stripe lying directly below the interaction site, increase monotonically as the electrons approach. The rate of increase rises steadily as the electrons approach the stripe both because the strength of the electrons' electric field increases as they get closer and because the electrode's solid angle also increases. Once the electrons reach $stripe_i$, at 80% of the electron crossing time, all their image charge pairs annihilate one another and induce no additional charges. At this point, the total charge induced on $stripe_i$ by the electrons equals q, the value of the charge generated by the x-ray absorption. $q_i$ 55, however, is less than this value because the holes, which are still in transit, are still inducing a negative charge on $stripe_i$. Since the interaction point was well removed from $stripe_i$, this effect is relatively small and $q_i$ is fractionally about 95% of q, the generated charge. Past this point $q_i$ increases much more slowly as the holes continue to move away from $stripe_i$ and their negative induced charge decreases.

The induced charge signal $q_{i+1}$ 57 on the closer NN $stripe_{i+1}$ has a rather different behavior. When the electrons are far away they induce charge on $stripe_{i+1}$ much as on $stripe_i$, since the solid angles of the two stripes are similar. However, on closer approach, the electric field seen by $stripe_{i+1}$ finally reaches a point where it begins to decrease as the separation between the electrons and their image charge becomes small compared to the distance to $stripe_{i+1}$. This is an important point: that the separation between the moving charge and its image sets a distance scale that determines which neighboring stripes will have significant induced charge values. As the electrons' separation from the anode $stripe_i$ finally reaches zero, their electric field on $stripe_{i+1}$ (and in fact on all other stripes) becomes zero, so that there is no net induced charge remaining at that point. This conclusion, that the only stripe on which there is a net induced charge after the electrons have been "collected" is the stripe on which they are physically collected (impact), has been known for some time. See, for example, the above referenced work by Radeka. The appearance of this behavior is an indication that the present model is functioning correctly. This conclusion will be modified in the obvious manner if charge trapping occurs, since the trapped charges remaining in the bulk will continue to induce charges on the electrodes after the untrapped charges have been collected. In the case of $stripe_{i+1}$, therefore, after the electrons have been collected at 80% of the electron transit time, the residual induced charge $q_{i+1}$ 57 is due to the holes, which have not finished moving. The sign of this charge is negative, since the holes are positive, and its magnitude decreases as the hole move further away, toward the cathode. In the absence of trapping effects, when the holes finally reach the cathode the net charge they induce will be zero on all the anode stripes, including $stripe_i$, since they were collected on the cathode. At this point the charge $q_i$ 55 induced on $stripe_i$ will equal the total originally generated electron charge. Thus, from the view of a slow external circuit, it appears as if the total generated charge was indeed collected on $stripe_i$ (as opposed to being induced upon it) and this point has been the source of considerable confusion in the minds of detector designers and users over the years.

From the point of view of the present invention, however, this distinction is very important since the invention exploits the fact that the non-zero, time varying, values of the induced charge signals on the "non-collecting" stripes carry additional information about the x-ray absorption event which can be used to advantage.

Thus, for example, in FIG. 6A, we see that the maximum charge value $q_{i+1}$ 57 induced on stripe$_{i+1}$ is much larger than $q_{i-1}$ 58 induced on stripe$_{i-1}$ because the former is much closer to the electron impact point 30 than is the latter. Because stripe$_{i+2}$ and stripe$_{i-2}$ are even further away, the maximum charges induced on them are smaller still. $q_{i-1}$ and $q_{i+1}$ can therefore be used to infer information about the location x of the impact point 30 on stripe$_i$. Further, once electron collection is completed to stripe$_i$, the values of $q_{i-1}$ 58 and $q_{i+1}$ 57 on stripe$_{i-1}$ or on stripe$_{i+1}$ are due only to hole induction and can also be used to estimate and remove the hole induction contribution to $q_i$ 55.

FIG. 6B shows a similar situation to FIG. 6A except that z equals only 2 mm, so the x-ray generated charges are initially much closer to the anode stripes than in the case shown in FIG. 6A. The primary consequence of this is that the charge component initially induced by the holes is much larger than in the previous case. Thus, for example, when electron collection is complete (at 40% of maximum electron transit time), the fractional value of $q_i$ 60 induced on stripe$_i$ has only reached about 80% of the initially generated charge q, the 20% difference being due to hole charge induction. Negative, hole induced charges $q_{i-1}$ 62 and $q_{i+1}$ 63 of similar magnitude (9 and 14% respectively) remain on stripe$_{i-1}$ and stripe$_{i+1}$ at the same instant. The charge values remaining on the other stripes are smaller, since these stripes are further removed from the electron impact site 30. Further, because the impact location x is +15% of the pixel width instead of +35%, as in FIG. 6A, the electron induced term in $q_{i+1}$ 63 is smaller and starts to decline sooner, relative to the time of electron impact, because the distance between impact point x 30 and stripe$_{i+1}$ is larger.

5. Generated Secondary Induced Charge Signals

In the following subsections various secondary induced charge signals $Q_{k,i}(t)$ will be generated by such operations as taking sums and/or differences of the primary charge signals $q_i(t)$ or derivatives of other secondary signals. The general form will be:

$$Q_{k,i}(t) = F_k\left[\sum_{j=i-h}^{i+h} w_{k,j} q_j(t)\right] \quad (6)$$

where the index k will be replaced by a letter evocative of the quantity to be determined (e.g., "E" for energy), and the summation is over pixels which are close neighbors to a selected i-th electrode. In Eqn. 6, the index h symbolically indexes the order of neighbors included in the summation. That is, if h equals 1, the summation is only over first nearest neighbors; if h equals 2, then the summation extends out to second nearest neighbors; etc. The values of the weighting constants will depend upon the index k, the geometric relationship between the indexed pair of electrodes, the geometries of the electrodes themselves, and the overall detector geometry, dimensions and material. The symbol $F_k$ (for "filter") indicates that the summed signal may be filtered to adjust the signal to noise characteristics of the resultant $Q_{k,i}(t)$ signal. This filtering may be explicitly applied, either before or after the summation, or may occur implicitly, as through the limited bandwidths of the amplifiers used to implement the summation. In the following equations for $Q_{k,i}(t)$ for particular k value these filter functions $F_k$ will not be shown explicitly but will be presumed to be implemented as required in specific instances.

It is also important to note that the assumption of identical stripe geometries is manifested in Eqn. 6 through the lack of dependence of the weighting coefficients $W_{k,j}$ on the index i. The more general form would have coefficients $W_{k,j,i}$ because the geometries of the neighboring stripes would be different for each stripe i.

A variety of techniques are available for generating these signals, using either analog electronics (e.g., op amps in summing configurations) or digital techniques (e.g., by digitizing the $q_i(t)$ signals and forming the sums using combinatorial logic or a digital signal processor). Because implementing these techniques is well understood by those skilled in electronic engineering, the details of such implementations are omitted from the present specification.

5.1. "Energy" Induced Charge Signal $E_i$

In the invention detector, a correction for the charges induced on electrode stripe$_i$ by the drifting holes is made using the charges they induce on its nearest neighbor stripes so that the resultant signal will be good measurement of the photon's energy. We generate the secondary signal $E_i$ according to Eqn. 6 (index k set to "E") as:

$$E_i(t)=Q_{E,i}(t)=q_i(t)-K_e(q_{i+1}(t)+q_{i-1}(t)) \quad (7)$$

In this case the summation is only over nearest neighbor stripes, so h equals 1. Thus $w_{0,i}=1$, and $w_{-1,i}$ equals $w_{+1,i}$ equals $-K_e$, where the constant $K_e$ depends upon various detector parameters, particularly the stripe geometry. Both quantities $q_{i+1}(t)$ and $q_{i-1}(t)$ are used symmetrically for the current planar geometry in order to minimize the correction's sensitivity to x, the absorption event's lateral location. This symmetry results from our assumption of identical pixels. If they were not identical, then a similar form could be used but the values of w−1,i and w+1,i would need to be adjusted separately for each index i.

Figure 6C:
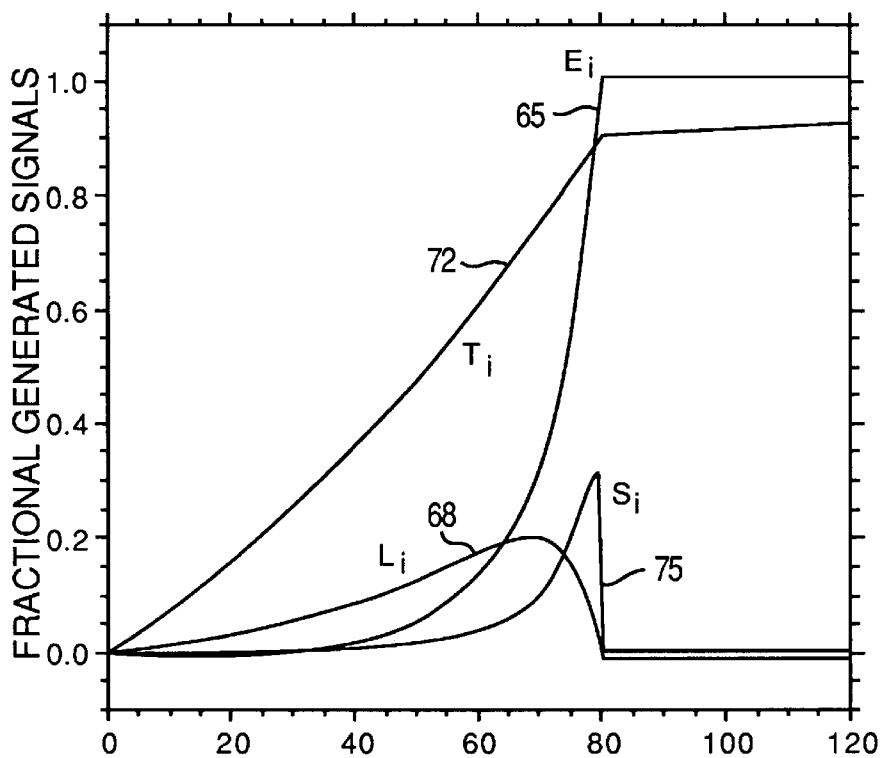
FIGS. 6C and 6D show the time evolution of the compound signals $E_i$, $L_i$, $T_i$ and $S_i$ formed from the integrated charge signals shown in FIGS. 6C and 6D, respectively.
Figure 6D:
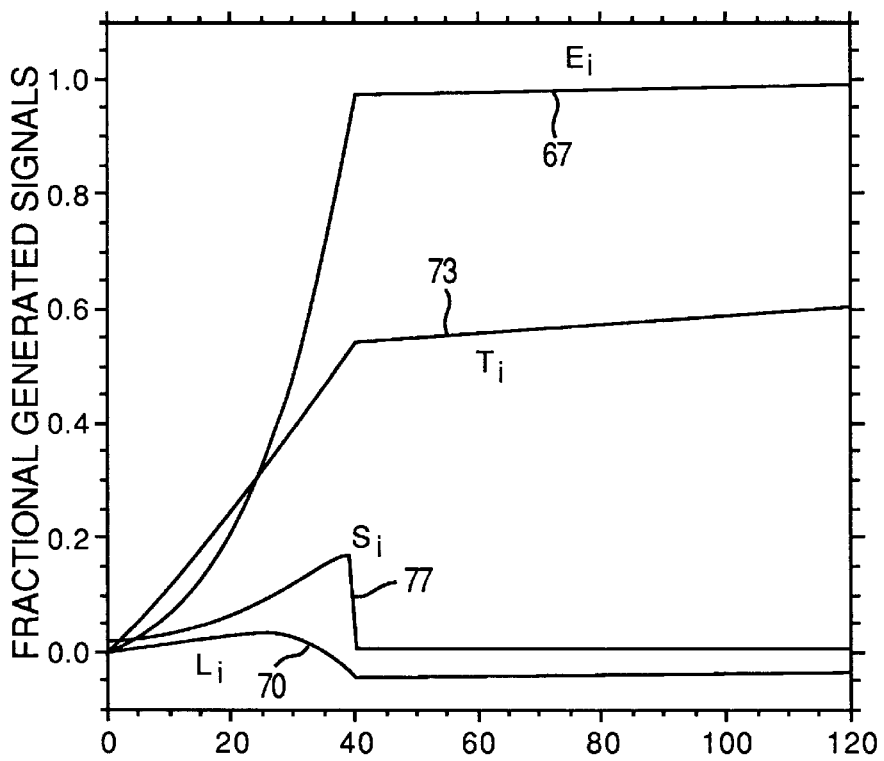

FIGS. 6C and 6D show traces of $E_i(t)$ derived from the q(t) signals in FIGS. 6A and 6B, respectively, using a value of $K_e=0.85$, and these should be compared to the uncorrected values of $q_i(t)$ in the latter two figures. Thus, where $q_i(t)$ 55 rises fairly steadily in FIG. 6A and peaks immediately after electron impact at a value of about 0.95, $E_i(t)$ 65 does not rise significantly until the electrons are within about 2 mm of the stripe$_i$ and then shoots up quite rapidly to a value very close to 1.00. In FIG. 6D, since the electrons are generated at 2 mm from stripe$_i$, $E_i(t)$ 67 starts rising immediately, with a shape very similar to the rising section of $q_i(t)$ 65 in FIG. 6C, again to a value very nearly 1.00 just after electron impact. Since the value of $q_i(t)$ 60 in FIG. 6B was only 0.80 at this point, it is clear that using Eqn. 7 significantly improves the accuracy with which the initially generated charge q, and hence the absorbed x-ray's energy, can be estimated. Eqn. 7's accuracy of will be further examined below. We observe that, to avoid dc offset issues in practice, measurements of $E_i(t)$ will be made relative to its value at or before t equals zero, the point of charge generation in the detector.

5.2. "Location" Induced Charge Signal $L_i$

In the invention detector the value of x is estimated using the secondary induced charge signal $L_i$ (for location, index k set to "L"), which is generated from Eqn. 6 according to the formula:

$$L_i(t)=Q_{x,i}(t)=q_{i+1}(t)-q_{i-1}(t)+K_L(q_{i+2}(t)-q_{i-2}(t)) \quad (8)$$

In this case the summation may extend to nearest neighbor stripes, with h equals 1, or as shown, to next-nearest neighbor stripes, with h equals 2. Thus $w_{0,i}=0$, and $w_{+1,i}$ equals 1, $w_{-1,i}$ equals −1, and $w_{+2,i}$ and $w_{-2,i}$ equal $+K_L$ and $-K_L$, respectively, where the lateral location constant $K_L$ is commonly set to zero, but may be non-zero if additional accuracy is required, as will be discussed below. The strict anti-symmetry of these values is, as per the discussion of $E_i(t)$ (Eqn. 7), due to the identical pixel geometry and not inherent to the method. If the pixels were not of identical geometries, then the weighting coefficients $w_{j,i}$ would need to be individually adjusted for each pixel i. When $K_L$ is zero, then $L_i$ is just the difference between the charge signals induced on the nearest neighbor (NN) stripes i−1 and i+1. As such, it will behave antisymmetrically about x equal to zero, with $$L_i(-x) = -L_i(+x) \quad (9)$$

Thus the signal $L_i(t)$ generated by an event at $-0.25w_s$ will be identical to, but the negative of, the signal $L_i(t)$ generated by an event at $+0.25w_s$. FIG. 6C shows $L_i(t)$ 68 for x=+0.35 $w_s$, while FIG. 6D shows $L_i(t)$ 70 for x=+0.15 $w_s$, both for a 2 mm stripe width $w_s$. The former, which is dominated by $q_{i+1}(t)$ 57, is a large signal which peaks fairly closely to the electron impact time. The latter, which is the difference between the two more nearly equal signals $q_{i-1}$ 62 and $q_{i+1}$ 63, is much smaller in amplitude and has a significant hole induction term following the electron impact time. The use of these signal to estimate x values will be described in detail in §8 below.

5.3. Timing Signals $T_i(t)$ and $S_i(t)$

For various reasons it is beneficial to be able to measure the electron transit time in the invention detector. First, this allows the x-ray interaction depth z to be measured, since the electrons' drift velocity can be either measured or computed. In certain applications or detector orientations, locating z is of direct interest, since, coupled with x determination, it allows this implementation to be used as a 2 dimensional imaging detector instead of just a 1 dimensional detector. Second, as will become clear in §6 below, the hole correction to $q_i$ implemented by Eqn. 7 does not work with equal efficacy over all values of z. Therefore, if the highest energy resolution and least spectral distortion are desired, it becomes advantageous to reject x-ray events occurring at z values for which the correction is less effective. This can be readily done using timing information.

Looking at FIGS. 6A–6D it is clear that none of the $q_i(t)$ signals nor either $E_i(t)$ or $L_i(t)$ is very satisfactory for this purpose. Comparing $q_i(t)$ 55 and 60, we see that the initial rise times of $q_i(t)$ signals depend strongly on z and, comparing $E_i(t)$ 65 and 67, that these signals are even worse. $L_i(t)$, particularly for small z, as in FIG. 6D, may show little or no initial rise.

We therefore generate a secondary induced charge signal $T_i(t)$ (for timing start, index k set to "T") from Eqn. 6 according to:

$$T_i(t) = Q_{T,i}(t) = q_{i-1}(t) + q_i(t) + q_{i+1}(t) \quad (10)$$

Only nearest neighbor terms are used, although additional neighbor terms may be added to increase the signal size, if desired. Thus h equals 1 and $w_{T,0}$ equals $w_{T,+1}$ equals $w_{T,-1}$ equals 1. The same disclaimer about identical pixel geometry applies here as well. As may be seen in FIGS. 6C and 6D, $T_i(t)$ 72, 73 begins rising promptly following the x-ray absorption event, has a large slope, and the slope value is relatively independent of z. $T_i(t)$ may then connected to a threshold discriminator with its threshold voltage set slightly above the noise level in $T_i(t)$. The leading edge of the pulse output by this threshold discriminator when $T_i(T)$ exceeds the threshold will therefore provide a "start" time which will be reasonably close to the actual time of the x-ray absorption event. The design, construction, and application of appropriate threshold discriminators for this purpose is readily accomplished by those skilled in the art of detector signal processing.

For a "stop" signal, we require a signal with a large, easily recognized feature occurring at the electron impact time. We can generate this by differentiating the signal $E_i(t)$:

$$S_i(t) = dE_i(t)/dt \quad (11)$$

This signal $S_i(t)$ 75, 77 is shown in both FIGS. 6C and 6D and may be seen to rise monotonically until the electron impact time, at which point it falls abruptly to zero or nearly so. This transition is large and can be easily detected by negating the output of a discriminator set for a slightly positive value. As will be shown below, using $S_i(t)$ to identify the electron impact time is also an important step in obtaining accurate x values from the $L_i(t)$ signals.

6. Optimizing $K_e$ for Energy Accuracy

As discussed in Background of the Invention, §2.3.3.2, the use of small pixels results in improved energy resolution and this results from the fact that the full electron charge is induced on the impacted pixel, while the residual hole induced charge can be very small if the pixel does not have much solid angle, as viewed by the remaining holes. However, as noted there, there are two difficulties with this approach. First, as the pixels become small they approach the dimensions of the drifting charge cloud, so than no single pixel "collects" the full charge. Secondly, as the size of the pixels becomes small, the number required to cover a useful area becomes large, which increases the complexity of the circuitry required to employ them effectively.

Figure 7A:
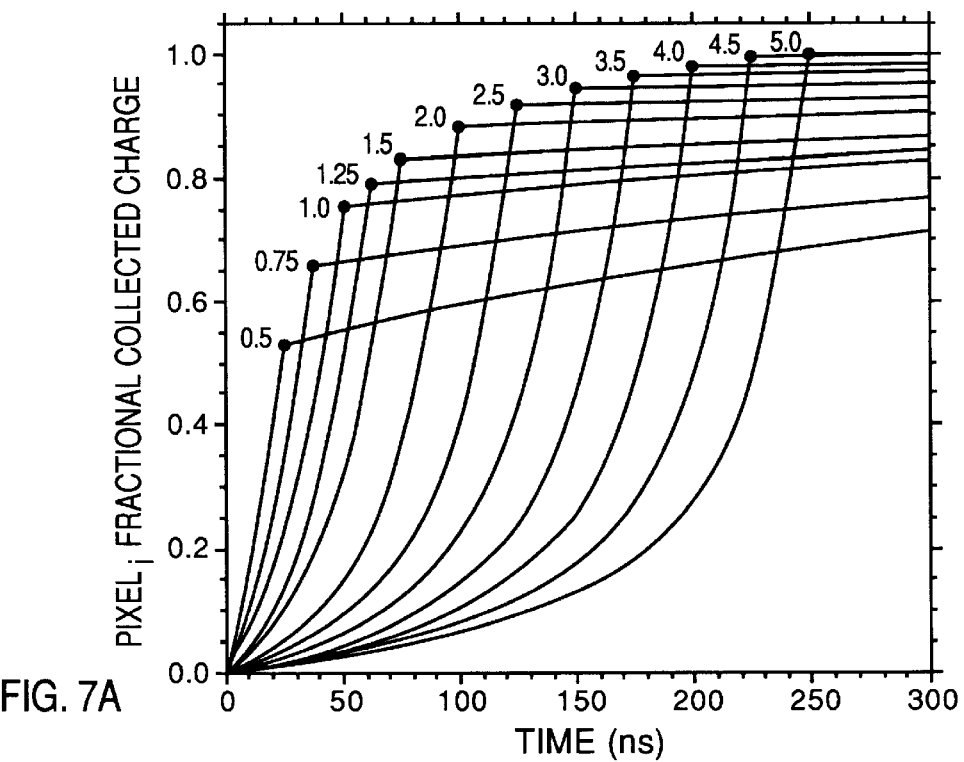
FIGS. 7A and 7B show the time evolution of $E_i$ curves as a function of x-ray interaction depth for values of $K_e$ equal to zero and 0.68, respectively.
Figure 7B:
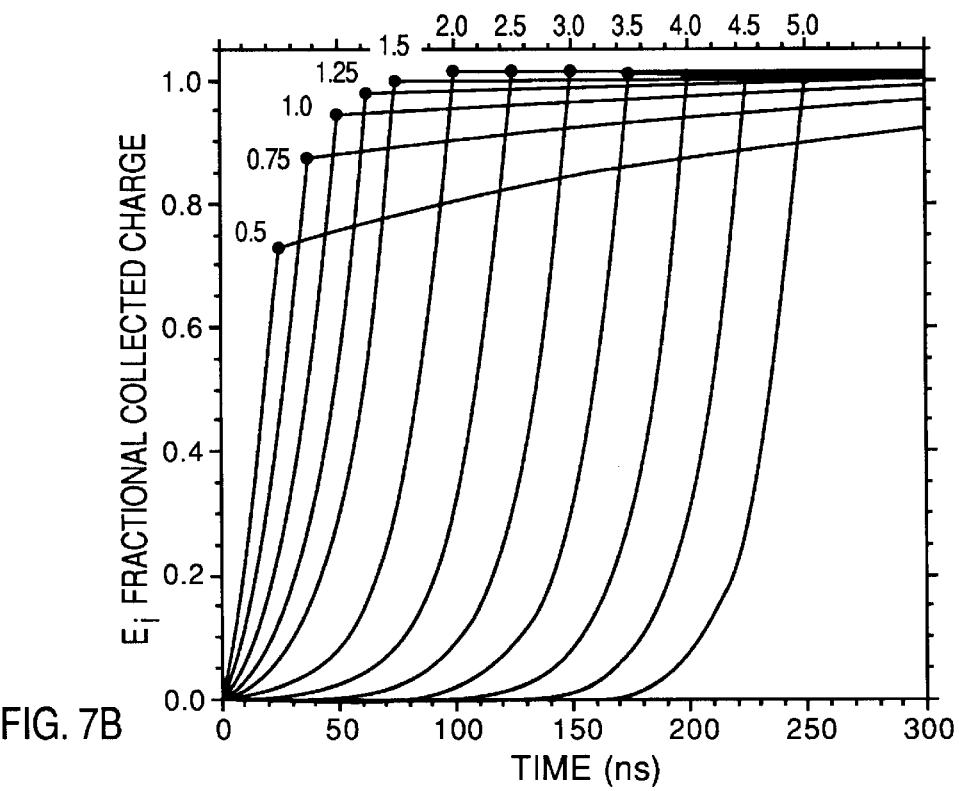

In the present case, by properly adjusting $K_e$, it becomes possible to use relatively large stripe dimensions and still obtain improved energy resolution. FIG. 7A shows $q_i(t)$ curves, for the same detector geometry and x value as in FIG. 6A, as a function of interaction height z ranging from 0.5 mm (close to anodes) to 5.0 mm (top of the detector at the cathode). The values of induced charge immediately following electron impact decrease monotonically as the interaction occurs deeper in the detector volume. Only events within the top 1 mm (20% of detector volume) produce charges that are within 2.5% of the generated value. FIG. 7B shows $E_i(t)$ values for the same detector, generated using the value $K_e$ equal to 0.85, and it may be seen that these fractional charge values immediately following electron impact are accurate to better than 1% over the top 3 mm (60% of detector volume). Even over the top 4 mm (60% of detector volume) the values are accurate to 5%. Thus using the invented signal $E_i(t)$ not only yields a significant improvement in energy accuracy (from 2.5% to 1.0%) but also increases the useful detector volume threefold. In addition, far fewer electrodes are required. Eskin et al. ["The Effect of Pixel Geometry on Spatial and Spectral Resolution in a CdZnTe Imaging Array", IEEE Nuclear Science Symposium (San Francisco, Calif., Oct. 21–28, 1995), Conference Record pp. 544–548.] reported needing approximately 300 μm square pixels to get reasonable energy resolution of a few percent. In the present case, excellent energy resolution can be obtained with a stripes 2 mm by 10 mm, which are over 200 times larger in area.

Figure 8:
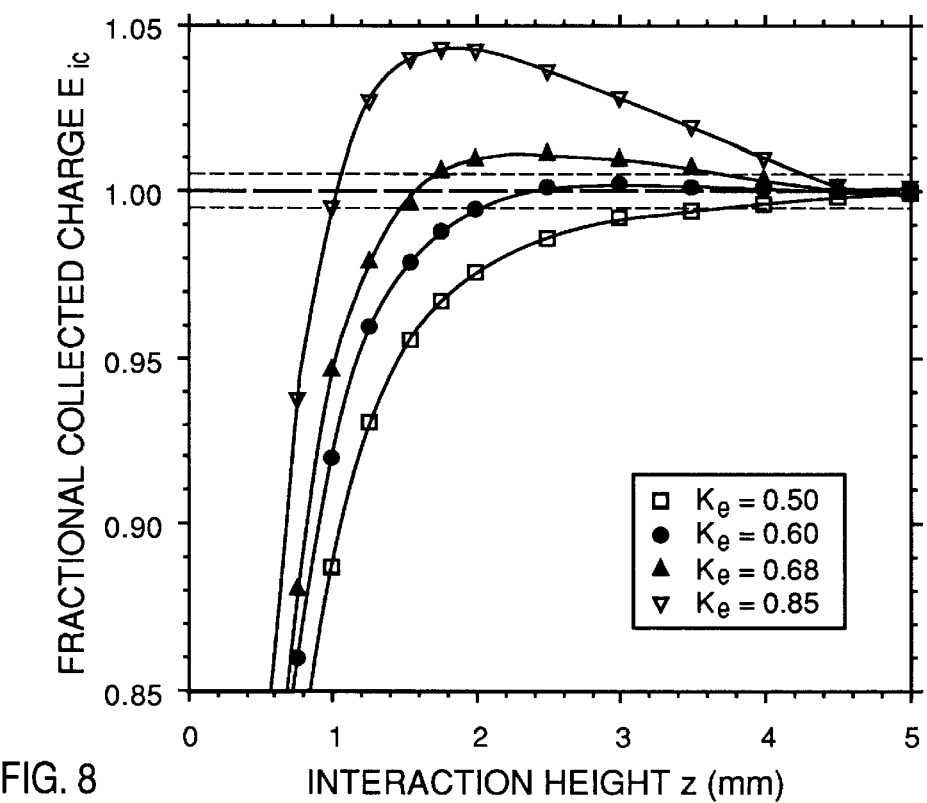
FIG. 8 shows post-collection values of $E_i$ as a function of interaction depth in the detector for four values of $K_e$.

The value of $K_e$ used in Eqn. 7 can be adjusted to achieve optimized performance for a particular geometry. FIG. 8 shows plots of the post-electron impact values of $E_i(t)$ for four values of $K_e$ for the detector with 1 mm wide stripes. It is clear that there is a value that produces an optimally flat response: $K_e$ equals about 0.60. However it may also be seen that, by making $K_e$ larger than this optimum value, it is possible to exchange degraded energy resolution for a somewhat increased useful detector volume. Thus, while $K_e$=0.60 produces results which are accurate +0.4%/−1.0% for interaction heights greater than 2 mm, $K_e$=0.68 produces results which are accurate +1.5%/−1.5% for interaction heights greater than 1.4 mm.

For many kinds of work, using the function $E_i(t)$ directly as a measurement of the x-ray energy—feeding it directly into a spectroscopy shaping amplifier and multichannel analyzer—will provide acceptable results because 60% of events will have their energies reported correctly. However, if having a background of 40% of events reported with distorted energy values poses an experimental problem, then, looking at the curves in FIG. 8, it is clear that events occurring at interaction heights z below about 2 mm must be rejected. It is important to note at this point that the use of the invented quantities $E_i(t)$, $L_i(t)$, $T_i(t)$, and $S_i(t)$ allow for the development of detectors having enhanced detection efficiency. Previously, in compound semiconductor detectors, the detector thickness was set by a tradeoff between wanting a thin detector, so that hole trapping losses would not distort the energy spectrum excessively, and wanting a thick detector, so that higher energy x-rays could be absorbed efficiently. As a result, the best detectors were typically only 1–2 mm thick. Since the present design uses only electrons, which are an order of magnitude more mobile, detector thicknesses can be correspondingly increased without significant losses of resolution but with corresponding increases in absorption efficiency.

Figure 9:
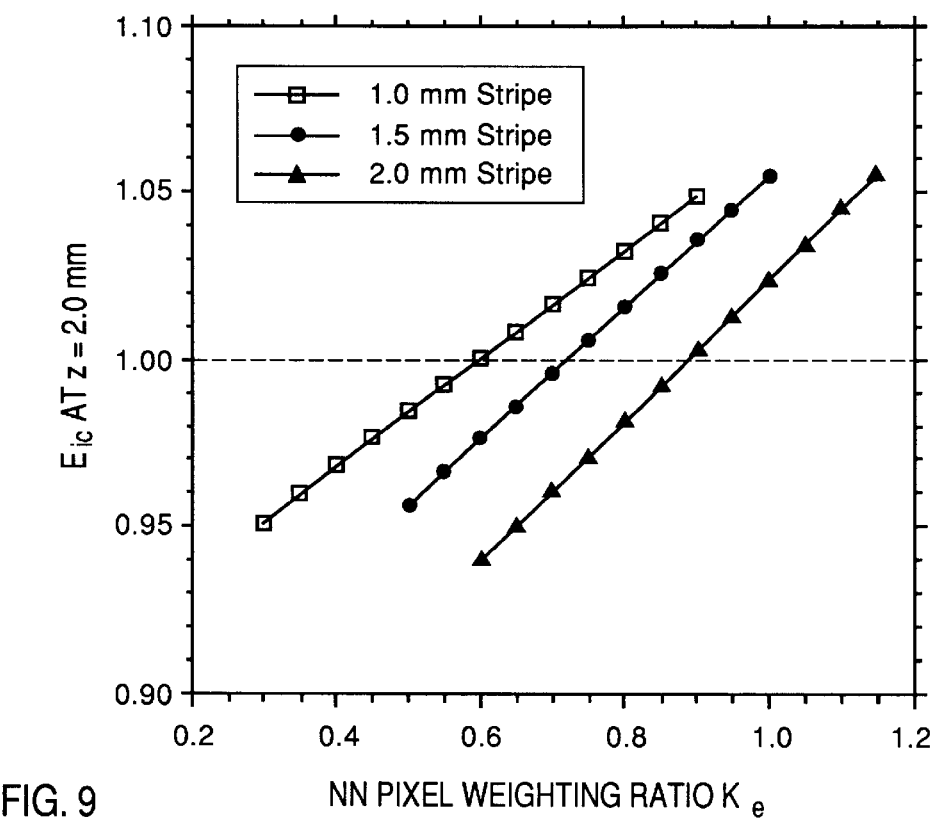
FIG. 9 shows, for a fixed interaction depth z, the fractional collected charge vs $K_e$ value for three different stripe widths.

FIG. 9 shows a plot of the fractional collected charge for an x-ray absorption event occurring at z equals 2 mm for three different stripe widths: 1, 1.5, and 2.0 mm. The "optimum" value of $K_e$ for each stripe width is then the one which causes 100% of the generated charge to be collected at this depth. We see that the optimum value varies with stripe width, which is not surprising since the stripe solid angle seen by the holes has a geometric dependence upon the stripe dimension. As shown by FIG. 9, the optimum values for 1, 1.5, and 2.0 mm stripes are $K_e$=0.60, 0.72, and 0.88, respectively. In all cases, the upper 60% of the detector volume can be made to achieve better than 1% energy resolution.

7. Circuitry for Implementing the Invention

Figure 10:
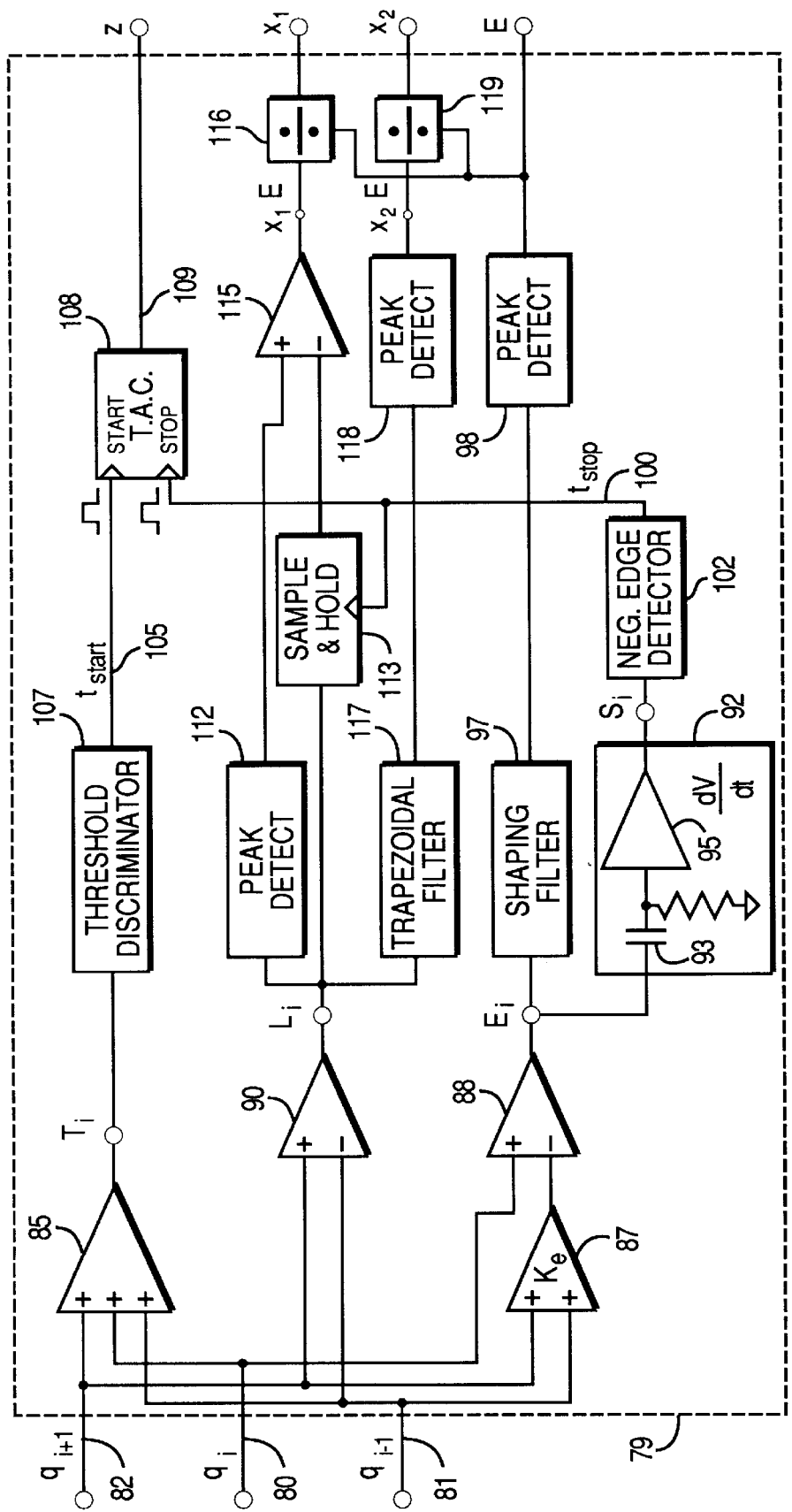
FIG. 10 shows a schematic diagram of the electronic circuits required to implement the signals $E_i$, $L_i$, $T_i$, and $S_i$ and record the x-ray's energy E and its interaction depth z and lateral location x in one specific implementation.

FIG. 10 shows the block schematic diagram of circuitry 79 which may be used in association with the detector shown in FIG. 2 to develop the signals $E_i$, $L_i$, $T_i$, and $S_i$ of Eqns. 7, 8, 10, and 11 and then extract values for the x-ray interaction depth z, its lateral location x on stripe$_i$, and its energy E. The circuitry shown is for only the single stripe$_i$, with a similar set being required for each stripe in the detector. All of the individual functions shown have been previously described in the literature as integrated circuits, typically for applications in particle physics. This approach would allow those skilled in the art of integrated electronics to produce these functions at high density and low cost for larger area detector applications. For smaller area applications the design can be implemented, for example, using conventional NIM processing modules. The practical details of implementing these circuits, including power supplies, feedback circuitry, and gain and offset stabilization are not shown since they are well understood by those skilled in the art.

To implement $T_i$, outputs $q_i$ 80, $q_{i-1}$ 81, and $q_{i+1}$ 82 from the preamplifiers 23 attached to detector anode stripes i, i−1, and i+1, respectively, are simply added together using a summing amplifier 85. To implement $E_i$, $q_{i-1}$ 81, and $q_{i+1}$ 82 are first added and multiplied by a constant weighting factor $K_e$ using a summing amplifier with gain 87. The output of amplifier 87 is then subtracted from $q_i$ using a third summing amplifier 88, which results in $E_i$. $L_i$ is found by subtracting $q_{i-1}$ 81 from $q_{i+1}$ 82 using a fourth summing amplifier 90. $S_i$ is derived from $E_i$ by the differentiator module 92, which is shown schematically as comprising an R-C differentiator 93 followed by a buffer amplifier 95.

A shaping filter 97 is used to extract the x-ray energy E from $E_i$. This filter can be implemented using either analog or digital circuitry, as is well known to those skilled in the art. An important advantage of the present invention is that, as may be seen from the traces of signals $E_i$ 65 and 67 in FIGS. 6C and 6D, as well as the traces in FIG. 7B, for x-ray absorption depth z values greater than about 1.5 mm, $E_i$'s rise time variation occurs only during the period of about 100 ns prior to electron impact. Therefore, the time constant of the shaping filter 97 can be adjusted over a fairly broad range of values significantly longer than this rise time (e.g., 0.5 to 20 µs) without affecting the mean value of the extracted x-ray energy E, but only changing the measurement's noise level. This is just the case for traditional Si and Ge energy dispersive detectors and is to be contrasted with the traditional situation in compound semiconductor detectors [see, for example, J. C. Lund, et al., "The Use of Pulse Processing Techniques to Improve the Performance of $Cd_{1-x}Zn_xTe$ Gamma-Ray Spectrometers", in IEEE Trans. Nucl. Sci., Vol. 43, #3, pp. 1411–1416 (June 1996)] wherein energy estimates of absorption events are strongly coupled to amplifier shaping time through signal risetime variations with z. The peak value of the output of the shaping filter 97, which represents the energy value E, is then captured in the standard manner by a peak detector 98 for conversion to a digital value for generating a spectrum in a multichannel analyzer. Peak detector 98 can be implemented using any of the methods commonly available.

The electron impact time, labeled $t_{stop}$ 100 in FIG. 10, is found from the signal $S_i$ using the negative edge detector 102. The negative edge detector is readily constructed by those skilled in electronics. One simple approach uses a pair of comparators and a one-shot. When the signal falls below the setpoint of the higher level comparator this triggers the one-shot. Then, if the signal also falls below the lower level comparator's setpoint while the one-shot is still high, the circuit generates a $t_{stop}$ output pulse. The circuit's sensitivity to the slope of negative going signals is adjusted by adjusting the one-shot's delay time.

The time at which the x-ray is absorbed, labeled $t_{start}$ 105 in FIG. 10, is found from the timing signal $T_i$ using a simple threshold discriminator 107 which is set slightly above the noise level in $T_i$. Once both $t_{start}$ 105 and $t_{stop}$ 100 are available, the interaction depth z can be found using a time-to-amplitude (TAC) converter 108, which may be implemented using any of the techniques known to those skilled in detector electronics. A simple approach uses a gated current source to charge a capacitor. The source is gated on by $t_{start}$ 105 and gated off by $t_{stop}$ 100. The resultant capacitor charge, and hence the TAC output voltage 109, is thus proportional to the time difference $\Delta t$ between $t_{start}$ 105 and $t_{stop}$ 100. Since $$\Delta t = z/v_e = zZ/(\mu_e V) \qquad (12)$$

where Z is the detector thickness, V the applied voltage, and $\mu_e$ the electron mobility, z then equals $\Delta t$ times a scaling factor $K_z$ given by:

$$K_z = \mu_e V/Z \qquad (13)$$

This factor can either be included in the TAC as a gain adjustment or multiplied by the TAC output 109 after it is digitized for storage.

The details of two methods of extracting x values from $L_i$ signals will be treated in the following §8 and §9. In brief, in the first method, the peak of $L_i$ is captured by a peak detector 112, while its value at time $t_{stop}$ 100 is captured by a sample and hold circuit 113. The difference of these two signals, taken by summing amplifier 115 is then proportional to the desired quantity x. It is also proportional to the x-ray energy, since $L_i$ is just the difference of two charge signals and these are both proportional to the number of generated charge carriers n, which, from Eqn. 2, is proportional to the x-ray energy $E_x$. Thus, in FIG. 10, the output of this circuit is shown as the product $x_1E$. $L_i$ difference signals, therefore, need to be divided by E, as with divider 116, to obtain an estimate $x_1$ of the value x. This division is a signal processing issue which can be dealt with by either analog or digital means, and both approaches are well understood by those skilled in the art of electronics and will not be further discussed here. In all further discussions of "x" values obtained from $L_i$ values we implicitly assume that this energy scaling has been implemented, as by the divider 116 in FIG. 10.

In the second method, $L_i$ is filtered by a shaping filter, which, in the preferred implementation is a trapezoidal shaping filter 117. This filter's peak value is then captured by a peak detector 118 as a measurement of $x_2E$ and divided by E using a divider 119 to obtain another estimate $x_2$ of the value x. Using either method, the produced value of x (or xE) will be typically digitized for storage in an MCA to produce a lateral image of the incoming x-ray flux distribution.

The output of the fully implemented detector circuitry 79, then, is a set of three values (z, x, E) derived from (z, xE, E) for each absorbed x-ray. The details of how these values are used and displayed will depend upon what information is desired in a particular application. Many options are possible, including: displaying lateral images as a function of energy; displaying lateral images only of x-rays in a specific energy range; displaying energy spectra for specific lateral regions; and displaying energy spectra only for events with z in a specified range. As shown, the values (z, xE, E) are output in charge units. To convert them to (z, x, E) in appropriate dimensions (i.e., mm, mm and eV) they need only be multiplied by appropriate scaling constants and, in the case of the xE values, divided by E as noted above.

Figure 11A:
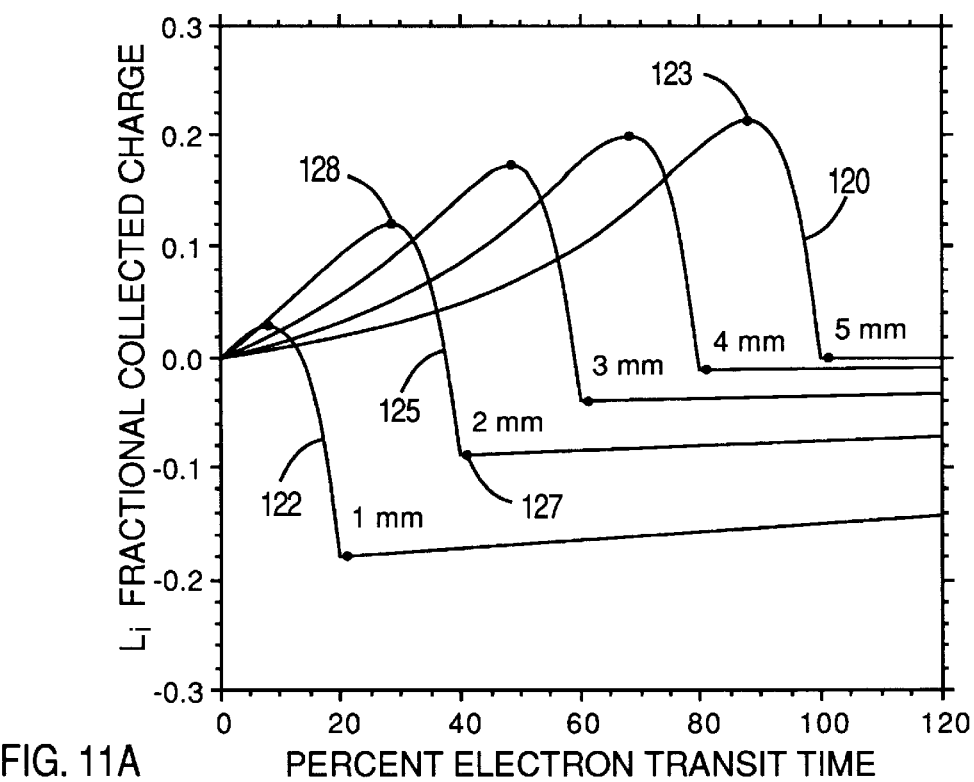
FIG. 11A shows the time evolution of the signal $L_i$ following x-ray absorption events at 5 depths in the detector.

8. Extracting x Values from $L_i$ Signals by Direct Measurement 8.1. The $L_i$ Direct Difference x Measurement Technique FIG. 11A shows $L_i$ signal traces from a 5 mm thick CZT detector of the design shown in FIG. 2 having 1000 Volts applied bias and 2 mm wide anode stripes, for a series of events occurring at x equal to 0.85 of the stripe$_i$ width. The traces are ordered according to the depth of interaction z in the detector, with trace 120, labeled "5 mm" corresponding to an event at the top of the detector, just below the cathode electrode 12, and trace 122, labeled "1 mm" corresponding to an event near the bottom of the detector, just 1 mm above the anode electrodes 13. In trace 120, there is no induced hole current, since the charge is generated immediately adjacent to the cathode. The entire signal occurs as the electrons drift to the anode. After their impact there, there is no net induced charge on either stripe$_{i-1}$ or stripe$_{i+1}$, so both $q_{i-1}$ and $q_{1+1}$ are zero, as is $L_i$. The peak value 123 of trace 120 therefore carries information about the value of x.

Looking at a trace from an event in the body of the detector, for example trace 125 arising from an event at z equals to 2 mm, we see that immediately after the electron impact there are still holes in the detector body and these induce charges on the NN stripes i−1 and i+1. At this point, while the electron induced signal is zero, there is still a residual hole induced signal 127. Thus, while the electrons, as they approached stripe$_i$, induced a signal $L_i$ whose peak value 128 may be essentially the same as value 123, this signal has been offset by the residual hole induced signal 127. As FIG. 11A shows, the hole induced offset component varies strongly with interaction depth z. Therefore, in the invention detector, we obtain x location information by measuring the difference between two values of $L_i$, one taken where the electron contribution is large (e.g., at 128) and one taken after electron impact, where only the hole contribution remains (e.g., at 127). We call this signal the "hole offset $L_i$" signal and designate it $L_{ih}$. While the electron contribution may typically be measured at the $L_i$ curve maximum, as for point 128, this is not a necessary feature of the invention, only that $L_i$ have a substantial electron component at the point of measurement.

8.2. Implementing the Technique

One way to accomplish this is as is shown in FIG. 10, where the peak value of $L_i$ is captured with a peak detector 112, the value after electron impact is captured using a sample-and-hold 113 triggered by the $t_{stop}$ signal 100, and the difference between these signal values taken using the summing amplifier 115. It is important to note that this procedure is quite different from normal spectroscopy practice, where charges are collected and the residual signals are then filtered to obtain information. In the present case the signal values are zero after all charges have been collected and only transiently carry x information. In order to use this information it is therefore necessary to capture signal values at specific points in time as the charge collection process occurs. Waiting until the process is complete and then analyzing the residual signals is too late.

Figure 11B:
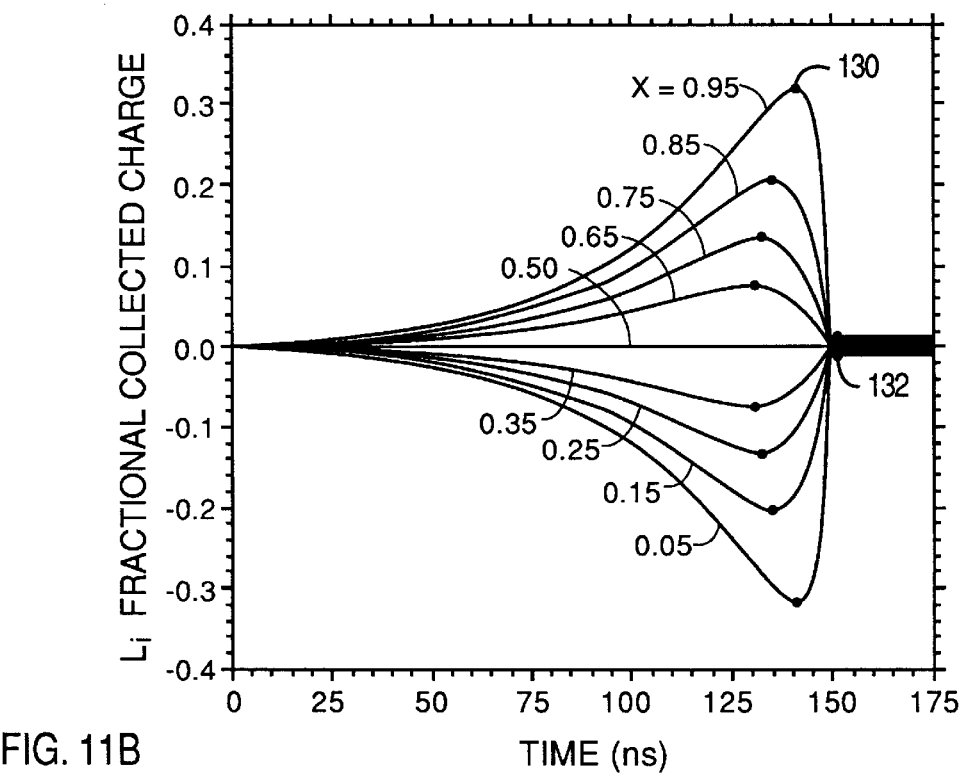
FIG. 11B shows the time evolution of the signal $L_i$ following x-ray absorption events at a single depth in the detector as a function of the event's lateral position x across stripe i.

FIG. 11B shows traces for the same detector as in FIG. 11A, where the value of z is constant at 3 mm, and x is varied from 0.05 to 0.95 of the 2 mm stripe$_i$ width. Both the peak and post electron impact $L_i$ values are shown with dots (e.g., 130 and 132). These curves show the time scale explicitly, 150 ns corresponding to the time required for the electrons to cross 3 mm of the detector's full 5 mm width Z, which is thus 60% of the electron transit time. It is generally more useful to show curves as a percent of electron transit time since induced charge signals depend only on the locations of the inducing charges. Thus, if the detector voltage is changed, so that the carriers' transit times change, the induced charge signals remain unchanged if expressed versus percentage electron transit time.

FIG. 11B shows several important features of the $L_i$ curves as a function of x value. First, they show the antisymmetrical behavior about x equals 0.0, as per Eqn. 9 above. In particular, $L_i$ for x equals 0.0 is uniformly equal to zero. Secondly, they show a peaking behavior toward $t_{stop}$ 100, the electron impact time as x approaches either −0.5 or +0.5. This is because, in these limits, $L_i$ is dominated by $q_{i-1}$ or $q_{i+1}$, respectively, and these signals are in turn becoming very similar to $q_i$ because the point of impact is so close to the NN pixel, as discussed in §4. This also has the further effect of moving the peak maxima 130 closer to $t_{stop}$ 100 as x approaches 0 or 1.

8.3. Precision of the x Determination

Table 1 shows how well correcting $L_i$ values for the induced hole offset charge works for the case shown in FIGS. 11A and 11B. Values of $L_{ih}$ are presented for various combinations of x and z value. The largest fractional error between z equals 5 mm and z equals 1 mm occurs for x equals 0.4 mm, where there is a 1.6% difference. This corresponds to only 32 μm maximum error across the 2 mm stripe width. Typical values are closer to 1%, or 20 μm across a 2 mm stripe. Using $L_{ih}$ values therefore produce quite precise values for determining x location.

Table 1: Corrected $L_{ih}$ values versus interaction depth (z=1 to 5 mm) and pixel x location (x=0.0 to 0.9 mm) for the same detector as in FIG. 11B. Values are given as a fraction of full energy collection.

|  | z = 5.0 mm | z = 3.5 mm | z = 2.0 mm | z = 1.0 mm |
|---|---|---|---|---|
| x = 0.0 mm | 0.0000 | 0.0000 | 0.0000 | 0.0000 |
| x = 0.2 mm | 0.0516 | 0.0512 | 0.0507 | 0.0509 |
| x = 0.4 mm | 0.1070 | 0.1060 | 0.1054 | 0.1053 |
| x = 0.6 mm | 0.1720 | 0.1718 | 0.1708 | 0.1702 |
| x = 0.8 mm | 0.2610 | 0.2607 | 0.2595 | 0.2584 |
| x = 0.9 mm | 0.3280 | 0.3274 | 0.3265 | 0.3247 |

8.4. Accuracy of the x Determination

Figure 12:
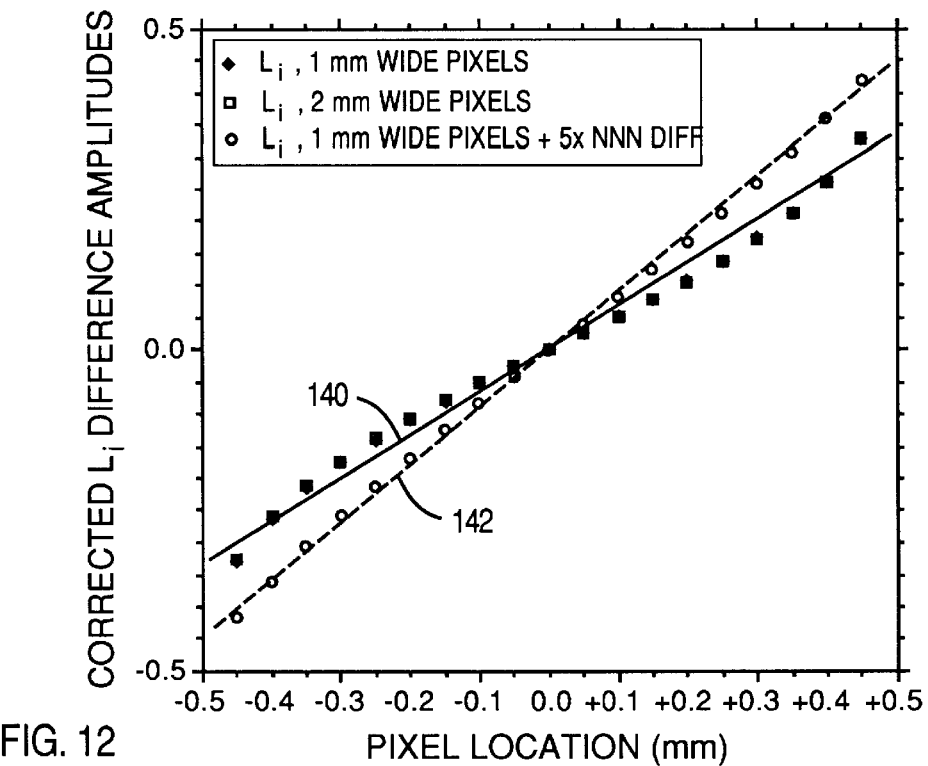
FIG. 12 shows corrected $L_i$ amplitudes versus x-ray lateral position x across stripe i.

While Table 1 addresses the precision of $L_{ih}$ values, FIG. 12 addresses their accuracy. Three sets of data are plotted here. The $L_{ih}$ data represented by the open squares are taken from the peak values in FIG. 11B, with intermediate values filled in as well. The $L_{ih}$ data represented by the filled diamonds are similarly generated but from a detector with only 1 mm wide stripe electrodes. These data lie essentially on top of each other, showing that, to first order, the relative accuracy of the method is unaffected by the stripe width.

These data also show that the method has a small amount of inherent non-linearity, which is due to the forward peaking of the $L_i$ curves noted above as x approaches either –0.5 or +0.5. This phenomenon can be dealt with in several ways. First, it can be simply ignored. If the data are assumed to actually be linear, then their errors can be compared to the straight line 140 they are assumed to generate. As the curve shows, the maximum error is only about 5% at the ends (100 μm for 2 mm stripe electrodes, 50 μm for 1 mm stripes) and is typically less than 3% over most of the range (60 μm for 2 mm stripes, 30 μm for 1 mm stripes). In many applications this will be perfectly adequate accuracy. A second approach is to note that the non-linearity error is time independent and a function only of detector geometry. Because, as noted above, the precision of the measurement is high, of order 1%, this means that a distortion correction curve can be mapped out for the detector and used to correct images after data collection is complete. That is, since the distortion is homogeneous and stable, it is possible to create a mapping function M(x,x') which transforms any collected image P(x) into a correct, linearized image P' (x') which will be accurate to the precision of the measurement, which is about 1% or 20 μm across a 2 mm stripe.

An alternative approach is also shown in FIG. 12, which is to generate $L_i$ using a more complex function of q signal values. FIG. 12 shows the results of generating $L_i$ according to $$L_i = q_{i+1} - q_{i-1} + 5(q_{i+2} - q_{i-2}) \quad (14)$$

using next nearest neighbor (NNN) induced charge signals as well. As may be seen, this curve (open circles) lies much closer to a straight line 142 than the $L_i$ signal generated using only NN q signals. This approach, however, may not be competitive, compared to the post-collection re-mapping approach, both because it requires additional circuitry and because the NNN signals are weak signals and adding them, multiplied by 5, to the NN $L_i$ may increase the noise of the measurement unacceptably. This trade-off will therefore depend sensitively upon the energy of the x-rays being detected and hence on the size of the $q_i$ signals generated.

8.5. Effect of Electronic Noise on x Precision

Figure 13:
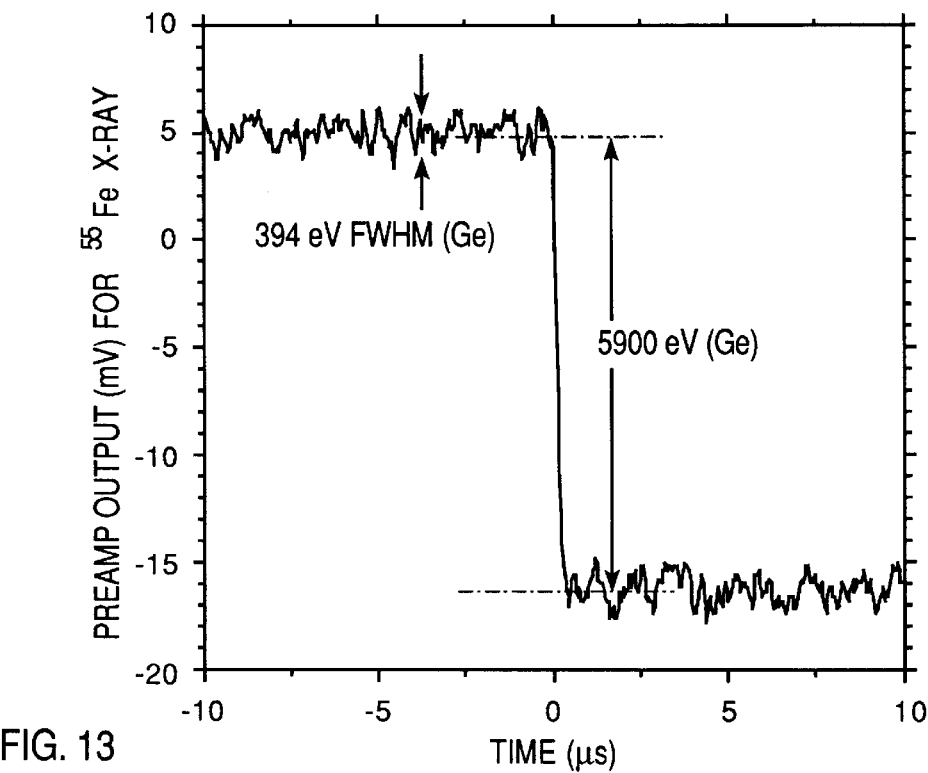
FIG. 13 shows an oscilloscope trace of the output of a Ge detector preamplifier following the absorption of a 5,900 eV x-ray.

The influence of electronic noise on x precision can be addressed by reference to FIG. 13, which shows the output of a cryogenically cooled Ge detector attached to a discrete component preamplifier, such as is commonly used to measure the energy of x-rays in the 5–30 keV range. This output is a direct oscilloscope trace, taken at 500 MHz bandwidth without any signal filtering, following the absorption of a 5.9 keV Mn $K_\alpha$ x-ray from an $^{55}$Fe nuclear source. Using the step to calibrate the signal, we see that the raw preamplifier noise has a full-width-half-maximum (FWHM) value of 394 eV, which would be reduced to about 150 eV using a shaping filter with a 20 μs peaking time. Scaling the 394 eV noise by the ratio 4.43/2.95 of electron-hole formation energies between CZT and Ge, we find that we would get about 590 eV FWHM noise if electronics with similar noise characteristics were attached to CZT detector electrodes. This is therefore a reasonable upper estimate of the performance to be achieved by well designed ASIC preamplifiers whose input capacitances are designed to match those of the anode electrode stripes. Since $L_i$ signals are the difference of two such signals, and most of the noise arises from uncorrelated electronic sources, they will therefore have about a square root of 2 larger noise, 830 eV. Thus, without any preamplifier filtering, we see from Table 1 that the noise FWHM error would be about 9% of the stripe width and thus be larger than any of the other error sources described above. Because it is known that electronic noise can be reduced considerably for electrodes with small capacitance values by matching them to preamplifiers with equally small input FET capacitances [see, for example, C. Zhou and W. K. Warburton, "Noise Analysis of Low Noise, High Count Rate, PIN Diode X-ray Detectors", in IEEE Trans. Nucl. Sci., Vol. 43, #3, pp. 1385–1390 (June 1996)], it is clear that this type of optimization would be one beneficial approach to obtaining optimum lateral position resolution from the invention detector. A second approach would be to reduce the system's bandwidth, for example in summing amplifier 90 in FIG. 10. Since the $L_i$ signals have typical risetimes of 20–25 ns, a bandwidth of only about 10–15 MHz is required to track them. This would reduce the high frequency noise, which scales as the square root of the bandwidth, by a factor of approximately 5, and yield FWHM noise errors of order 2%, comparable to other error terms. A third approach, using a shaping filter, is described in §9 below.

9. Extracting x Values from $L_i$ Signals Using a Shaping Filter

9.1. Goals

In inventing a shaping filter approach to extracting x values for $L_i$ signals we have two goals. The first is to reduce the x measurement non-linearity behavior shown in FIG. 12 and the second is to reduce the amount of electronic circuitry required to obtain the x value.

Figure 14:
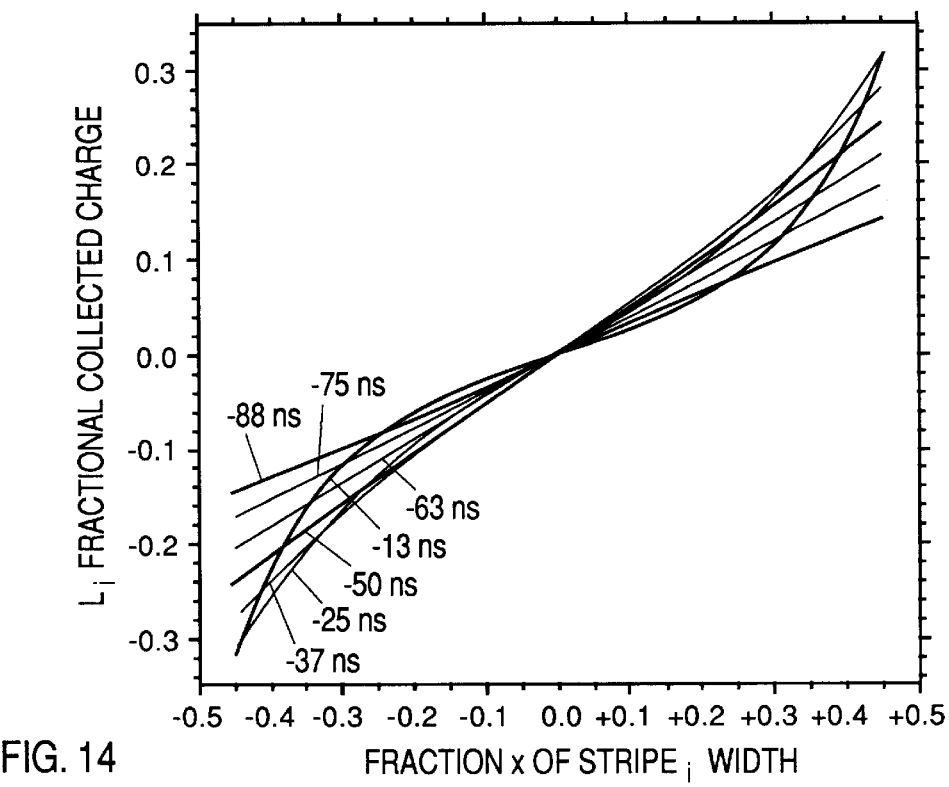
FIG. 14 shows the linearity of $L_i$ sample values versus position x on stripe$_i$ for different sampling times prior to electron impact.

FIG. 14 shows the results of an investigation into the sources of x non-linearity. In this case, rather than taking the difference between peak $L_i$ values and post-impact values, as was done to generate FIG. 12, the post impact values were obtained a fixed time (about 5 ns) after electron impact and the peak $L_i$ values were replaced with $L_i$ values sampled at set time intervals prior to electron impact. Each curve in FIG. 14 is labeled by its pre-impact sampling time. As is clear from these curves, the differences generated from the samples taken closest in time to electron impact show the most non-linearity. When the $L_i$ sampling measurements precede electron impact by 50 ns or more, the differences become quite linear in x.

Therefore, in principle, we could replace the peak detector 112 in FIG. 10 with a 50 ns delay and a second sample and hold and this would increase the linearity of the x measurement. In practice, this approach might pose implementation difficulties since these $L_i$ values would be captured at a time when $L_i(t)$ is changing fairly rapidly. Therefore any time jitter in generating the $t_{stop}$ signal 100 would degrade the accuracy of the x measurement. Further, because the $L_i$ signal values are lower at these times than at their peaks, signal to noise would also be degraded, resulting in additional loss of x measurement accuracy. It would therefore be superior to devise a measuring means which did not require the generation of accurate timing signals.

Regarding the amount of required circuitry: while the approach described in §8.1 for obtaining x values by taking the difference of two $L_i$ values gives very good precision and quite good accuracy, it does require four electronics modules per detector stripe: peak detector 112, sample and hold 113, differentiator 92, and negative edge detector 102. In those cases where the depth of interaction z is not required, so that both the differentiator 92, and negative edge detector 102 are required only for the $L_i$ determination of x, it would be advantageous to be able to obtain x without these modules.

9.2. Implementation

The goals of §9.1 can be met using a trapezoidal filter 117 and peak detector 118, as shown schematically in FIG. 10. This method is based on an understanding of how a trapezoidal shaping filter generates its signal, which is by taking the difference between two running averages, of time duration R, of the signal, separated by a gap of time duration G. [See, for example, U.S. patent application Ser. No. 60/002, 266 by W. K. Warburton, et al.] Presented with a step input, such a filter produces a trapezoidal output with peaking and falling times equal to R and a flattop of duration G. In the present case, looking at FIG. 11, we see that we wish to measure the difference between the peak $L_i$ signal and the hole component term following electron impact and that these are typically separated by about 25 ns, for the 5 mm thick CZT detector with 1000 Volts applied bias which we have been discussing. We therefore set up a trapezoidally filtered signal $F_j$ described by $$F_j(t) = \int_{-2R-G}^{-R-G} L_i(t)dt - \int_{-R}^{0} L_i(t)dt \qquad (15)$$

and then adjust R so that it is comparable to the widths of the $L_i$ peaks and also adjust G so that when the first region of integration is well centered on the $L_i$ peak the second region of integration is entirely confined to hole component region of the $L_i$ signal. Under these conditions we expect a maximum output from $F_j$ when the filter is measuring the $L_i$ difference amplitude described in §8.1 and §8.2.

Figure 15A:
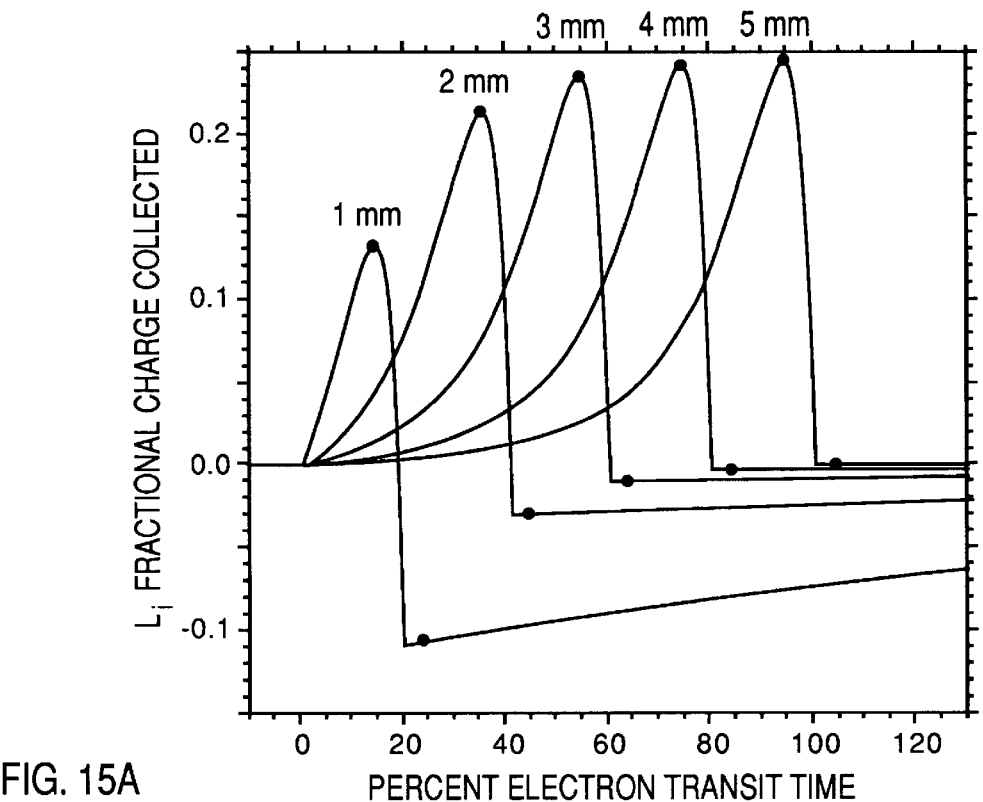
FIG. 15A shows traces of $L_i$ versus time for 1 mm stripe widths in a 5 mm thick detector as a function of x-ray absorption depth.
Figure 15B:
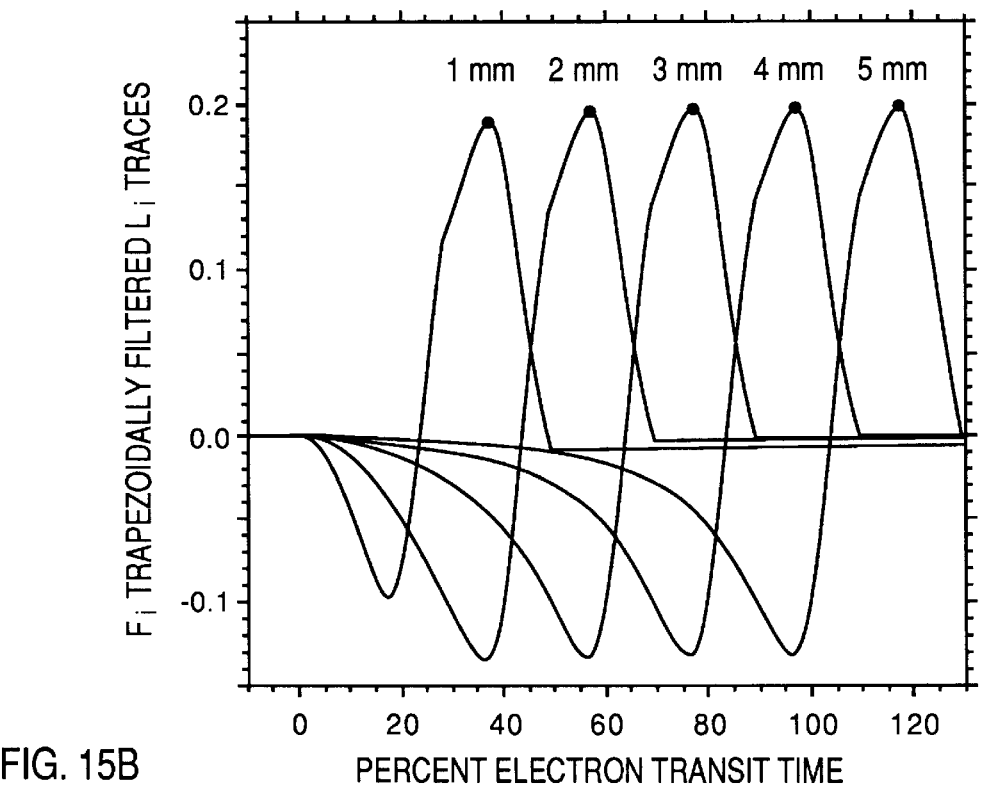
FIG. 15B shows the same traces as in FIG. 15A after filtering with a trapezoidal filter.

FIGS. 15A and 15B show the results of filtering $L_i$ curves with a trapezoidal filter. The $L_i$ curves in FIG. 15A were generated as a function of interaction depth z in a Z equals 5 mm thick piece of CZT having 1 mm wide anode stripes and a lateral interaction parameter x equal to +0.35 mm. Each curve is labeled according to its interaction depth z, ranging from 1 mm to 5 mm. The dots on the curves show the appropriate peak and post electron impact $L_i$ sampling points which would be used to determine x using the method of §8.1. FIG. 15B shows the $F_j(t)$ signals which result from filtering the $L_i(t)$ curves of FIG. 15A using a trapezoidal filter with an integration time R of 25 ns and a gap time G of 25 ns. As may be seen, the shapes of the positive portions of these $F_j$ curves are substantially independent of the interaction depth z, particularly compared to the $L_i$ curves from which they were derived. The dots in these curves indicate their peak amplitudes, as would be captured by the circuit's peak detector 118.

Figure 16:
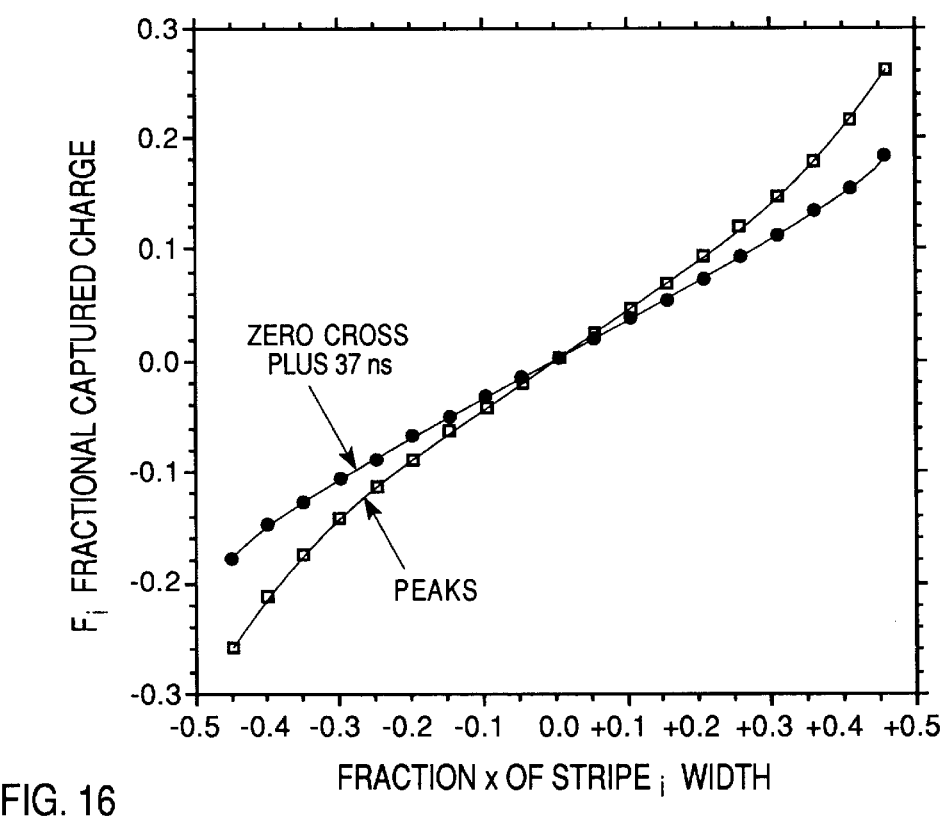
FIG. 16 shows trapezoidal filter output values versus x-ray lateral position x across stripe i, for two modes of output sampling.

The first question is, how should x values be extracted from $F_j$ curves. FIG. 16 addresses this question by showing sets of x values extracted two ways from a set of $F_j$ curves. The $L_i$ curves shown in FIG. 11B trapezoidally filtered with R equal to 75 ns and G equal to 50 ns. They were sampled two ways which are both easy to implement: capturing their peak values and capturing their value at a fixed time, $t_c$, taken to be 37 ns after the positive peak crosses zero. Comparing FIGS. 15A and 15B, it is clear that this crossing time occurs very close to the electron impact time, so that $t_c$ could be measured from that point as well, per the discussions of Eqn. 11 and Section 7. The peak values are shown as open squares in FIG. 16, the zero cross plus 37 ns values as filled circles. While the x linearity of the zero cross method is slightly better, our preferred implementation will use the peak capture method both because it is simpler to implement and also is immune to errors caused by timing jitter, as discussed earlier.

9.3. x and z Determination Performance

Figure 17:
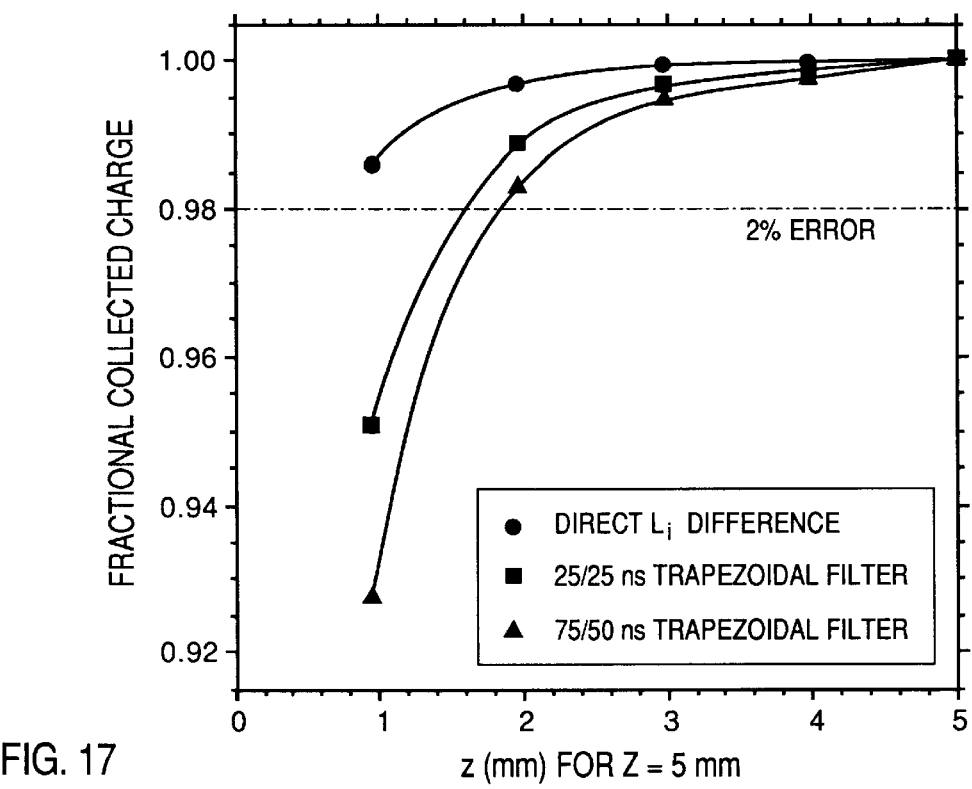
FIG. 17 compares output signal errors, as a function of x-ray interaction depth, between sampling $L_i$ signals directly and using trapezoidal filters with two different shaping time constants.

FIGS. 17, 18A, 18B and 19 examine the performance of the trapezoidal filtering approach in detail, for comparison to the method of §8. FIG. 17 shows how estimates of $L_i$ amplitude, using the direct difference method of §8.1, compare with estimates made from the $F_j$ filtered peak maxima. The comparison is made for two different trapezoidal filters, one having R and G both equal to 25 ns, the other having R equal to 75 ns and G equal to 50 ns. The former more nearly models the $L_i$ direct difference approach while the latter weights the region just before the $L_i$ peak somewhat more heavily. As may be seen from FIG. 17, excluding noise issues, which will be discussed below, the $L_i$ direct difference technique is least sensitive to z location, varying by about 1.5% at z equal to 1 mm and by about 0.5% at z equal 2 mm. The 25/25 ns filter most closely approximates this performance, but shows a factor of about three larger variations, compared to a factor of about five for the 75/50 ns filter. All three methods are accurate to better than 2% over the upper 60% of the detector volume, however, which will be adequate for many purposes since this is the same region over which the energy resolution, as shown by FIG. 8, can also be quite good.

Figure 19:
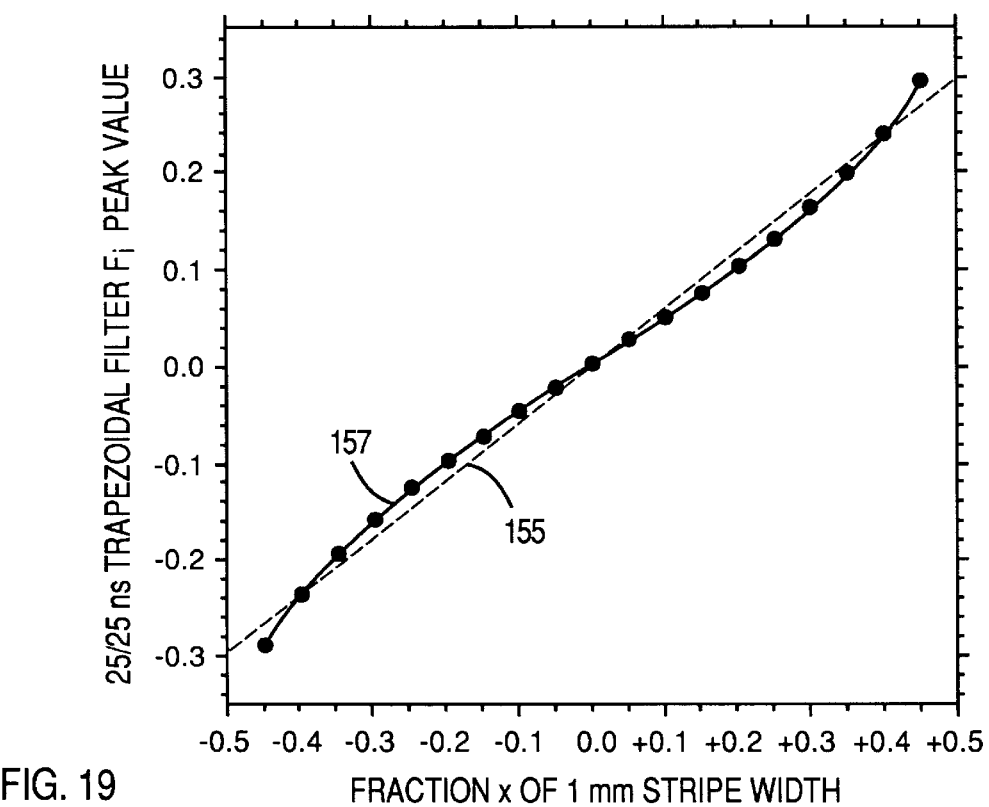
FIG. 19 shows peak values of the traces of FIG. 18B versus x-ray lateral position x across stripe i.
Figure 18A:
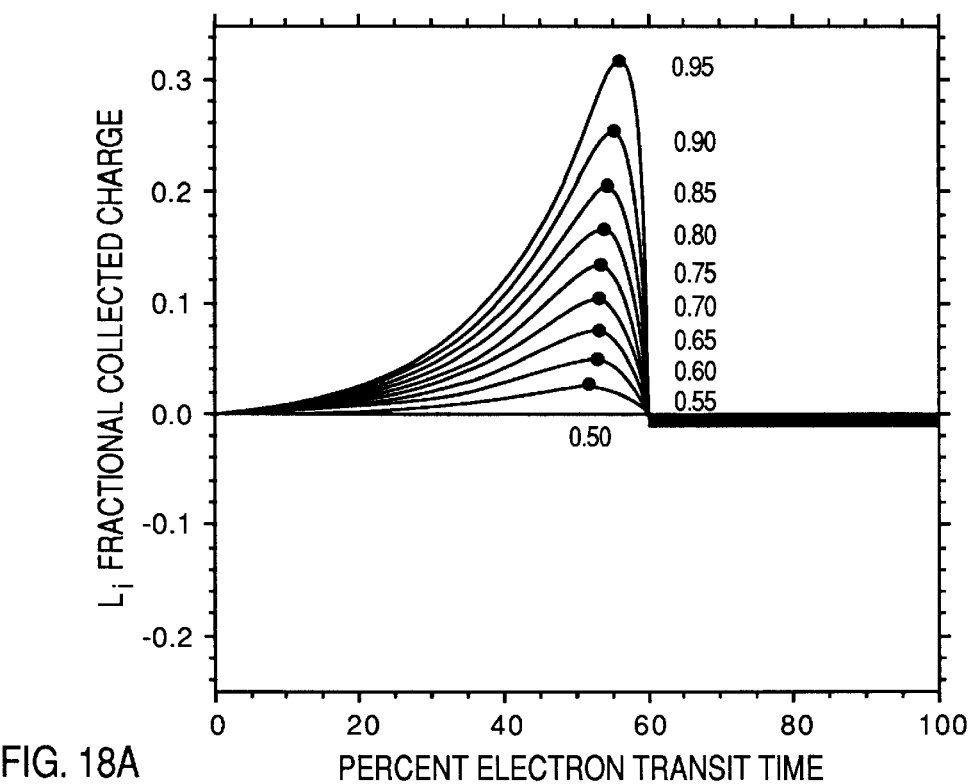
FIG. 18A shows traces of $L_i$ versus time for 1 mm stripe widths in a 5 mm thick detector as a function of x-ray lateral position x across stripe i.
Figure 18B:
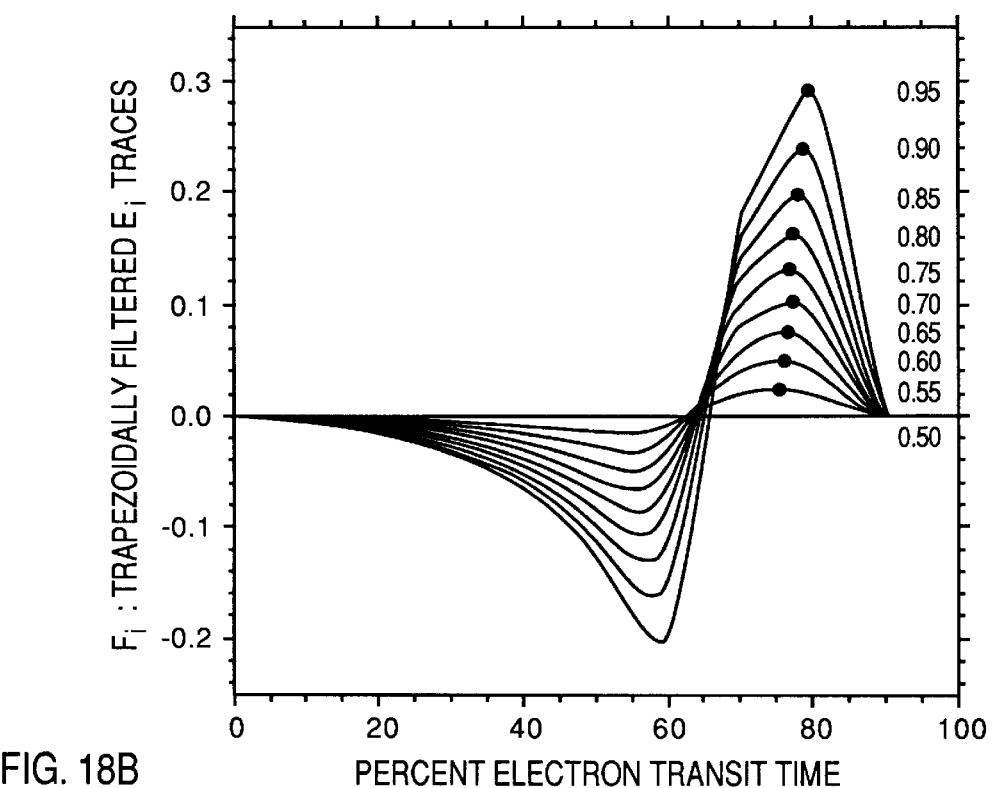
FIG. 18B shows the same traces as in FIG. 18A after filtering with a trapezoidal filter with a short time constant.

FIGS. 18A and 18B show the application of the 25/25 ns trapezoidal filter to a series of $L_i$ curves generated for x values ranging from 0.00 to +0.45 mm in a Z equals 5 mm thick CZT detector with 1 mm wide stripe anodes and 1000 V applied bias. The $L_i$ signal curves are presented in FIG. 18A and the $F_j$ filter outputs presented in FIG. 18B. Shaded dots in both curves mark the peak maxima. FIG. 19 shows values of the peak maxima from FIG. 18B plotted versus the lateral location x. Values for x less than 0.00 were obtained using the relationship of Eqn. 9. A straight line 155 has been placed through the data to allow an estimate to be made of the maximum non-linearity between the data curve 157. A comparison shows that, even without making later distortion corrections by re-mapping, lateral positions can be determined to better than about 2.5% accuracy (25 $\mu$m) and even the end points are only about 5% (50 $\mu$m) in error. This precision is essentially identical to that obtained using the $L_i$ direct difference method in §8.2, as shown by FIG. 12.

9.4. Noise Filtering Performance

Figure 20A:
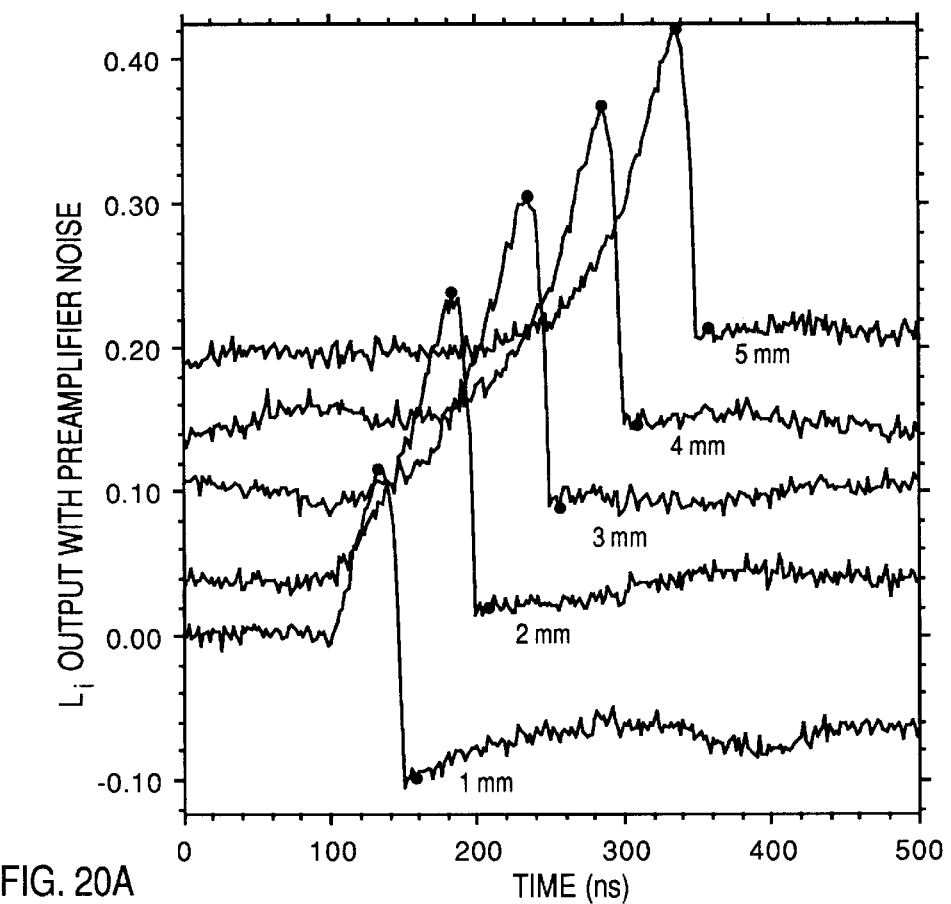
FIGS. 20A and 20B correspond to FIGS. 15A and 15B with the addition of preamplifier noise.

As stated in §9.1, a second goal of the trapezoidal filtering approach to extracting x values was to reduce errors resulting from preamplifier noise. This issue is addressed by FIGS. 20A and 20B. FIG. 20A shows the same $L_i$ curves as in FIG. 15A but with noise added. The noise is actual noise captured similarly to the trace of FIG. 13 with a digital oscilloscope sampling at 500 MSA and then scaled for the difference in electron-hole pair creation energy between CZT and Ge, as discussed in §8.5. A different noise trace was used for each $L_i$ curve. As may be seen, particularly from an examination of the trace corresponding to z equals 1 mm, the noise has both high frequency and low frequency components, the latter being particularly noticeable on the hole induced portion of the $L_i$ signal. If the filter time constants of the trapezoidal filter are selected properly, the higher frequency noise components may be filtered out without introducing excessive sensitivity to lower frequency noise components.

Figure 20B:
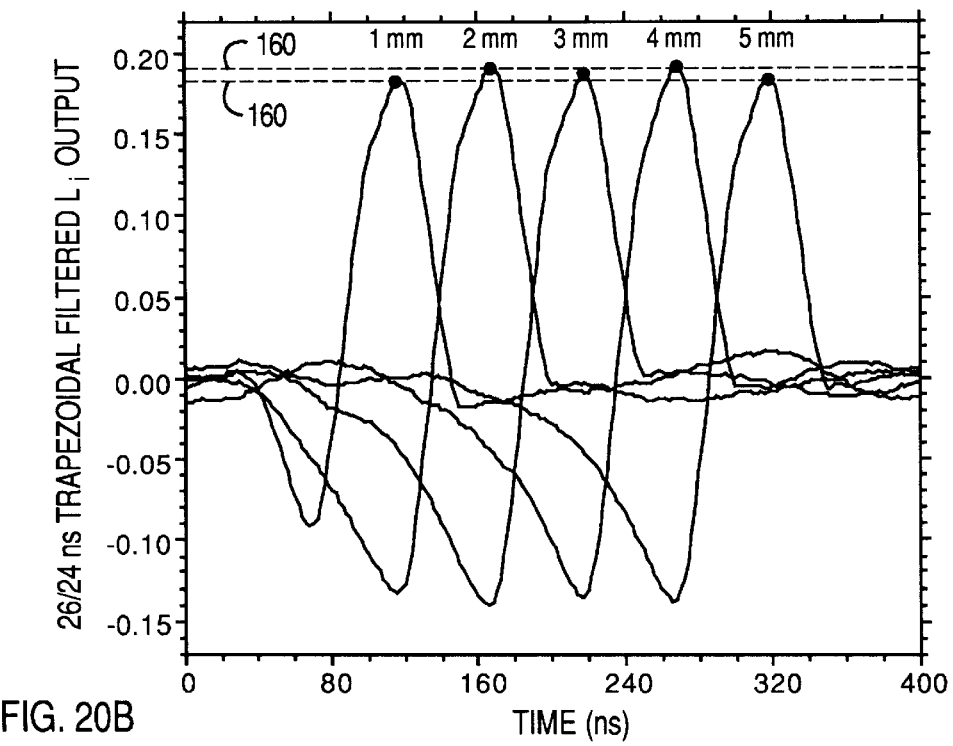

Because the 25/25 trapezoidal noise filter was shown to work well in §9.3 above, it was also used to filter the curves in FIG. 20A to generate the curves presented in FIG. 20B. These results show that the filter accomplishes its purpose. The high frequency noise is greatly reduced and all the peak maxima fall into a band, shown by the two dashed curves 160. The standard deviation of the points in this band is measured to be ±2.0%. This is a marked improvement of the value of 9% estimated to occur when making an $L_i$ direct difference measurement on the unfiltered signals, as discussed in §8.5. Thus, using a trapezoidal filter with appropriately chosen time constants satisfies both of our goals: reducing electronic circuitry requirements and also improving the accuracy of the x measurement by reducing sensitivity to preamplifier noise.

10. Using the Timing Signals $T_i$ and $S_i$

The timing signal $S_i$, in addition to signaling the instant of electron impact at the anode, can also be used to make a timing measurement of the depth of x-ray interaction z. Once z has been determined it can be used both directly, as a parameter of interest, and indirectly to increase the accuracy of either $E_i$ or $L_i$ measurements. These techniques are described in the following sections.

10.1. Determining the Value of z

The use of the timing signals $T_i$ and $S_i$ to determine z may be understood by reference to FIGS. 6C and 6D and to FIG. 10. As may be seen by comparing FIGS. 6C and 6D, the signal $T_i$ has two important characteristics for use in timing. First, it starts rising immediately following the x-ray absorption event (unlike the signal $E_i$, for example) and, second, its initial slope is relatively independent on the value of z. This means that, by feeding $T_i$ to a threshold discriminator 107, as is shown in FIG. 10, we can generate a pulse signal $t_{start}$ 105, whose generation time after the x-ray absorption event will be essentially independent of the value z if the discriminator threshold is set slightly above $T_i$'s noise level. The signal $t_{start}$ 105 is then used to trigger the start input of a time-to-amplitude converter (TAC) 108. As described above in §7, the stop signal 100 is generated by applying a negative edge detector 102 to the signal $S_i$, and, from FIGS. 6C and 6D, it may be seen that the edge in $S_i$ occurs within a few nanoseconds of electron impact on the anode stripes. The TAC 108 then generates an output voltage pulse proportional to the time difference $\Delta t$ between $t_{start}$ 105 and $t_{stop}$ 100, which is then also proportional to z, as may be found by inverting Eqn. 12:

$$z = \mu_e V \Delta t / Z \qquad (16)$$

The major contribution to error in determining z from $\Delta t$ will arise jitter in $t_{start}$ noise induces fluctuations in the instant when the signal $T_i$ crosses the discriminator's threshold. Examining the slope of $T_i$ in FIG. 6C, shows that, for a 30 keV x-ray, it rises about 90% of the full charge signal (30 keV) in 80% of the electron crossing time, which corresponds to 80% of the detector thickness Z. Using the estimated signal noise value of 600 eV FWHM presented earlier, we can estimate that this noise will result in a FWHM $\Delta z$ location error of:

$$\Delta z = 0.8Z * 0.60 \text{ keV}/(0.9*30 \text{ keV}) = 1.8\% \ Z. \qquad (17)$$

The accuracy of determining $\Delta z$ improves as z increases. Eqn. 17 shows that $\Delta z$ scales inversely with the x-ray energy and directly with the electronic preamplifier noise. However, accuracies of a few percent may be reasonably expected for x-ray energies in the range 10–50 keV. For the present implementation, where Z is 5 mm, 2% corresponds to 100 μm depth resolution in $\Delta z$.

10.2. Using z to Enhance Energy Resolution

The simplest way to use z information to improve the detector's energy resolution is to simply reject all absorption events with z less than some allowed value. As was shown in FIG. 8, the fraction of collected charge $E_i$ begins to diverge substantially from unity for interaction values z less than a certain amount which depends upon the constant $K_e$. For example, when $K_e$ is 0.68 in the described implementation, $E_i$ stays within 1.0% of unity for z greater than 2 mm. Thus, if events with z less than 2 mm are rejected, geometric contributions to degradation in the detector's energy resolution will be less than about 1%. If events with z less than 2.5 mm are rejected, these effects will be less than 0.5%.

From the discussion in conjunction with FIG. 8, it is clear that for any given detector, of particular thickness Z, stripe width w, and value of $K_e$, there will be a single curve D(z), similar to those shown in FIG. 8, which describes how it distorts the captured fractional collected charge value $E_{ic}$ as a function of interaction depth z. Since these D(z) curves are single valued, they may be inverted if z is known to output corrected x-ray energy values $E_x$:

$$E_x = CE_{ic}/D(z) \qquad (18)$$

where C is a calibration constant. Eqn. 18 can be easily implemented in various ways which are well known to those skilled is the arts of electronic signal processing. Using a lookup table of 1/D(z) values in a computer generating an x-ray energy spectrum from the detector's output is one obvious approach.

10.3. Capturing $L_i$ or Filtered $F_i$ Values

As shown by FIG. 17, $L_i$ difference values $L_{ih}$ and $L_i$ filtered values $F_i$ also show distortions with interaction depth z. Either of the methods discussed in §10.2 to provide corrected energy values can be applied equally well here to provide depth-corrected position values x.

11. Issues Associated with Edge Events

The present invention does not specifically address the issue of determining the location of x-ray absorption events whose charge clouds are split between adjacent stripes. In this case, there would be net electron induced charges on both stripes following electron impact on the anode stripes and the basic assumption used in forming both Eqn. 7 for Ei and Eqn. 8 for $L_i$, that only hole-induced net charges remain on the stripes after electron impact, becomes invalid.

This will not be a significant limitation in many cases for two reasons. First, Eskin et al. [see J. D. Eskin, et al., "The Effect of Pixel Geometry on Spatial and Spectral Resolution in a CdZnTe Imaging Array", in Conf. Record, IEEE Nuclear Science Symp. (San Francisco, Calif., Oct. 21–28, 1995), pp. 544–548] showed that, for 140 keV x-rays in CZT, most of the charge was generated within an 80 μm cylindrical region. Because both x-ray stopping powers and electron ranges drop rapidly with energy, smaller radii will be found for lower x-ray energies. Only those x-ray absorption events occurring with 80 $\mu$m or less of a stripe edge are capable of depositing charge on two stripes. Because the invention detector specifically allows the use of large dimension stripes, such "edge" events can be made a small fraction of total events. With 2 mm wide stripes, for example, only 8% of events fall within 80 $\mu$m of one edge or the other.

The second reason is that individual absorption events do not generate charge with a homogeneously spherical distribution. When an atom absorbs an x-ray (by photoelectric cross section, the largest term below 100 keV), the difference between the x-ray energy and the atom's absorption edge is carried away by a photoelectron. The absorbed energy is then re-emitted as either a fluorescent x-ray or an Auger electron. Electrons have very short ranges in dense matter. A commonly used estimation formula for the range R in $\mu$m is:

$$R(\mu m) = 0.115 E^{1.35}/\rho \qquad (19)$$

Where the electron energy E is in keV and the material density $\rho$ is in gm/cm$^3$. A 50 keV electron, for example, has only a 3.8 $\mu$m range in CZT. When the absorbed energy is released as an Auger electron, essentially all the generated charge will lie within a radius of only a few $\mu$m. If, however, the absorbed energy is released as a fluorescent photon, it may propagate some distance before being re-absorbed, at which point it releases much or most of its energy in a second electron range limited volume. Thus, at these energies, a photoelectric absorption event typically generates either one or two discrete charge clouds of quite small radius. As long as both of these "mini-clouds" are created over the same stripe, the invention detection scheme will correctly generate their mean location, where the mean is found by weighting the two locations by the charge generated in each. Only when the two charge clouds fall onto different stripes does the method fail. This means that quite a large fraction of events will be correctly located, even if the initial interaction lies very close to the stripe's edge, since it can easily be seen that, even when the first interaction lies just barely inside a stripe, fully 50% of second interactions will lie inside the same stripe and the resulting event will be valid. As the first interaction lies further and further inside the stripe an increasingly larger fraction of secondary events will as well, approaching unity as the distance to the stripe border approaches the fluorescent x-ray's absorption length in the detector material. Taking this effect and the argument of the preceding paragraph into account, significantly fewer than 4% of all events will be incorrectly treated by the invention detector with 2 mm wide stripes.

12. Detector Geometries for Measuring Lateral Location in 2 Dimensions

The concepts developed above in the examination of a specific implementation using stripe anode electrodes can be readily applied to devise detector designs which are capable of locating the x-ray absorption event's lateral position in two dimensions, rather than just one. Two different approaches are described in the following sections.

12.1. Rectangular Pixel Arrays

FIG. 21 shows a design which uses a two dimensional array of pixels to provide two dimensional x-ray position coordinates x and y. As in the one dimensional case, the pixel dimensions have all been made equal to simplify the discussion but this is not a requirement of the invention detector. When the dimensions are not equal, then previous comments describing how weighting constants should be applied to the primary charge signals q in constructing the secondary signals E, L, T, and S should be applied here as well. The design of FIG. 21 is modified from FIG. 2 in that the anode electrode stripes 13 of width w have been divided up into pixels 173 of dimension wx by wy, each with its own connection contact 175. The shown pixels are rectangular, but other shapes which allow a relatively dense packing (e.g., squares, hexagons) could also be used. In this geometry, if we denote one pixel by the indices (i,0,0), then we can index its nearest neighbors in the x direction as (i,−1,0) and (i,+1,0) and its y nearest neighbors as (i,0,−1) and (i,0,+1). In this case we can generalize the nearest neighbor forms of Eqns. 7 and 8 to:

$$E_i = q_{i,0,0} - K_e(q_{i,-1,0} + q_{i,+1,0} + q_{i,0,-1} + q_{i,0,+1}), \qquad (20a)$$

$$L_{ix} = q_{i,-1,0} - q_{i,+1,0}, \text{ to find x, and} \qquad (20b)$$

$$L_{iy} = q_{i,0,-1} - q_{i,0,+1}, \text{ to find y,} \qquad (20c)$$

where the terms' time dependence has not been explicitly shown. The circuitry required to implement these equations generalizes immediately from that required to implement Eqns. 7 and 8. In particular, the circuits required to implement Eqn. 8 are merely replicated twice to implement Eqns. 20b and 20c. The circuit to implement Eqn. 20a is identical to that used to implement Eqn. 7 (see FIG. 10) except that the summing amplifier 85 will require five inputs rather than three.

12.2. Crossed Stripe Arrays

The requirement of the design in FIG. 21 to have electronics implemented separately for each pixel is both advantageous and disadvantageous. It is advantageous in that, since spatially well separated pixels can process x-rays simultaneously, the overall detector is capable of handling higher count rates than the design shown in FIG. 2, in addition to providing both x and y coordinates. It is disadvantageous in that, if it is an N by M pixel array, N*M sets of electronics are required. Therefore, for those cases where the total x-ray arrival rate is not so high, it would be advantageous to be able to determine x and y using less electronics.

FIG. 22 shows a crossed stripe design which only require N+M sets of electronics to determine x and y, while being limited to processing only a single x-ray at a time in the full detector volume. In this design the anode is divided up into N stripes 180 of width wx and having contacts 181, while the cathode is also divided into M stripes 185 of width wy running in the orthogonal direction and having contacts 187. The stripes in the two directions are treated identically, using circuitry similar to that developed for the detector of FIG. 2 and shown in FIG. 10. In fact, the association of the coordinate x with the anode and y with the cathode is merely an arbitrary assignment which could trivially be reversed. The only additional circuitry required is a coincidence circuit wired to all the $t_{start}$ signals from all the pixels comprising both the cathode and the anode. This circuit would inspect for the simultaneous appearance of signals seen by both anode and cathode stripes, which would signal an x-ray event in the detector. Each event so detected would have its x location supplied by the circuitry attached to the wx stripes 180 and its y location supplied by the wy stripes 185. Additional coincidence circuitry could also inspect for multiple events which would pileup by arriving within the detector in less time than required to process a single event. The details of designing and fabricating such inspection circuits are well known to those skilled in the art of detector design and will not be further described.

The detector design shown in FIG. 22 differs in one significant respect from the previous designs shown in FIGS. 2 and 21. The latter are intended to operate by collecting charge carriers of a only single polarity (usually electrons) and the functions $E_i$ and $L_i$ have been designed with this in mind. In fact, the larger the disparity between the mobilities of electrons and holes is in those detectors the better they will work. In the detector shown in FIG. 22, however, one set of stripes uses carriers of one polarity and the other set of stripes uses the carriers of the opposite polarity. Both electrons and holes, therefore, must have good charge transport properties for this design to function effectively. This requirement therefore presently restricts the application of this design to such materials as Si and Ge, at least until the technology of other semiconductors improves significantly.

Because both electron and hole transport properties must be good (high mobilities and long carrier lifetimes) in the detector material in this design, the resultant detector has two properties that are superior to the single carrier designs described earlier. First, consider the results shown by FIG. 8, which show that, for an appropriate $K_e$ value (i.e., $K_e$ equals 0.60 for the 1 mm stripe width shown), the fraction charge collected can be correct within the upper half of the CZT detector to better than 0.5%. In the present design, each set of stripes produces its own estimate of the energy (i.e., $E_{ix}$ and $E_{iy}$) but, for each sets of stripes, the "upper half" of the detector is the opposite side of the detector. Therefore one (the larger) of the two estimates will always be correct to better than 0.5%. Thus, this design can achieve excellent energy resolution across the full detector volume and z energy correction schemes will not be required.

Similarly, the fact that both electron and hole mobilities are high means that the $L_i$ functions will also be accurate across the full detector thickness. FIG. 23 shows model results for a 5 mm thick Ge detector with 1 mm wide stripes in both x and y directions, computed assuming z equals 0 on the anode, similarly to the CZT case and that the x-ray absorption occurred at x equals +0.35 mm. Since electrons have about twice the mobility of holes in Ge, the results are plotted versus hole transit time for six interaction depths ranging from 5 mm (absorption at the cathode) to 0 mm (absorption at the anode). The maxima and post-electron impact points are marked with dots on all the curves, which may be directly compared to the curves shown in FIG. 15A. Notice that the z equals 0 (anode absorption) curve 190 is different from the others because no electron transport is involved. In all cases, however, the difference between the most positive $L_{ix}$ and most negative $L_{ix}$ value (the post-impact value for all cases but the z equals 0 case) is independent of the value of z. Extracting x values from these curves, using either the direct difference measurement technique of §8 or the trapezoidal filtering technique of §9, will therefore produce results which are substantially independent of interaction depth z over the full detector thickness.

Considering this approach generally, then, if we wish to determine the set of x-ray interaction parameters $\{E, t_{start}, x, y, Z\}$, then we set up two sets of orthogonal electrodes on opposing surfaces of the detector volume and employ the techniques developed in §1–11 above to obtain one subset of parameters from the first set of electrodes and a second subset of parameters from the second set of electrodes. The two subsets are then combined to form the full set, where coincidence circuitry is used to assure that the combined subsets arise from the same photon event. Thus, in the foregoing, the X electrode set 180 is used to find the set of values $\{E_x, t_{start}, x, z_x\}$, while the Y electrode set 185 is used to find the set of values $\{E_y, t_{start}, y, z_y\}$. Subsets with the same $t_{start}$ value (i.e., coincidence subsets) are then combined to form the full set $\{E, t_{start}, x, y, z\}$, using some rules (such as largest E value) are employed on a case by case basis to determine which members of the pairs $\{E_x, E_y\}$ and $\{z_x, z_y\}$ are used as the values of E and z, respectively.

13. An Example Application

Figure 24:
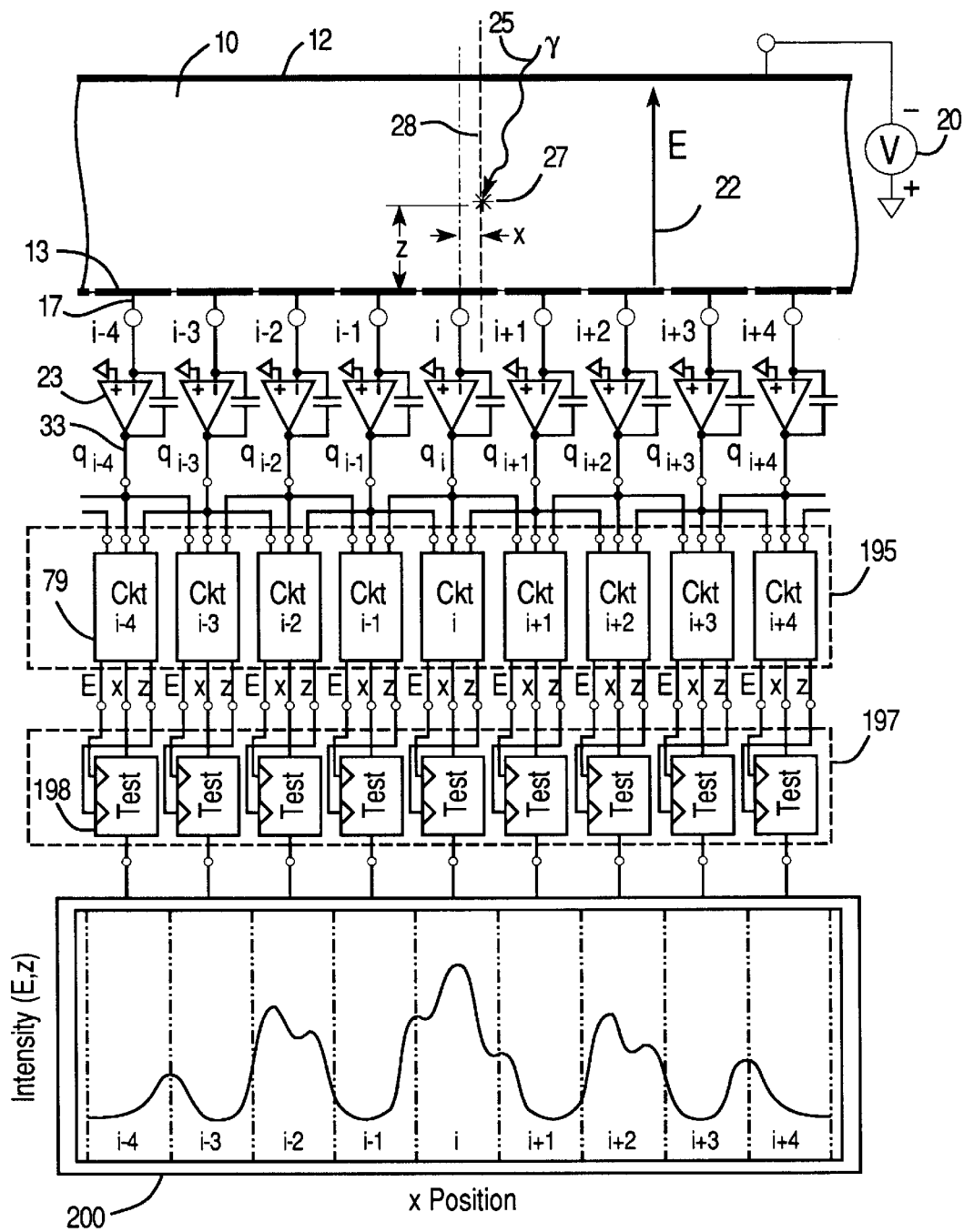
FIG. 24 shows a schematic diagram of an application of the invention detector.

FIG. 24 shows an example application of the invention, wherein it is desired to form a one dimensional image of an x-ray flux, using only x-rays of a particular energy and absorbed within a certain range of depths in the detector. The former criterion might be intended to select for x-rays of a particular physical interest, while the later criterion might be used to achieve a particular energy resolution, as discussed in §6 and §10.2. The detector geometry is as shown in FIG. 2, with the same components as described there. The contact 17 on each electrode stripe 13 is connected to a preamplifier 23, as described in connection with FIG. 3. The outputs of these preamplifiers connect to an array 195 of circuit blocks 79, each of which contains circuitry, as shown in FIG. 10, to generate the secondary signals $E_i$, $L_i$, $T_i$, and $S_i$ for each electrode i, and to analyze these secondary signals to extract values for energy E, location x and depth z for each photon whose generated charge impacts the electrode i. These outputs are connected in turn to the inputs of the array 197 of test circuits 198.

Each test circuit comprises: a linear gate, whose input is the signal x from the preceding stage; a window discriminator, whose input is the signal E, a threshold discriminator, whose input is the signal z; and an AND gate whose inputs are the outputs of the two discriminators and whose output is the gate on the linear gate. Thus, when the test circuit receives the values E, x, and z, it passes the value x only when E falls within the window set in the window discriminator and z exceeds the threshold value set in the threshold discriminator. The test circuit outputs are connected to the inputs of a multichannel analyzer containing N segments, where N is the number of stripe electrodes on the detector 10.

Each segment i contains K channels. For each segment, the analyzer linearly bins the counts it receives according to their x values. In this manner an image is built up over NK channels with each segment i generating its local image using only the x values of the x-rays which cause charge to impact on the ith electrode.

14. References 14.1. U.S. Patent Documents

The following patents, and references therein, refer to various methods for obtaining position or energy sensitivity to x-ray photons or to methods for making compound semiconductor x-ray detectors and may be relevant to the present invention.

| 5,171,99B | 12/1992 | Engdahl et al. | 250/363.02 |
|---|---|---|---|
| 5,245,191 | 9/1993 | Barber et al. | 250/363.04 |
| 5,273,910 | 12/1993 | Tran et al. | 437/003 |
| 5,365,069 | 11/1993 | Eisen et al. | 250/370.09 |
| 5,434,417 | 7/1995 | Nygren | 250/370.01 |
| 5,500,534 | 3/1996 | Robinson et al. | 250/385.1 |
| 5,510,644 | 4/1996 | Harris et al. | 257/458 |
| 5,530,249 | 6/1995 | Luke | 250/374 |
| 5,627,377 | 5/1997 | Hamilton et al. | 250/370.13 |
| 5,677,539 | 10/1997 | Apotovsky et al. | 250/370.13 |

14.2. Other Publications

The following patents, and references therein, refer to various methods for obtaining position or energy sensitivity to x-ray photons or to methods for making compound semiconductor x-ray detectors and may be relevant to the present invention.

1) "Radiation Detection and Measurement, 2nd Ed." by Glenn F. Knoll (J. Wiley, New York, 1989).
2) J. R. Janesick, "Open Pinned-Phase CCD Technology" in PROC. SPIE Vol. 1159, 363–371 (1989).
3) W. Snoeys et al., "A New Integrated Pixel Detector for High Energy Physics" in IEEE Trans. Nucl. Phys., Vol. 39,1263–1269 (1992).
4) H. B. Barber et al., "High Resolution Imaging Using a 48×48 Ge Array with Multiplexer Readout" in Conference Record, 1995 IEEE Nuclear Sciences Symposium (San Francisco, Calif. Oct. 21–8, 1995), pp. 113–117.
5) G. A. Armantrout, et al., "What can be expected from high Z semiconductor detectors", in IEEE Trans. Nucl. Sci. Vol. NS-24, pp. 121–125 (1977).
6) F. P. Doty et al., "Performance of Submillimeter CdZnTe Strip Detector", in Conference Record for 1995 IEEE Nuclear Sciences Symposium (San Francisco, Calif., Oct. 21–28, 1995), pp. 80–84.
7) H. B. Barber, "CdZnTe arrays for nuclear medicine imaging" in PROC. SPIE Vol. 2859, pp. 26–28 (1996).
8) J. C. Lund, et al., "The Use of Pulse Processing Techniques to Improve the Performance of Cd1-xZnxTe Gamma-Ray Detectors" in IEEE Trans. Nucl. Sci. Vol. 43, pp. 1411–1416 (1996).
9) P. N. Luke, "Single-polarity charge sensing in ionization detectors using coplanar electrodes", in Appl. Phys. Lett. Vol. 65 (22), 2884–2886. See also: IEEE Trans. Nucl. Sci.Vol. 42, pp. 207–213 (1995) and Nucl. Instr. and Meth. in Phys. Res. Vol. 380, pp. 232–237 (1996).
10) H. H. Barrett, J. D. Eskin & H. B. Barber, "Charge transport in arrays of semiconductor gamma-ray detectors", in Phys. Rev. Lett. Vol. 75, 156–159 (1995) and related paper in Proc. SPIE Vol. 2859, pp. 46–49 (1996).
11) J. D. Eskin, et al., "The Effect of Pixel Geometry on Spatial and Spectral Resolution in a CdZnTe Imaging Array", in Conf. Record, IEEE Nuclear Science Symp. (San Francisco, Calif., Oct. 21–28, 1995), pp. 544–548.
12) D. G. Marks, et al., "A 48×48 CdZnTe Array with Multiplexer Readout" in IEEE Trans. Nucl. Sci. Vol. 43, pp. 1253–1259 (1966).
13) V. Radeka, "Low Noise Techniques in Detectors" in Ann. Rev. Nucl. Part. Sci., Vol. 28, pp. 217–277 (1988) and references therein.
14) J. C. Lund, et al., "The Use of Pulse Processing Techniques to Improve the Performance of Cd1-xZnxTe Gamma-Ray Spectrometers", in IEEE Trans. Nucl. Sci., Vol. 43, #3, pp. 1411–1416 (June 1996).
15) P. A. Patt, et al., "New gamma-ray detector structures for electron only charge carrier collection utilizing high-Z compound semiconductors", Nucl. Instr. and Meth. in Phys. Res., Vol. 380, pp. 276–281 (1996).
16) L.-A. Hamel and S. Paquet, "Charge Transport and Signal Generation in CdZnTe Strip Detectors", Nucl. Instr. and Meth. in Phys. Res., Vol. 380, pp. 238–240 (1996).
17) L.-A. Hamel et al. "Signal Generation in CdZnTe Strip Detectors", IEEE Trans. Nucl. Sci. Vol. 43, No. 3, pp. 1422–1426 (June 1996).
18) J. R. Macri, et al., "Development of an Othogonal-Stripe CdZnTe Gamma Radiation Imaging Spectrometer", IEEE Trans. Nucl. Sci. Vol. 43, No. 3, pp. 1458–1462 (June 1996).
19) J. R. Macri, et al., "Progress in the development of large area sub-millimeter resolution CdZnTe strip detectors", SPIE 2859, pp. 29–36 (1996). See also: Nucl. Instr. and Meth. in Phys. Res., Vol. 380, pp. 490–492 (1996).
20) Z. He, et al., "1-D position sensitive single carrier semiconductor detectors", Nucl. Instr. and Meth. in Phys. Res., Vol. 380, pp. 228–231 (1996).
21) R. Polichar et al., "Development of CdZnTe energy selective arrays for industrial and medical radiation imaging", Nucl. Instr. and Meth. in Phys. Res., Vol. 353, pp. 349–355 (1994).
22) A. Niemela, et al., "Improving CdZnTe X-ray detector performance by cooling and rise time discrimination", Nucl. Instr. and Meth. in Phys. Res., Vol. 377, pp. 484–486 (1996).
23) R. Redus, et al., "Electronics for high resolution spectroscopy with compound semiconductors", Nucl. Instr. and Meth. in Phys. Res., Vol. 380, pp. 312–317 (1996).

15. Conclusion

The foregoing description of a specific embodiments has been presented for purposes of illustration and description. It is not intended to be exhaustive or to limit the invention to the precise form described, and obviously, many modifications and variations are possible in light of the above teaching. These embodiment was chosen and described in order to best explain the principles of the invention and its practical application to thereby enable others in the art to best utilize the invention in various embodiments and with such modifications as best suit the invention to the particular uses contemplated.

Thus, while the above is a complete description of several specific embodiments of the invention, other modifications, alternative constructions, and equivalents may be used. As a first example, as noted above, it is not necessary that the detector volume be composed of semiconductor material. Gases, for example, absorb x-rays and release ions and electrons as mobile charge carriers which have very different transport properties. Second, while one specific embodiment employs a trapezoidal filter to extract x values from the $L_i$ signals, other shaping filters could also perform this function and the operation of the rest of the invention is not dependent on this construction. As a third example, the crossed stripe design shown in FIG. 22 can presently only be effectively implemented using the materials Ge and Si because of the relatively poorer transport properties (low mobilities, short trapping times, or both) of other semiconductor materials. If other high quality materials became available, this design could be extended to them as well. Fourth, while all the specific implementations presented here have shown detectors with orthorhombic geometries, this is not a required feature of the invention, which could be applied to other geometries as well, including cylindrical and spherical geometries. Fifth, as noted at various points in the specification, while the dimensions of the electrodes in all of the presented examples were identical, there is nothing in the operation of the invention detector that requires this, particularly in more complex geometries. Therefore, the above description should not be taken as limiting the scope of the invention, as defined by the appended claims.

What is claimed is:

1. A method of detecting the position of x-ray or gamma-ray photons, the method comprising:
providing a volume of detector material capable of absorbing the photons and generating, for each such absorbed photon, a plurality of mobile charge carriers whose average number depends on the energy of the absorbed photon;
applying an electric field across the volume of detector material so that mobile charge carriers, so generated, will drift across the volume of detector material;
providing a plurality of electrodes disposed over an area on a surface of the volume of detector material, toward which surface at least some of the mobile charge carriers drift, the electrodes being spaced along a line of direction X;

for each electrode j, measuring a primary signal $q_j(t)$ representing the time varying charge induced in that electrode by the motion of the drifting mobile charge carriers;

for one or more electrodes i, generating a secondary signal which depends on the primary signal $q_k(t)$ for at least one other electrode k; and analyzing the secondary signal to determine the photon's point of interaction along the line of direction X within the detector.

2. The method of claim 1 wherein the secondary signal, designated $L_{x,i}(t)$, for electrode i is a weighted sum of primary signals that includes the primary signal $q_k(t)$ for at least one other electrode k and is given by:

$$L_{x,i}(t) = F\left[\sum_j W_{L,j,i} q_j(t)\right]$$

where each $W_{L,j,i}$ is a constant that is a function of the detector geometry and material and the local electrode geometries, and the summation is over the primary signals $q_j(t)$ for a set of electrode i's neighboring electrodes.

3. The method of claim 2 wherein:

the plurality of electrodes are substantially identical to each other; and the values of $W_{L,j,i}$ for a pair of close neighbor electrodes symmetrically disposed with respect to electrode i are equal in magnitude and opposite in sign.

4. The method of claim 1 wherein the secondary signal, designated $L_{x,i}(t)$, for electrode i is given by:

$$L_{x,i}(t) = w_{i+1,i} q_{x,i+1}(t) - w_{i-1,i} q_{x,i-1}(t) + w_{i+2,i} q_{x,i+2}(t) - w_{i-2,i} q_{x,i-2}(t),$$

where $q_{x,i+1}(t)$ and $q_{x,i+2}(t)$ are the primary signals from electrode i's nearest and next nearest neighbor electrodes in the positive X direction, and $q_{x,i-1}(t)$ and $q_{x,i-2}(t)$ are the primary signals from the nearest and next nearest neighbor electrodes in the negative X direction, and the weighting functions $w_{j,i}$ are constants that are functions of the detector geometry and material and of the specific geometry of electrode i and its nearest and next nearest neighbors.

5. The method of claim 4 wherein all the electrodes are identical and the expression for $L_{x,i}(t)$ becomes:

$$L_{x,i}(t) = q_{x,i+1}(t) - q_{x,i-1}(t) + K_x(q_{x,i+2}(t) - q_{x,i-2}(t)),$$

where $K_x$ is a constant that is a function of the detector geometry and material.

6. The method of claim 4 wherein only the secondary signals from nearest neighbor electrodes are used and the expression for $L_{x,i}(t)$ becomes:

$$L_{x,i}(t) = w_{i+1,i} q_{x,i+1}(t) - w_{i-1,i} q_{x,i-1}(t).$$

7. The method of claim 6 wherein all the electrodes are identical and the expression for $L_{x,i}(t)$ becomes:

$$L_{x,i}(t) = q_{x,i+1}(t) - q_{x,i-1}(t).$$

8. The method of claim 1 wherein analyzing the secondary signal, designated $L_{x,i}(t)$, to determine the photon's location value x comprises:

measuring $L_{x,i}(t)$ during the period while the mobile charge carriers are drifting toward the electrodes;

measuring $L_{x,i}(t)$ shortly after the mobile charge carriers have impacted on the electrodes; and subtracting the second measured $L_{x,i}(t)$ value from the first measured $L_{x,i}(t)$ value and multiplying this difference $L_{xc,i}$ by a scaling constant.

9. The method of claim 1 wherein the depth z of the photon's point of absorption along the direction of the applied electric field is additionally determined and this value z is used to improve the accuracy with which the photon's lateral location value x is determined by dividing the photon's determined location value x(z), determined at depth z, by a correcting function $D_x(z)$, where the function $D_x(z)$ depends upon the specific detector geometry and materials.

10. The method of claim 1 wherein analyzing the secondary signal, designated $L_{x,i}(t)$, to determine the photon's location value x comprises:

applying a shaping filter to the secondary signal $L_{x,i}(t)$ to generate a filtered signal $F_{x,i}(t)$, where the filter's shaping time constants are selected to be comparable to the widths of the $L_{x,i}(t)$ peaks;

capturing a value of $F_{x,i}(t)$; and multiplying the captured value $F_{x,i}(t_c)$ by a scaling constant.

11. The method of claim 10 wherein said step of capturing a value of $F_{x,i}(t)$ is carried out at a time $t_c$ after a zero crossing of $F_{x,i}(t)$.

12. The method of claim 10 wherein the shaping filter is a trapezoidal shaping filter.

13. The method of claim 10 wherein capturing a value of $F_{x,i}(t)$ is carried out by a peak detector which captures the peak value of $F_{x,i}(t)$.

14. The method of claim 1, and further comprising:

providing a plurality of additional electrodes disposed over an area on a surface of the volume of detector material, toward which surface at least some of the mobile charge carriers drift, the electrodes being spaced along a line of direction Y lying perpendicular both to the applied electric field and to the line of direction X;

for each additional electrode j, measuring a primary signal $q'_j(t)$ representing the time varying charge induced in the additional electrode by the motion of the drifting mobile charge carriers;

for one or more additional electrodes i, generating an additional secondary signal which depends upon the primary signal $q'_k(t)$ for at least one other additional electrode k; and analyzing the additional secondary signal to determine the photon's point of interaction along the line of direction Y within the detector.

15. The method of claim 14 wherein the secondary signal, designated $L_{y,i}(t)$, for additional electrode i is a weighted sum of primary signals that includes the primary signal $q'_k(t)$ for at least one other additional electrode k and is given by:

$$L_{y,i}(t) = F\left[\sum_j W_{L,j,i} q'_j(t)\right]$$

where each $W_{L,j,i}$ is a constant that is a function of the detector geometry and material and the geometries of the local electrodes, and the summation is over the primary signals $q_j(t)$ for a set of neighboring electrodes to electrode i.

16. The method of claim 14 wherein the secondary signal, designated $L_{y,i}(t)$, for electrode i is given by:

$$L_{y,i}(t)=w_{i+1,i}q_{y,i+1}(t)-w_{i-1,i}q_{y,i-1}(t)+w_{i+2,i}q_{y,i+2}(t)-w_{i-2,i}q_{y,i-2}(t),$$

where $q_{y,i+1}(t)$ and $q_{y,i+2}(t)$ are the primary signals from electrode i's nearest and next nearest neighbor electrodes in the positive Y direction, and $q_{y,i-1}(t)$ and $q_{y,i-2}(t)$ are the primary signals from the nearest and next nearest neighbor electrodes in the negative Y direction, and the weighting functions $w_{j,i}$ are constants that are functions of the detector geometry and material and of the specific geometry of electrode i and its nearest and next nearest neighbors.

17. The method of claim 16 wherein all the electrodes are identical and the expression for $L_{y,i}(t)$ becomes:

$$L_{y,i}(t)=q_{y,i+1}(t)-q_{y,i-1}(t)+K_y(q_{y,i+2}(t)-q_{y,i-2}(t)),$$

where $K_y$ is a constant that is a function of the detector geometry and material.

18. The method of claim 16 wherein only the secondary signals from nearest neighbor electrodes are used and the expression for $L_{x,i}(t)$ becomes:

$$L_{y,i}(t)=w_{i+1,i}q_{y,i+1}(t)-w_{i-1,i}q_{y,i-1}(t).$$

19. The method of claim 18 wherein all the electrodes are identical and the expression for $L_{y,i}(t)$ becomes:

$$L_{y,i}(t)=q_{y,i+1}(t)-q_{y,i-1}(t).$$

20. The method of claim 14 wherein analyzing the secondary signal, designated $L_{x,i}(t)$, and the additional secondary signal, designated $L_{y,i}(t)$, to determine the photon's location values x and y comprises:

measuring both $L_{x,i}(t)$ and $L_{y,i}(t)$ while the mobile charge carriers are drifting toward the electrodes;

measuring both $L_{x,i}(t)$ and $L_{y,i}(t)$ shortly after the mobile charge carriers have impacted on the electrodes;

subtracting the second measured $L_{x,i}(t)$ value from the first measured $L_{x,i}(t)$ value and multiplying this difference by a first scaling constant to obtain the value x; and subtracting the second measured $L_{y,i}(t)$ value from the first measured $L_{y,i}(t)$ value and multiplying this difference by a second scaling constant to obtain the value y.

21. The method of claim 14 wherein analyzing the secondary signal, designated $L_{x,i}(t)$, and the additional secondary signal, designated $L_{y,i}(t)$, to determine the photon's location values x and y comprises:

applying a first shaping filter to the secondary signal $L_{x,i}(t)$ to generate a filtered signal $F_{x,i}(t)$, where the filter's shaping time constants are selected to be comparable to the widths of the $L_{x,i}(t)$ peaks;

applying a second shaping filter to the secondary signal $L_{y,i}(t)$ to generate a filtered signal $F_{y,i}(t)$, where the filter's shaping time constants are selected to be comparable to the widths of the $L_{y,i}(t)$ peaks;

capturing a value of $F_{x,i}(t)$;

capturing a value of $F_{y,i}(t)$;

multiplying the captured value $F_{x,i}(t_{xc})$ by a first scaling constant to obtain the value x; and multiplying the captured value $F_{y,i}(t_{xc})$ by a second scaling constant to obtain the value y.

22. The method of claim 21 wherein both first and second shaping filters are trapezoidal shaping filters.

23. The method of claim 21 wherein capturing the values of $F_{x,i}(t_{xc})$ and $F_{y,i}(t_{yc})$ is carried out using peak detectors which capture the peak values of $F_{x,i}(t)$ and $F_{y,i}(t)$.

24. The method of claim 14 wherein the depth z of the photon's point of absorption along the direction of the applied electric field is additionally determined and this value z is used to improve the accuracy with which the photon's lateral location value x is determined by dividing the photon's determined location value x(z), determined at depth z, by a correcting function $D_x(z)$, where the function $D_x(z)$ depends upon the specific detector geometry and materials.

25. The method of claim 24, where 1/D(z) is unity for a specified range of z values and zero otherwise.

26. A method of determining a quantity of interest regarding x-ray or gamma-ray photons, the method comprising the steps of:

providing a volume of detector material capable of absorbing the photons and generating, for each such absorbed photon, a plurality of mobile charge carriers;

applying an electric field across the volume of detector material so that mobile charge carriers, so generated, will drift across the volume of detector material;

providing a plurality of electrodes disposed over an area on a surface of the volume of detector material, toward which surface at least some of the mobile charge carriers drift;

for each electrode j, measuring a primary signal $q_j(t)$ representing the time varying charge induced in that electrode by the motion of the drifting mobile charge carriers;

for one or more electrodes i, generating a secondary signal which is a weighted sum of the primary signal $q_i(t)$ for electrode i and the primary signal $q_k(t)$ for at least one other electrode k; and analyzing the secondary signal to determine a set of quantities of interest that includes at least one of the following: the photon's energy, the photon's point of interaction within the detector, and the photon's time of interaction.

27. The method of claim 26 wherein:

the quantity of interest to be determined is the photon's energy E; and the secondary signal, designated $E_i(t)$, for electrode i is given by:

$$E_i(t) = F\left[q_i(t) + \sum_j W_{E,j,i} q_j(t)\right]$$

where

F is a constant, each $w_{E,j,i}$ is a constant that depends upon both the local pixel geometries and the detector's geometry and material, and the summation is over the primary signals $q_j(t)$ for the nearest neighbor electrodes to electrode i.

28. The method of claim 26 wherein said plurality of electrodes form a one-dimensional array of substantially identical electrodes and the secondary signals are generated according to the equation $$E_i(t)=F[q_i(t)+K_{e1}(q_{i+1}(t)+q_{i-1}(t))+K_{e2}(q_{i+2}(t)+q_{i-2}(t))],$$

where
- $q_{i+1}(t)$ and $q_{i-1}(t)$ are the primary signals from electrode i's nearest neighbor electrodes and $q_{i+2}(t)$ and $q_{i-2}(t)$ are the primary signals from electrode i's next nearest neighbor electrodes, and
- the weighting functions $K_{e1}$ and $K_{e2}$ are constants that are functions of the detector geometry and material and of the typical specific geometry of electrode i and its nearest and next nearest neighbors.

29. The method of claim 28 where only nearest neighbor primary signals are employed and the secondary signals are generated according to the equation $$E_i(t)=F[q_i(t)+K_{e1}(q_{i+1}(t)+q_{i-1}(t))].$$

30. The method of claim 26 wherein analyzing the secondary signal, designated $E_i(t)$, to determine the photon's energy comprises:
   measuring $E_i(t)$ shortly before the photon is absorbed in the detector;
   measuring $E_i(t)$ shortly after the mobile charge carriers impact the electrodes; and
   subtracting the first measured $E_i(t)$ value from the second measured $E_i(t)$ value and multiplying the difference by a scaling constant.

31. The method of claim 26 wherein analyzing the secondary signal, designated $E_i(t)$, to determine the photon's energy comprises:
   applying a shaping filter whose the shaping time constant is set to be significantly longer than a charge collection time; and
   capturing a peak signal value output by the shaping filter.

32. The method of claim 26 wherein:
   the depth z of the photon's point of absorption along the direction of the applied electric field is additionally determined; and
   wherein this value z is used to improve the accuracy with which the photon's energy E is determined by dividing the photon's determined energy $E_{iC}(z)$ determined at depth z by a correcting function $D_E(z)$, where the function $D_E(z)$ depends upon the specific detector geometry and materials.

33. The method of claim 32, where $1/D_E(z)$ is unity for a specified range of z values and zero otherwise.

34. The method of claim 26 wherein:
   the quantity of interest to be determined is the photon's absorption time $t_{start}$ when the photon is absorbed in the detector; and
   the secondary signal, designated $T_i(t)$, for electrode i is given by:

$$T_i(t) = F\left[q_i(t) + \sum_j W_{T,j,i} q_j(t)\right]$$

where
   each $w_{T,j,i}$ is a constant that is a function of both the detector geometry and material and the local electrode geometries, and
   the summation is over the primary signals $q_j(t)$ for a set of electrode i's neighboring electrodes.

35. The method of claim 34 wherein analyzing the secondary signal, designated $T_i(t)$, to determine the photon's absorption time comprises:
   applying the secondary signal $T_i(t)$ to a threshold discriminator;
   supplying a threshold value to the threshold discriminator which is slightly above the noise level in the signal $T_i(t)$; and
   using the pulse output of the threshold discriminator to indicate the absorption time $t_{start}$.

36. The method of claim 26 wherein:
   the quantity of interest to be determined is the charge impact time $t_{stop}$, when the mobile charge carriers impact on the electrode;
   the secondary signal, designated $E_i(t)$, for electrode i is given by:

$$E_i(t) = F\left[q_i(t) + \sum_j W_{E,j,i} q_j(t)\right]$$

where
   each $W_{E,j,i}$ is a constant that is a function of both the detector geometry and material and the geometries of the local electrodes, and
   the summation is over the primary signals $q_j(t)$ for a set of neighboring electrodes to electrode i; and
   analyzing the secondary signal to determine the charge impact time $t_{stop}$ comprises:
   generating a time derivative signal $S_i(t)$ of the secondary signal $E_i(t)$;
   examining the time derivative signal $S_i(t)$ and outputting a pulse whenever a slope of appropriate sign and magnitude is detected; and
   using the pulse output to indicate the charge impact time $t_{stop}$.

37. The method of claim 26 wherein:
   the quantity of interest to be determined is the value z of the depth location of the photon's point of absorption along the direction of the applied electric field;
   generating a secondary signal includes generating a pair of secondary signals, designated $T_i(t)$ and $E_i(t)$ given by:

$$T_i(t) = F\left[q_i(t) + \sum_j W_{T,j,i} q_j(t)\right]$$

$$E_i(t) = F\left[q_i(t) + \sum_j W_{E,j,i} q_j(t)\right]$$

where
   each $W_{T,j,i}$ and $W_{E,j,i}$ is a constant that is a function of both the detector geometry and material and the geometries of the local electrodes, and
   the summation is over the primary signals $q_j(t)$ for a set of neighboring electrodes to electrode i.

38. The method of claim 37 wherein analyzing the secondary signal comprises:
   analyzing the secondary signal $T_i(t)$ to generate a signal $t_{start}$ corresponding to the time of the photon's absorption in the volume of detector material;

analyzing the secondary signal $E_i(t)$ to generate a signal $t_{stop}$ corresponding to the time when the mobile charge carriers impact on the electrode;

measuring the time interval $\Delta t$ between $t_{start}$ and $t_{stop}$; and multiplying $\Delta t$ by a scaling constant $K_z$ to produce the desired value z.

39. The method of claim 38 wherein analyzing the secondary signal $T_i(t)$ to determine the photon's absorption time $t_{start}$ and $t_{stop}$ comprises:

applying the secondary signal $T_i(t)$ to a threshold discriminator;

supplying a threshold value to the threshold discriminator which is slightly above the noise level in the signal $T_i(t)$; and using the pulse output of the threshold discriminator to indicate the absorption time $t_{start}$.

40. The method of claim 38 wherein analyzing the secondary signal $E_i(t)$ to determine the charge impact time $t_{stop}$ comprises:

generating a time derivative signal $S_i(t)$ of the secondary signal $E_i(t)$;

examining the time derivative signal $S_i(t)$ and outputting a pulse whenever a slope of appropriate sign and magnitude is detected; and using the pulse output to indicate the charge impact time $t_{stop}$.

41. The method of claim 38 wherein measuring the time interval $\Delta t$ uses a timer.

42. The method of claim 41 wherein the timer includes a time-to-amplitude converter, which is started by the signal $t_{start}$ and stopped by the signal $t_{stop}$.

43. The method of claim 38 wherein the scaling constant $K_z$ is given by the expression $$K_z = \mu V/Z,$$

where Z is the detector thickness parallel to the applied electric field, V is the applied voltage, and $\mu$ is the mobility of the mobile charge carriers in the detector material.

44. The method of claim 26 wherein the quantities of interest are determined using charge carriers of first and second polarities, and the electric field causes charge carriers of the first polarity to drift toward the plurality of electrodes, the method further comprising:

providing an additional plurality of electrodes disposed over an area on a surface of the volume of detector material toward which surface mobile charge carriers of the second polarity drift;

for each additional electrode j, measuring an additional primary signal $q_j'(t)$ representing the time varying charge induced in the additional electrode by the motion of the drifting mobile charge carriers of the second polarity;

for one or more additional electrodes i, generating an additional secondary signal which depends upon the primary signal $q_i'(t)$ for electrode i and the primary signal $q_k'(t)$ for at least one other additional electrode k; and analyzing the additional secondary signal to determine an additional set of quantities of interest.

45. The method of claim 44 wherein analyzing the secondary signal and analyzing the additional secondary signal include:

analyzing the secondary signal to determine a first subset of the set of quantities of interest, including the photon interaction time $t_{start,1}$;

analyzing the additional secondary signal to determine a second subset of the set of quantities of interest, including the photon interaction time $t_{start,2}$;

applying a coincidence detector to the values $t_{start,1}$ and $t_{start,2}$ to pair first and second subsets generated by the same photon absorption event; and combining the paired subsets to generate the full set of desired quantities of interest.

46. The method of claim 45 wherein, when the first and second subsets contain independently determined estimates of the same quantity of interest, selecting only the more accurate estimate for inclusion in the full set of desired quantities of interest.

47. The method of claim 46 wherein the same quantity of interest is the photon energy E, and the selection between the independently determined estimates $E_1$ and $E_2$ entails choosing the larger.

48. A detector comprising:

a volume of detector material capable of absorbing photons and generating, for each such absorbed photon, a plurality of mobile charge carriers whose average number depends on the energy of the absorbed photon;

at least one electrode that applies an electric field across said volume of detector material so that mobile charge carriers, so generated, will drift across said volume of detector material;

a plurality of electrodes disposed over an area on a surface of said volume of detector material, toward which surface at least some of said mobile charge carriers drift;

a primary signal generator, for each electrode j, generating a primary signal $q_j(t)$ representing the time varying charge induced in that electrode by the motion of said drifting mobile charge carriers;

a secondary signal generator, for one or more electrodes i, generating a secondary signal which depends upon said primary signal $q_k(t)$ for at least one other electrode k; and a signal analyzer analyzing said secondary signal to determine the photon's point of interaction within the detector.

49. The detector of claim 48 wherein the secondary signal, designated $L_{x,i}(t)$, for electrode i is a weighted sum of primary signals that includes the primary signal $q_k(t)$ for at least one other electrode k and is given by:

$$L_{x,i}(t) = F\left[\sum_j W_{L,j,i} q_j(t)\right]$$

where each $W_{L,j,i}$ is a constant that is a function of the detector geometry and material, and the summation is over the primary signals $q_j(t)$ for a set of close neighbor electrodes to electrode i.

50. The detector of claim 48 wherein:

said detector material is a compound semiconductor; and said charge carriers are of predominantly a single polarity and are electrons.

51. A detector comprising:

a volume of detector material capable of generating a plurality of mobile charge carriers at a location in said volume of detector material corresponding to an event of interest;

means for applying an electric field across said volume of detector material so that any mobile charge carriers, so generated, will drift across said volume of detector material;

a plurality of electrodes, electrically isolated from one another and having a characteristic dimension, which substantially cover an area on a surface of said volume of detector material toward which surface such mobile charge carriers drift, so that, when an event occurs, said drifting mobile charge carriers induce charges on said plurality of electrodes;

means, associated with each electrode j, for generating a primary signal representing the time varying charge $q_j(t)$ induced in that electrode by the motion of said drifting mobile charge carriers;

means, associated with at least a particular electrode, for generating at least one secondary signal that depends on at least the primary signal generated for an electrode other than said particular electrode; and means, responsive to at least one of said secondary signals, for determining at least one of the following characteristics of the event:
  its lateral position with a resolution significantly smaller than said characteristic dimension of said electrodes;
  its time of occurrence relative to the time of impact of said mobile charge carriers on said particular electrode; and
  the number of generated mobile charge carriers which impact said particular electrode.

52. The detector of claim 51 wherein said detector material is a semiconductor material and said mobile charge carriers are electrons and holes.

53. The detector of claim 51 wherein:
said semiconductor material is a compound semiconductor; and
said charge carriers are of predominantly a single polarity and are electrons.

54. The detector of claim 51 wherein said means for determining includes:
differentiation means to create a time derivative signal $S_f(t)$ of said secondary signal, designated $E_f(t)$;
edge detection means to examine said time derivative signal $S_f(t)$ and output a pulse whenever a slope of appropriate sign and magnitude is detected; and
means, responsive to said pulse output of said edge detection means, for indicating the charge impact time $t_{stop}$.

55. A detector comprising:
a volume of detector material capable of absorbing photons and generating, for each such absorbed photon, a plurality of mobile charge carriers whose average number depends on the energy of said absorbed photon;

at least one electrode that applies an electric field across said volume of detector material so that mobile charge carriers, so generated, will drift across said volume of detector material;

a first plurality of electrodes disposed over an area on a first surface of said volume of detector material, toward which surface mobile charge carriers of said first polarity drift;

a second plurality of electrodes disposed over an area on a second surface of said volume of detector material, toward which surface mobile charge carriers of said second polarity drift;

a first primary signal generator, for each electrode j of said first plurality, generating a primary signal $q_j(t)$ representing the time varying charge induced in that electrode by the motion of said drifting mobile charge carriers;

a second primary signal generator, for each electrode j of said second plurality, generating a primary signal $q_j'(t)$ representing the time varying charge induced in that electrode by the motion of said drifting mobile charge carriers;

a first secondary signal generator, for one or more electrodes i of said first plurality, generating a secondary signal which is a weighted sum of primary signals that includes the primary signal $q_k(t)$ for at least one other electrode k of said first plurality;

a second secondary signal generator, for one or more electrodes i of said second plurality, generating a secondary signal which is a weighted sum of primary signals that includes the primary signal $q_k'(t)$ for at least one other electrode k of said second plurality; and a signal analyzer analyzing said secondary signal from said first and second secondary signal generators to determine the photon's point of interaction within the detector.

* * * * *